United States Patent [19]
Batcher

[11] Patent Number: 5,268,634
[45] Date of Patent: Dec. 7, 1993

[54] ELECTRO-OPTICAL CONTROL SYSTEM

[75] Inventor: Alfred J. Batcher, Sterling Heights, Mich.

[73] Assignee: Control Methods, Inc., Mount Clemens, Mich.

[21] Appl. No.: 864,851

[22] Filed: Apr. 7, 1992

[51] Int. Cl.[5] .................... G01R 19/00; G09G 3/00
[52] U.S. Cl. ................................ 324/96; 340/815.31
[58] Field of Search ............... 324/96; 340/707, 753, 340/754, 815.31

[56] References Cited
U.S. PATENT DOCUMENTS
4,644,341  2/1987  Warner .................. 340/815.31

OTHER PUBLICATIONS
"Xsunx FX5 Series" Advertisement of Ramco Electric, in Sensors Feb. 1992.
Tri-Tronics Brochure of Tri-Tronics Co., Mar. 1989.
U.S. Eye Brochure of Tri-Tronics Co., Mar. 1989.
D.C. Eye Brochure of Tri-Tronics Co., Dec. 1988.
Color Mark Smarteye Brochure of Tri-Tronics Co, Sep. 1989.
Tri-Tronics Tech-Lit Brochure MM-2 of Tri-Tronics Co, Feb. 1989.
Tri-Tronics Multi-Mate Instructions Literature of Tri-Tronics Co. Sep. 1985.
Tri-Tronics Smarteye Brochure of Tri-Tronics Co, Mar. 1989.
Tri-Tronics Flexible Fiber Optic Light Guides Brochure of Tri-Tronics Co, Mar. 1989.
Tri-Tronics PM-7000 Plug-Mate Controls Brochure of Tri-Tronics Co, Jun. 1988.
Tri-Tronics Tech-Lit Brochure No. 0110 of Tri-Tronics Co, 1982.
Tri-Tronics Product Inspection System Fact Sheet PM-8200 of Tri-Tronics Co, Dated unknown (Before Mar. 1992).

*Primary Examiner*—Ernest F. Karlsen
*Attorney, Agent, or Firm*—Peter D. Keefe; James Ignatowski

[57] ABSTRACT

An electro-optical control system having a multi-key keypad, an alpha-numeric display, means for periodically generating a pulsed light beam, means for detecting a portion of the light beam to generate an analog signal, means for converting the analog signal to a digital signal and means for subtracting an ambient light level form the digital data to generate a difference signal. The difference signal is averaged and filtered to generate a digital signal level which is displayed on the alpha-numeric display. The electro-optical control system has two output switches which are activated when digital signal level is between programmed upper and lower limits for each output switch. The values of the upper and lower limits are programmable using the keypad. The upper and lower limits are displayed on the alpha-numeric display as they are generated. Means are also provided for generating alternate upper and lower limits for each output switch and means for actuating the two output switches with the alternate upper and lower limits in response to an external input. Means are provided for locking and unlocking the electro-optical control system using an unlock code entered by means of the keypad.

56 Claims, 48 Drawing Sheets

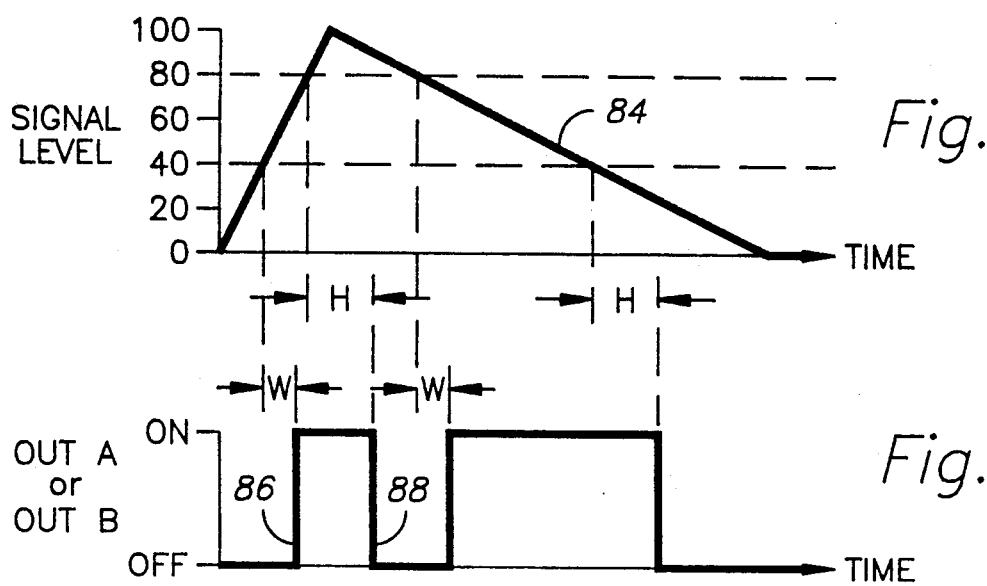
Fig. 6A
Fig. 6B
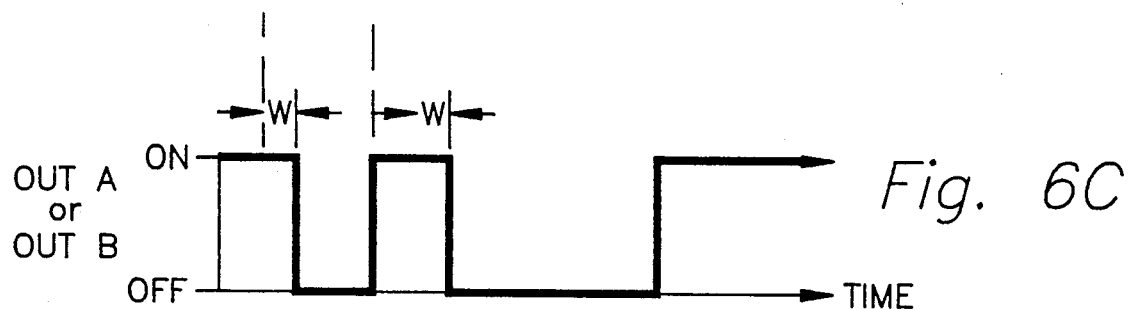
Fig. 6C

ELECTRO-OPTICAL CONTROL SYSTEM

BACKGROUND OF THE INVENTION

1. Field of the Invention

The invention is related to the field of electro-optic controls and in particular to an electro-optical control having at least two output switches activated in response to a received light signal being within or outside programmed limits.

2. Prior Art

Electro-optical controls for detection of objects, making measurements, or controlling a manufacturing process are well known in the art. Typical of a commercially available electro-optical sensor is the XSUNX sensor, manufactured by RAMCO Electronics of West Des Moines, Iowa, and the Smarteye photo electric sensor, manufactured by Tri-tronics Co., Incorporated of Tampa, Fla. The XSUNX sensor has four sensitivity levels selected by external signals, but does not have capabilities of displaying the detected signal level nor a keypad for entering limits or instructions to the sensor.

The Smarteye photoelectric sensor uses a pulse modulated light beam and has a contrast indicator which gives a scaled reading of the received light. This contrast indicator is a series of 10 indicator lamps labeled from 1 to 10. The Smarteye switches output when the light level passes the midscale contrast level 5. This sensor also has an OFFSET control which offsets the signal so that the output switches when the indicator lamp 5 is activated.

With present advances in manufacturing, there is need for an electro-optical sensor having greater versatility, having various functions that are programmable, and having a keypad which permits in situ programming of the electro-optical control.

SUMMARY OF THE INVENTION

The invention is an electro-optical control system having a housing on which is mounted a multi-key keypad, an alpha numerical display and series of status lamps. The electro-optical control system has a pulsed light emitting diode generating a pulsed light beam which is guided to a remote location by an output light guide. An input light guide receives a portion of the light beam generated by the light emitting diode and transmits it to a photo sensitive diode. The photosensitive diode generates an analog signal having a value corresponding to the received portion of the light beam. The analog signal is converted to digital data, and a corresponding ambient light digital data is subtracted from the digital data to generate a difference signal. The difference signal is averaged, filtered and scaled to generate a light level signal which is displayed on the alpha-numeric display.

The electro-optical control system has means for generating a Lower and an Upper Limit A, having values entered by means of the keypad. The values of the Lower Limit A and the Upper Limit A are displayed on the display as they are generated to give the user a visual indication of these limits. Means responsive to the light signal level being greater than the Lower Limit A and less than the Upper Limit A, activates an output A switch from an OFF state to an ON state and energizes an output A status lamp visually signifying that the output A switch has been activated to the ON state.

The electro-optical control system also has means for generating a Lower and an Upper Limit B, having values entered by means of the keypad. The values of the Lower and Upper Limits B are displayed on the alpha-numeric display as they are being generated to give the user a visual indication of the values of these limits. Means responsive to the light signal level being greater than the Lower Limit B and less than the Upper Limit B actuates an output B switch from an OFF state to an ON state and energizes an output B status lamp to indicate that output B switch has been actuated.

In the preferred embodiments, the electro-optical control system also provides a programmable wait delay for both the actuation of the output A and the output B switches and a programmable hold delay for the output A and output B switches. The preferred embodiment also includes programmable Alternate Lower and Upper Limits a and programmable Alternate Lower and Upper Limits b, which replace Upper and Lower Limits A and the Upper and Lower Limits B in response to an external input. An external input status lamp is activated to indicate the Upper and Lower Limits A and B have been replaced by the Alternate Upper and Lower Limits a and b.

The electro-optical control system further includes means for locking the electro-optical control system to prohibit changing of the Upper and Lower Limits A, Upper and Lower Limits B, Alternate Upper and Lower limits a and Alternate Upper and Lower Limits b and means for unlocking the electro-optical control system. The means for unlocking consists of a stored lock code entered by means of the keypad and the means for unlocking consists of a comparator which compares a code entered by means of the keypad with the lock code and unlocks the electro-optical control system when the entered code matches the lock code.

The preferred embodiment further includes self test means for testing the EEPROM, EPROM, keypad, alpha-numeric display, outputs, and the RAM.

The object of the invention is to provide a programmable electro-optical control having a keypad for entering information and data and an alpha-numeric display for displaying the numerical value of the received light signal level.

Another object of the invention is to provide an electro-optical control in which the lower and upper limits of the light signal level for actuating the output switch are programmable using the keypad.

Another object of the invention is to provide an electro-optical control having two output switches, the upper and lower limits of which are independently programmable using the keypad.

Another object of the invention is to provide an electro-optical switch in which each of the two output switches have alternate upper and lower limits which are used to actuate their respective output switches in response to an external input.

Still another object of the invention is to provide an electro-optical control in which the actuation of each output can be delayed by a programmable wait delay period of time in response to instruction entered by means of the keypad.

Yet another object of the invention is to provide an electro-optical control in which the deactivation of each output can be delayed by a programmable hold delay period of time in response to instructions entered by means of the keypad.

Another object of the invention is to provide means for inverting the actuation of the output switch.

Still another object of the invention is to provide a selectable lock of the electro-optical control using a lock code entered by means of a keypad; wherein the locked mode of the upper and lower limits, the wait and hold times and the current mode of operation may be viewed but not changed; and wherein further, the electro-optical control may be unlocked by entering a lock code by means of the keypad.

These and other objects may be determined by reading the detailed description of the invention in conjunction with the drawings.

DESCRIPTION OF THE DRAWINGS

FIG. 6A shows a wave form of the light signal level.

FIG. 6B shows the effects of the wait delay W and the hold delay H in a normal mode of operation.

FIG. 6C shows the effects of the wait delay W and the hold delay H in an inverted mode of operation.

DETAILED DESCRIPTION OF THE PREFERRED EMBODIMENT

Figure 1:
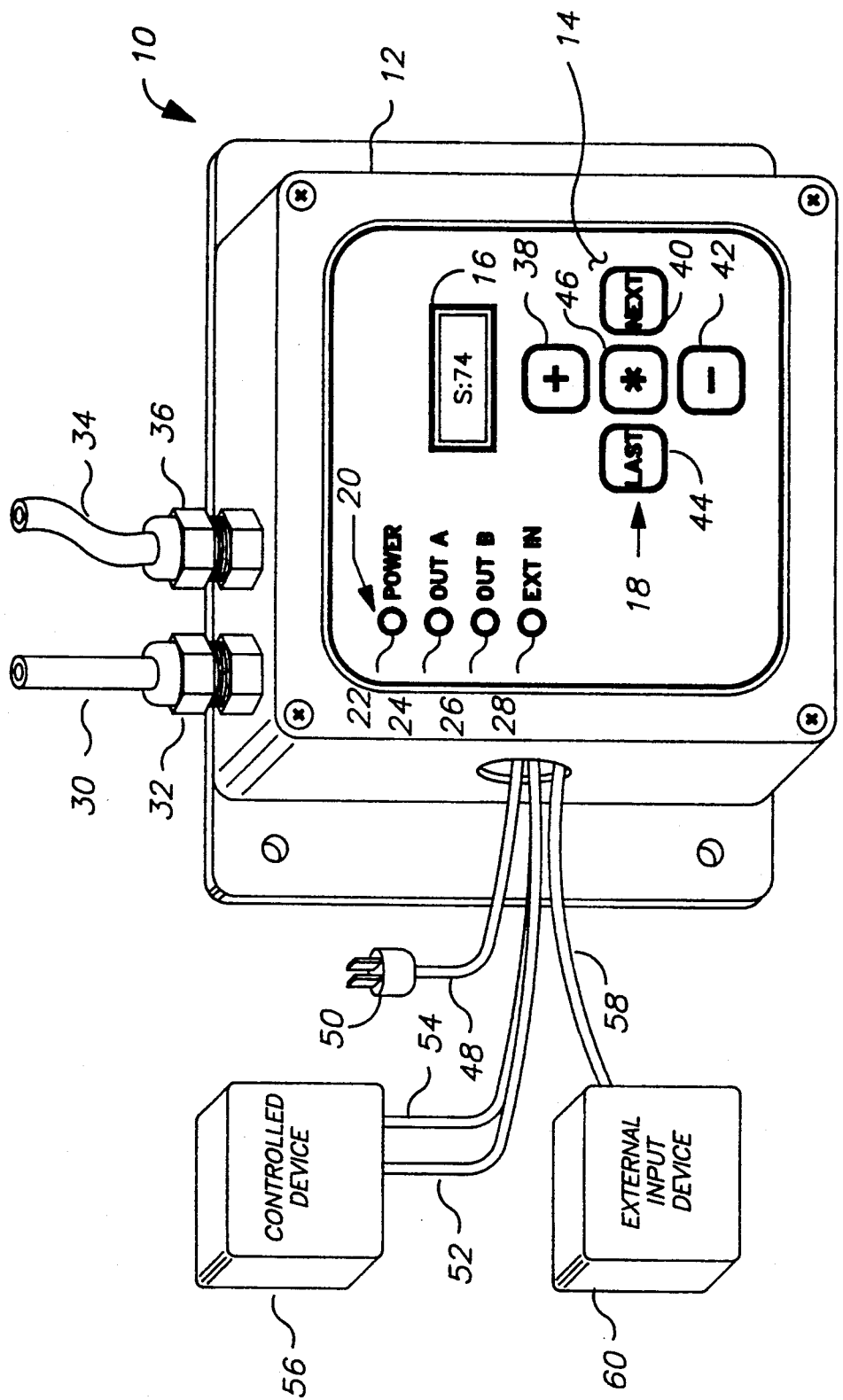
FIG. 1 is a perspective of the electro-optical control system showing the location of various elements thereof relative to the housing.

Referring now to the Drawings, FIG. 1 is a perspective of the electro-optical control system 10 having an external housing 12. The front face 14 of the housing 12 has an alpha-numeric display 16 for displaying characters including numbers, letter and symbols, a multiple-key keypad 18 and a series of indicator lamps 20. The series of indicator lamps 20 consists of at least a power status lamp 22, which when lit, indicates the electro-optical system 10 is turned on, an output A (OUT A) and an output B (OUT B) status lamps 24 and 26 respectively which when lit indicates that the A or B output is activated by the electro-optical control system and an external input (EXT IN) status lamp 28, which when lit, indicates that alternate limits are activated, as shall be explained hereinafter. (Alternate limits a, b are distinguished from limits A, B wherever necessary hereinafter for the sake of clarity by the adjective "regular" preceding limit or limits.) An output light guide, such as a fiber optic output cable 30 is received in an output connecter 32 and an input light guide, such as a fiber optic input cable 34, is received in a fiber optic input connector 36. The fiber optic output and input connectors 32 and 36 are mounted at a convenient location on the external housing 12. Preferably, the fiber optic output and input connectors, 32 and 36 are mounted on the top of the external housing 12 as shown.

The existing embodiment of the keypad 18 has five keys, but it may consist of more than five keys. As shown in FIG. 1, the keypad 18 has a plus (+) key 38, a next (NEXT) key 40, a minus (−) key 42, a last (LAST) key 44, and a star (*) key 46.

Electrical power for the electro-optical control system 10 is received from a conventional 120 VAC power source by means of a power cord 48 which may include a male plug 50 receivable in a conventional wall socket. Electrical lead 52 associated with the A output and electrical lead 54 associated with the B output are connected to one or more controlled devices, such as controlled device 56. Lead 58 associated with the internal input may be connected to an external input device 60. The external input device 60 may be an independent user activated computer, a microprocessor associated with the controlled device 56 or a keyboard.

Figure 2:
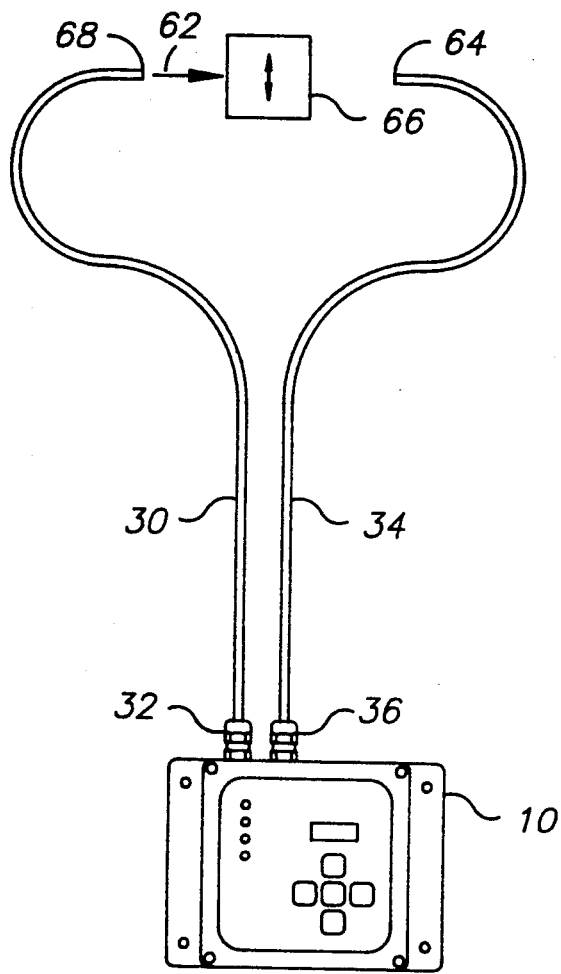
FIG. 2 shows a through-beam arrangement of the output and input light guides.
Figure 3:
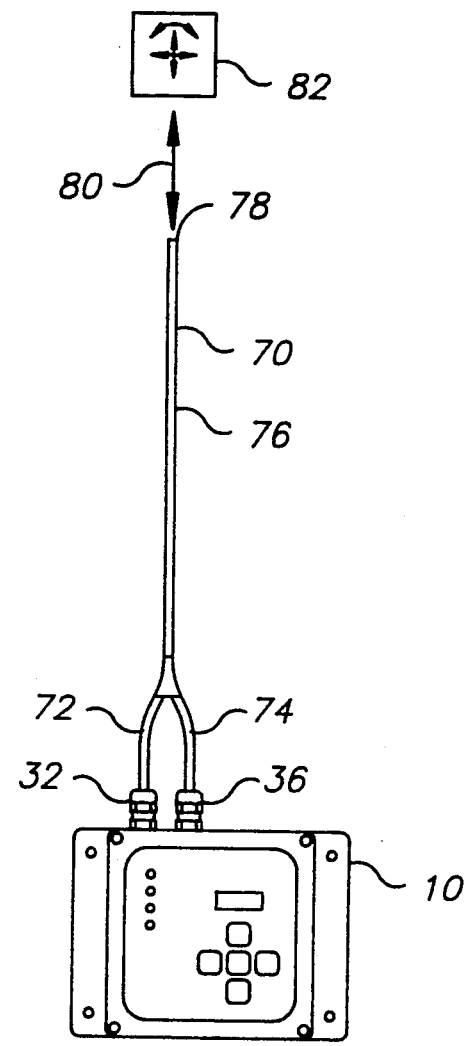
FIG. 3 shows a bifurcated light guide attached to the electro-optical control system.

The electro-optical control system 10 may be used in the through-beam sensing mode as shown in FIG. 2 or a reflective beam sensing mode as shown in FIG. 3. In the through-beam sensing mode, the fiber optic output cable 30 directs a pulsed light beam 62 generated by the electro-optical control system 10 towards the input end 64 of the fiber optic input cable 34. When an object 66 moving on a conveyor (not shown) moves between the output end 68 of the fiber optic output cable 30 and the input end 64 of the fiber optic input cable 34, the light beam 62 is broken or diminished and the intensity of the light received by the fiber optic input cable is significantly reduced. As is well known in the art, a lens (not shown) may be placed at the output end 68 of the fiber optic output cable 30 to focus the light beam 62 on the input end 64 of the fiber optic input cable 34. The use of lenses at the output and input ends of the light guides is well known in the art and need not be discussed for an understanding of the invention.

In the reflective mode of operation, a bifurcated light guide, fiber optic cable 70 may replace the two independent fiber optic cables 30 and 34 used with the through-beam method shown in FIG. 2. The bifurcated light guide 70 has an output branch 72 which connects to the output connector 32 and an input branch 74 which connects to the input connector 36. The optic fibers in the output branch 72 are combined with optic fibers of the input branch 74 to form a composite portion 76 in which the optic fibers from the output branch 72 and the input branch 74 are uniformly distributed. A pulsed light beam generated by the electro-optical control system 10 is conducted by the optic fibers of the output branch 72 to the end 78 of the composite portion 76 and are emitted as a light beam 80. An object, such as object 82 adjacent to the end of the bifurcated light guide 70 will reflect a portion of the light beam 80 back to the end 78 of the bifurcated light guide 70. The reflected light is conducted by the optic fibers of the input branch 74 to the electro-optical control system 10. The electro-optical control system 10 will then generate a number indicative of the quantity or intensity of the received reflected light which is displayed by the alpha-numeric display 16 and activate output A or output B as required.

The five keys on the keypad 18 are used to change the function, change the limits or values and examine or edit the values displayed. The keys 38 through 46 are snap action keys, which when pushed, give the operator a positive indication of when the key has actually closed. This positive indication is generally referred to as "tactile feedback." The individual keys and their use in conjunction with the electro-optical control system 10 are listed in Table 1.

TABLE 1

| KEY NAME | USE |
| --- | --- |
| Next | Toggles program to next function |
| Last | Toggles program to last function |
| Plus (+) | Increments displayed value, or toggles state |
| Minus (−) | Decrements displayed value, or toggles state |
| Star (*) | Stores new value, or executes an event |

The electro-optical control system 10 is capable of executing at least the 30 functions listed in Table 2. The functions are divided into six groups. The alpha-numeric display 16 produces an alpha-numeric representation of the function currently active in the system. The functions are called up in a predetermined sequence in response to activating or pressing the NEXT key 40 in the keypad 18. The functions are called up in the sequence shown. When the last function is active, activation of the NEXT key 40 will return the active function to the first function of the predetermined sequence. The LAST key 44 works directly opposite to the NEXT key 40 and activation of the LAST key 44 will call up the functions in a reverse sequence.

The displayed function character will blink when the function is open and its value can be changed. When the active function is open, the PLUS (+) and MINUS (−) keys, 38 and 42 respectively may be used to select the desired value for the active function. Conversely, when the function character does not blink, the function is locked and its value can only be viewed but not changed. The electro-optical control system 10 may be locked or opened using the appropriate code functions shown at the bottom of Table 2.

TABLE 2

| GROUP | FUNCTION | SAMPLE DISP | RANGE or NOTES |
| --- | --- | --- | --- |
| SENSOR PARAMETER | Signal Level | S:xx | 0 to 100% |
| | Intensity | I:Md | Lo/Md/Hi |
| | Response | R:x | 1 to 8 |
| | Enable Delays | D:On | No/On (Off/On) |
| | Enable Alternates | A:On | No/On (Off/On) |
| | Force Input | F:On | No/On (Off/On) |
| OUTPUT A | Lower Limit A | LAxx | 0 to 99% |
| | Upper Limit A | UAxx | 1 to FS (100%) |
| | Mode A | MA:↑ | ↑/↓ (Norm./Inv.) |
| | Wait Delay A | WAxx | .0 to 99 seconds |
| | Hold Delay A | HAxx | .0 to 99 seconds |
| | Alt. Lower Limit a | Laxx | 0 to 99% |
| | Alt. Upper Limit a | Uaxx | 1 to FS (100%) |
| | Alt. Mode a | Ma:↑ | ↑/↓ (Norm./Inv.) |
| | Alt. Wait Delay a | Waxx | .0 to 99 seconds |
| | Alt. Hold Delay a | Haxx | .0 to 99 seconds |
| OUTPUT B | Lower Limit B | LBxx | 0 to 99% |
| | Upper Limit B | UBxx | 1 to FS (100%) |
| | Mode B | MB:↑ | ↑/↓ (Norm./Inv.) |
| | Wait Delay B | WBxx | .0 to 99 seconds |
| | Hold Delay B | HBxx | .0 to 99 seconds |
| | Alt. Lower Limit b | Lbxx | 0 to 99% |
| | Alt. Upper Limit b | Ubxx | 1 to FS (100%) |
| | Alt. Mode b | Mb:↑ | ↑/↓ (Norm./Inv.) |
| | Alt. Wait Delay b | Wbxx | .0 to 99 seconds |
| | Alt. Hold Delay b | Hbxx | .0 to 99 seconds |
| TESTING CODE | Test | Test | Diagnostics |
| | Open | Open | Open unit |
| | Lock | Lock | Lock unit |
| | Key Code | Key | Key code |

Some of the functions, such as "Mode A" or "Mode B" may have a normal or inverted mode of operation as shown on FIGS. 4A-4C and 5A-5C. These functions may be toggled from the normal mode to the inverted mode and vice versa by activating either the (+) key 38 or the (−) key 42. The STAR (*) key 46 is used to enter the state (normal or inverted) into a memory associated with the electro-optical control system 10.

Figure 4A:
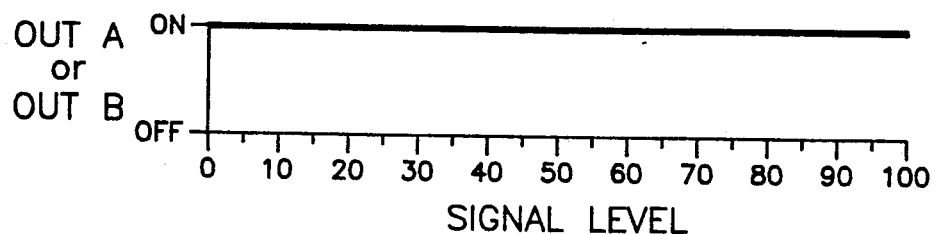
FIGS. 4A through 4C show the state of the output switch in the normal mode of operation for various upper and lower limits.
Figure 4B:
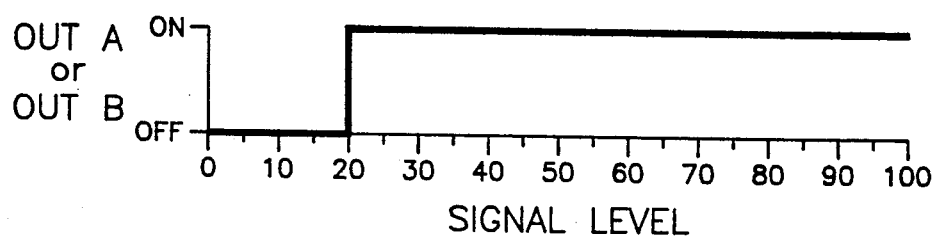
Figure 4C:
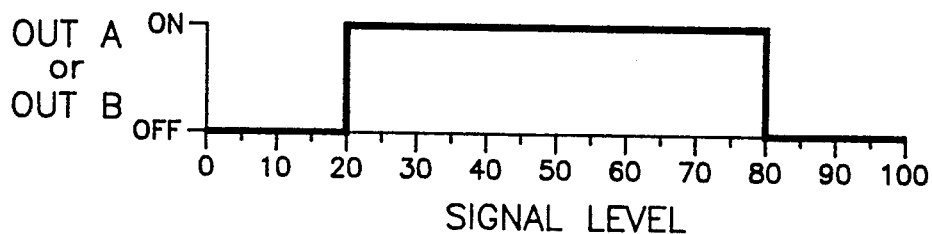

The basic operation of the electro-optical control system 10 in the normal mode is shown on FIGS. 4A-4C. The curves shown on FIGS. 4A, 4B, and 4C will be discussed relative to output A. The functions related to output B are substantially identical and, therefore, need not be repeated. FIG. 4A is a curve showing the state of output A when the lower limit is set at zero (0) and the upper limit is set at full scale (100). In this example, output A remains ON independent of the signal level. FIG. 4B is a curve showing the state of output A when the lower limit is set at 20 and the upper limit is set at full scale (100). In this mode, output A is turned OFF when the signal level is below 20 and is ON when the detected signal level is above 20. FIG. 4C is a curve showing the state of output A when the lower signal level limit is set at 20 and the upper signal level limit is set at 80. In this example, output A, is ON when the signal level is between the values of 20 and 80 and is OFF for all other values.

Figure 5A:
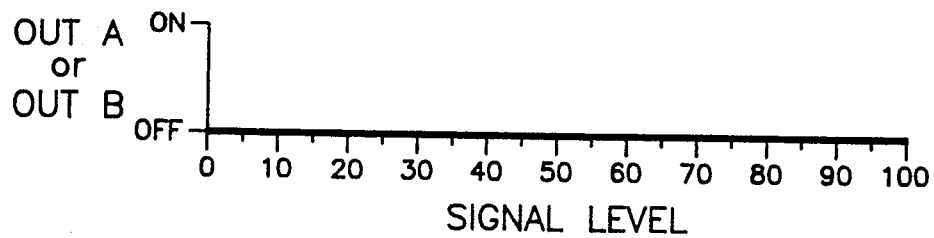
FIGS. 5A through 5C show the state of the output switch in the inverted mode of operation for the same limits used in FIGS. 4A through 4C.
Figure 5B:
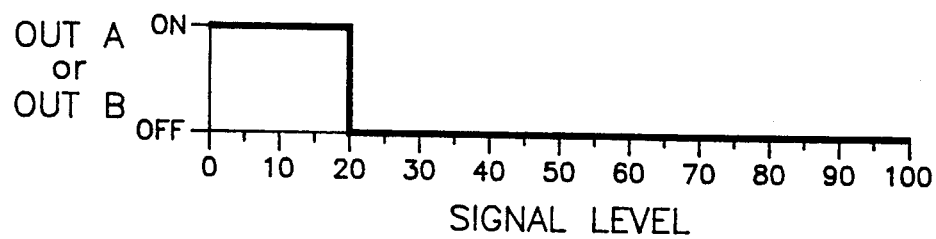
Figure 5C:
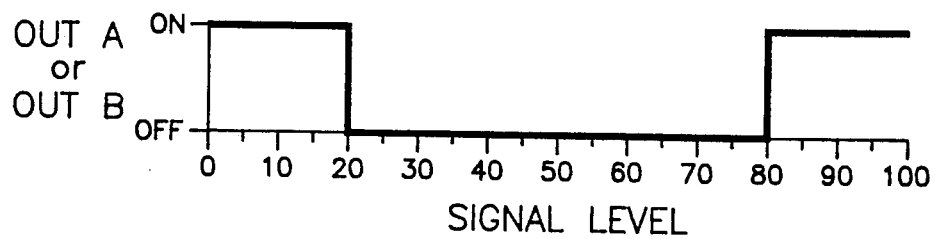

The curves shown on FIGS. 5A through 5C correspond to FIGS. 4A through 4C when output A is in the inverted mode The effects of the wait delay and the hold delay functions are shown on FIGS. 6A and 6B. The wait delay function waits a predetermined period of time after the signal level crosses the threshold of the lower or upper limit which normally would cause the associated output, output A or output B, to go from OFF to ON when in the normal mode of operation, or go form ON to OFF in the inverted mode of operation. The wait delay function prevents the electro-optical control system from activating the associated output (A or B) until the value of the sensed light persists for a predetermined period of time. This prevents the associated output from being activated by a false signal. It also may be used to separate small objects from larger objects moving on a conveyor. For example, if the wait delay time is selected to be longer than the period of time for a small object to pass by, but shorter than the period of time for the larger object to pass by, the output A will only be turned ON by the larger object and will ignore the smaller object. The program executed by the microprocessor permits the wait period to be programmed from 0 to 99 seconds.

The hold delay function holds the associated output ON for a selected period of time after the value of the detected light signal crosses the threshold of the lower or upper limit which normally would cause the associated output (A or B) to go from ON to OFF when in the normal mode or from OFF to ON when in the inverted mode. The hold delay function can be used to detect missing parts on a conveyor in which the parts are normally spaced from each other such that the time required for the parts to travel the distance they are spaced apart is less than the selected period of hold time. A missing part will turn the associate output OFF in a normal mode of operation or ON in an inverted mode of operation. This signal could be used to sound an alarm indicating that a part is missing.

Referring to FIGS. 6A and 6B, curve 84 represents the quantity of light or signal level detected by the electro-optical control system 10 during an exemplary operation, as shown in FIG. 3. The lower limit of the electro-optical control system 10 in this example is set at 40, and the upper signal level is set at 80. The wait delay is set for a delay time W and the hold delay is set for a delay time H. As shown in FIG. 6B, the associated output, either A or B, remains in an OFF state for a period of time W after the signal level exceeds 40 before the output turns ON, as indicated by the leading edge 86 of the output. When the signal level exceeds 80, the output does not turn OFF as it would without the hold delay function but rather is held ON for a delay period H, as indicated by the trailing edge 88 of the output. In a like manner, when the signal level falls below 80, the output state signal does go ON until after the delay period W and does not return to OFF until a period of time H after the signal level falls below 40.

FIG. 6C shows the state of the output under the same conditions as discussed relative to FIGS. 6A and 6B when the associated output is in the inverted mode of operation.

Figure 7:
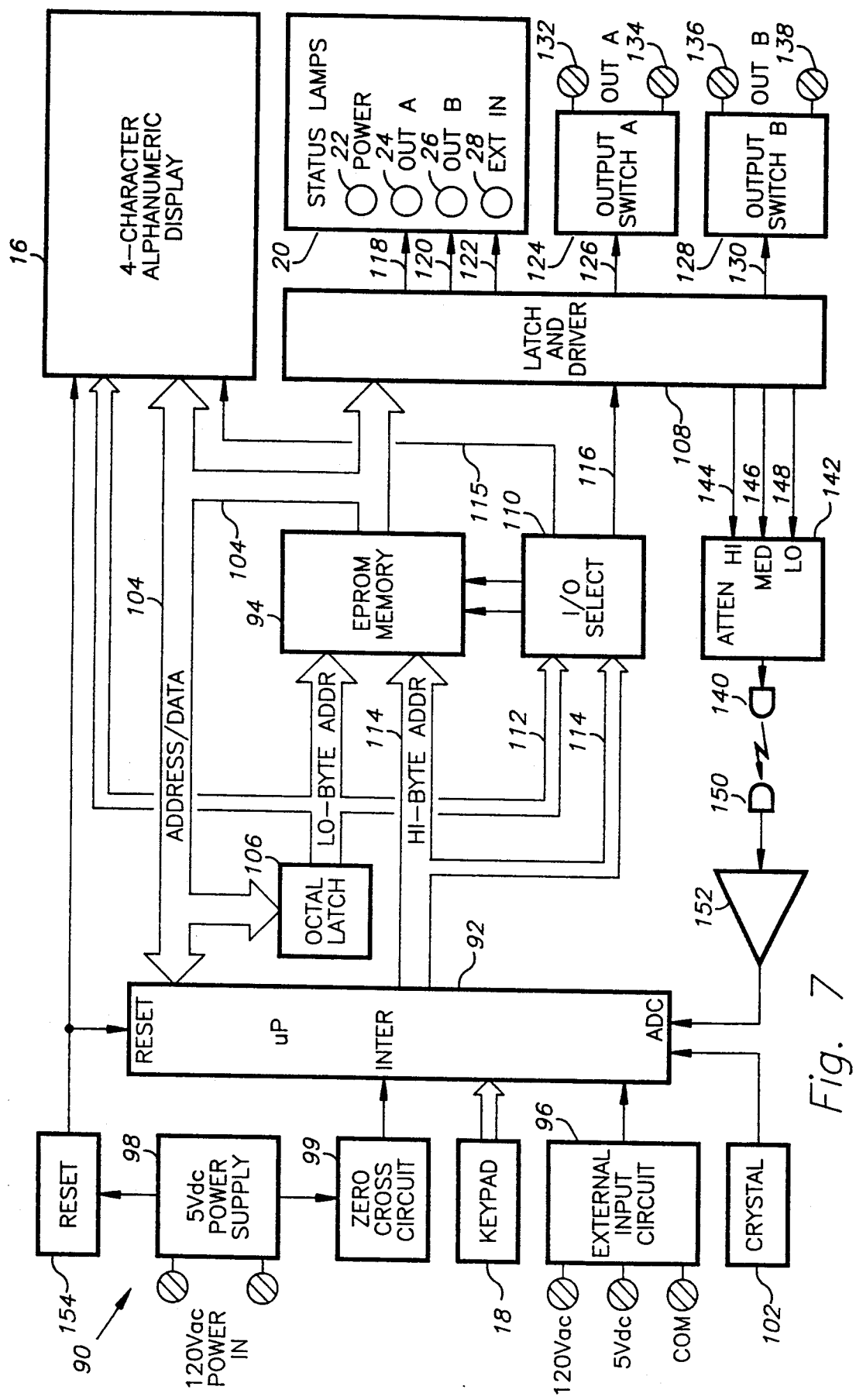
FIG. 7 is a block diagram showing the electronic elements incorporated into the electro-optical control system.
Figure 8A:
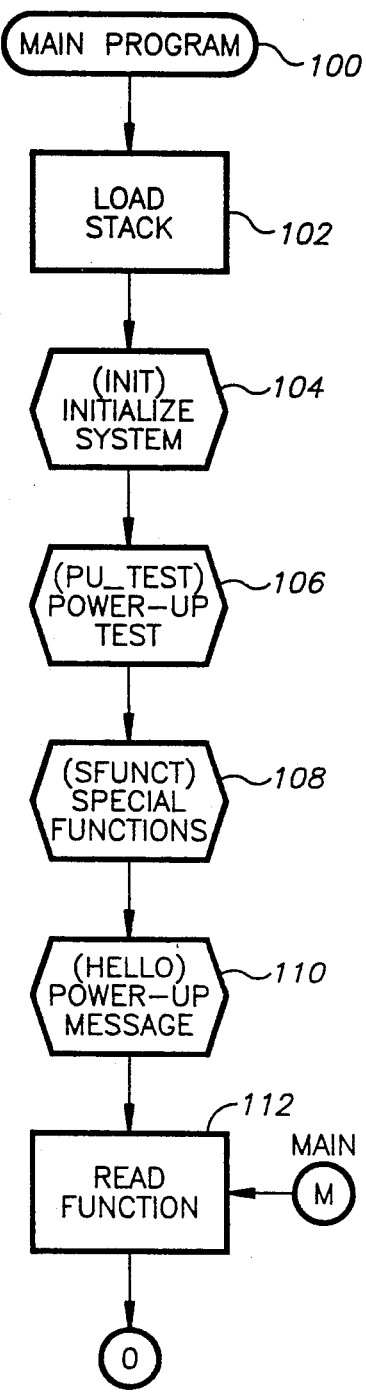
FIGS. 8A–8E are a flow diagram of the main program.
Figure 8A:
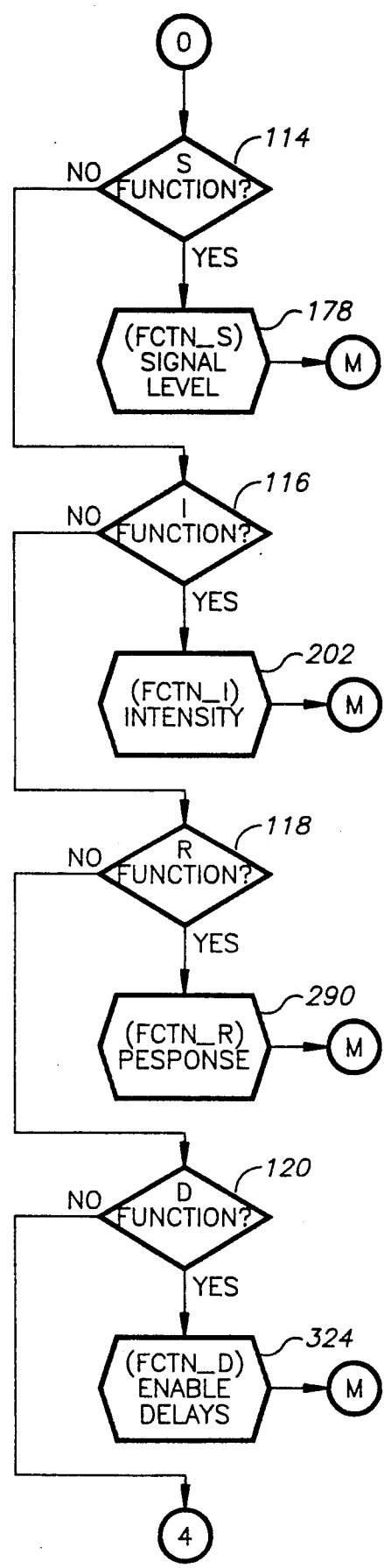
Figure 8B:
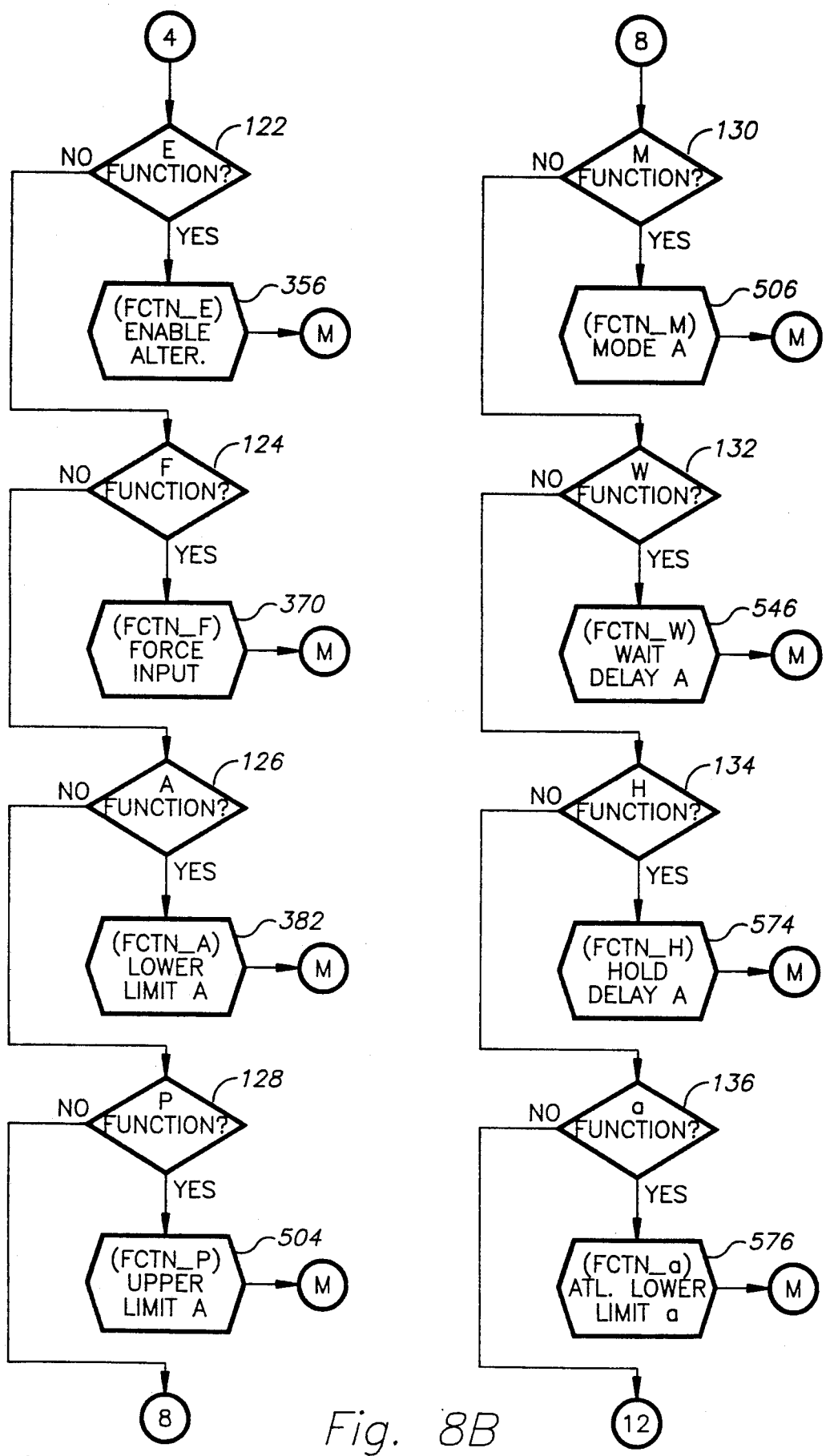
Figure 8C:
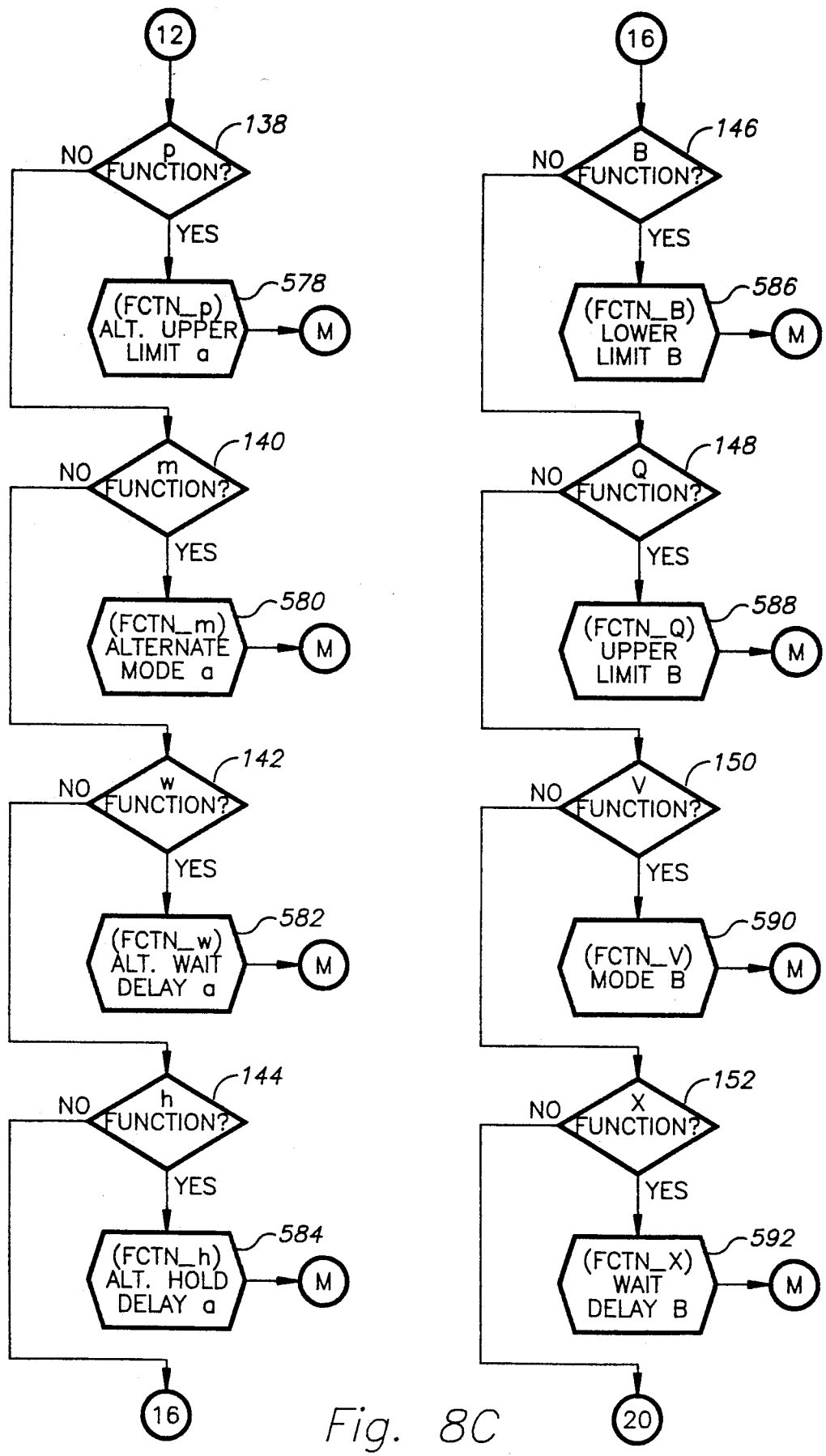
Figure 8D:
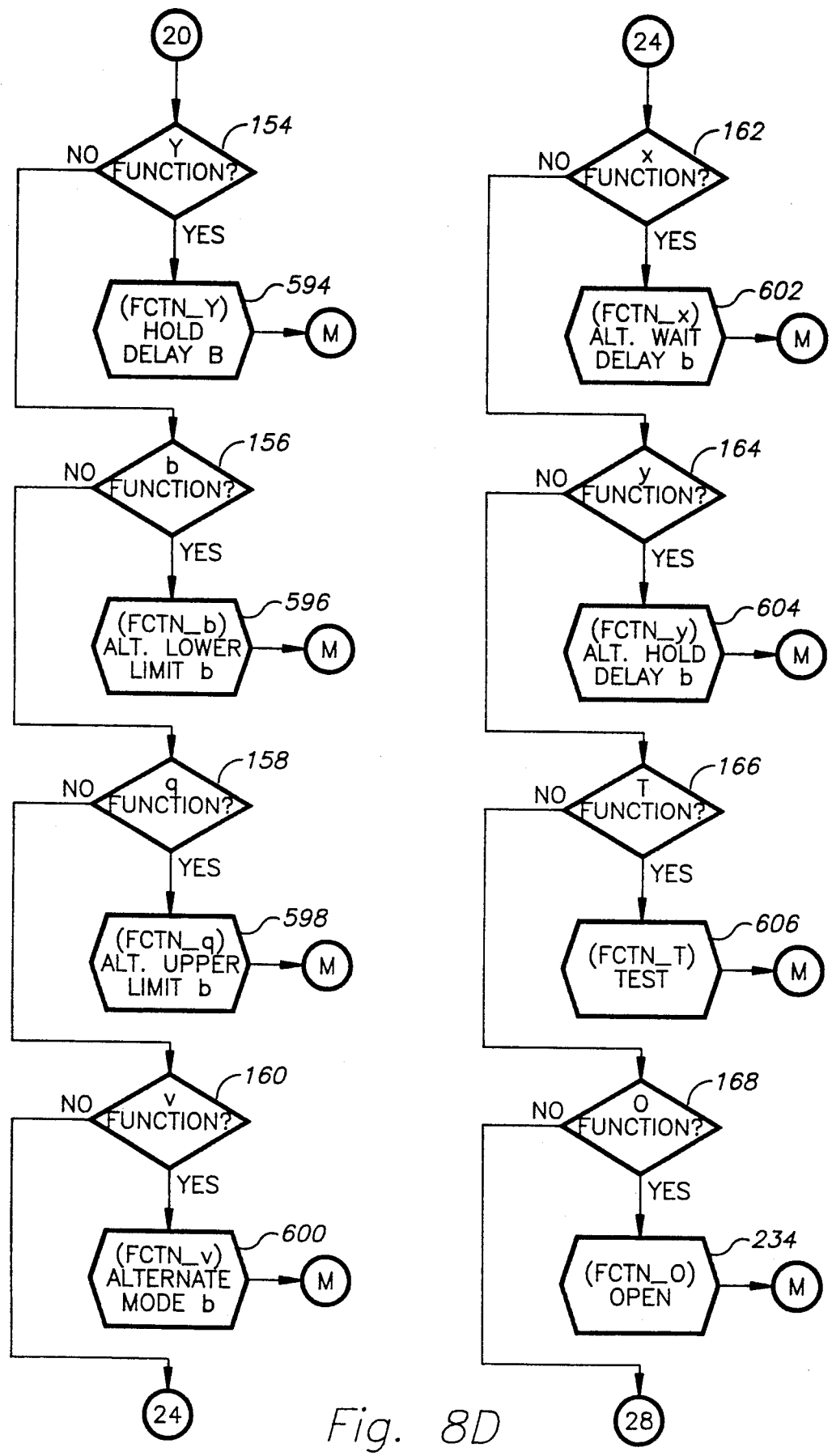
Figure 8E:
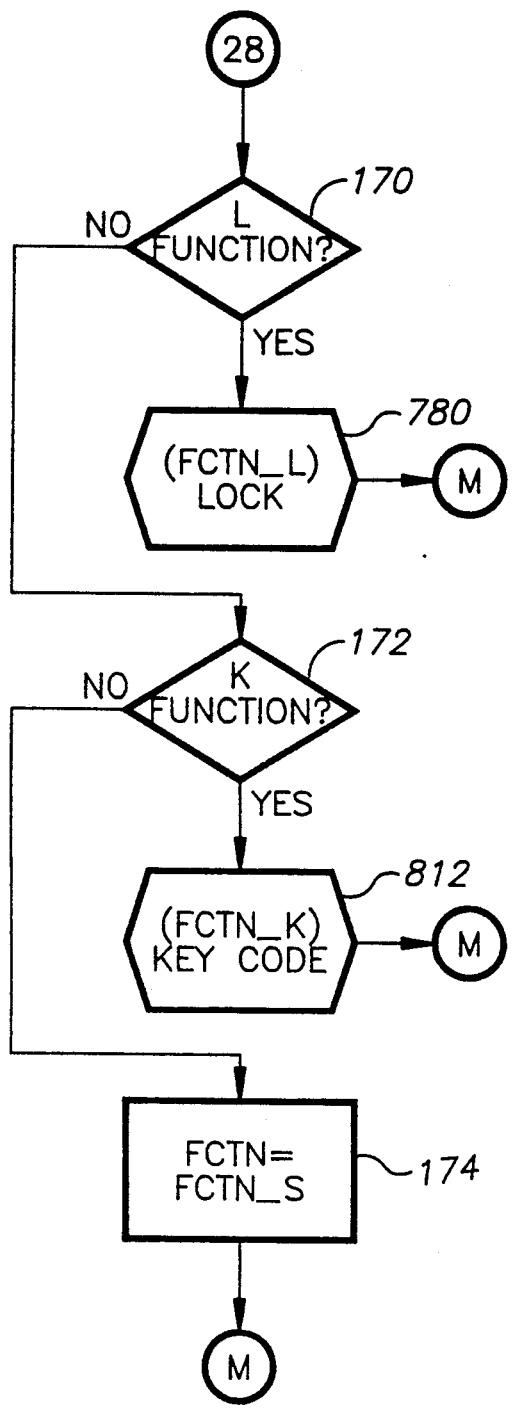

FIG. 7 is a block diagram of the electronic circuit 90 of the electro-optical control system 10. The electronic circuit 90 has a microprocessor 92 which executes the functions shown in Table 2. The functions are executed in accordance with instructions received from the keypad 18, the external input circuit 96 and the program stored in the Erasable Programmable Read-Only Memory (EPROM) 94. A 5 VDC power supply 98 converts 120 VAC electrical power to 5 VDC which is used to power the electronic circuit 90 and a zero crossing circuit 99 generates a 60 Hz square wave signal received at the INTERRUPT input of the microprocessor.

A crystal 102 is connected to the XTAL input of the microprocessor 92 and controls the frequency of the generated clock signals.

The addresses and data generated by the microprocessor 92 are communicated via bus 104 to the alpha-numeric display 16, an octal latch 106 and a latch and driver circuit 108. The octal latch 106 generates lo-bite address data which is transmitted to the EPROM 94, the alpha-numeric display 16 and an input/output (I/0) selector circuit 110 via a lo-bite address bus 112. Hi-byte address data generated by the microprocessor 92 is transmitted to the EPROM 94 and the input/output selector circuit 110 by a hi-byte address bus 114. The output of the EPROM 94 is transmitted to the microprocessor 92 by address/data bus 104, while a first output of the input/output selector circuit 110 selects the alpha-numeric display 16 by line 115 and a second output selects the latch and driver circuit 108 by line 116.

The latch and driver circuit activates the status lamps 20 via lines 118, 120, and 122, as indicated, to energize the output A status lamp 24, the output B status lamp 26 and the external input status lamp 28, respectively. The power status lamp 22 is activated directly from the 5 VDC power supply 98.

In the preferred embodiment, the color of the power status lamp is red, the color of the output A and output B status lamps 24 and 26 respectively is yellow, and the color of the external input status lamp 28 is green.

Respective outputs of the latch and driver circuit 108 are connected to an output A switch 124 by line 126 and to output B switch 128 by line 130. Output A switch 124 electrically connects output A terminals 132 and 134 to each other when energized. In a like manner output B switch 128 electrically connects output B terminals 136 and 138 to each other when energized. The output A and output B switches 124 and 128 are preferably solid state switches but may be conventional relay actuated switches as are known in the art.

A light emitting diode 140 is activated by the output of an attenuator circuit 142 in response to inputs from the latch and driver circuit 108 via lines 144, 146 and 148. An input on line 144 enables the attenuator circuit 142 to energize the light emitting diode 140 to emit a high level light output pulse. An input on line 146 enables the attenuator circuit 142 to energize the light emitting diode 140 to emit a medium level light output pulse and a signal on line 148 enables the attenuator circuit 142 to energize the light emitting diode 140 to emit a low level light output pulse. In the preferred embodiment, the light emitting diode 140 is an infrared (IR) light emitting diode, such as light emitting diode OP265-A manufactured by Optek. However, a light emitting diode 140 emitting light in other spectral frequency ranges may be used.

The light received by the input fiber optic 34 or 74 is transmitted to a photodiode 150, such as photodiode OP5565 manufactured by Optek. The signal generated by the photodiode 150 in response to the received IR light signal is amplified by amplifier 152. The amplified light signal output from amplifier 152 is transmitted to the analog to digital converter input of the microprocessor 92 where it is converted to a digital signal and is temporarily stored.

A reset signal generator 154 is responsive to the electro-optical control system 10 being turned ON to generate a reset signal, which is received at the RESET input of the microprocessor. The microprocessor in response to the reset signal will initialize and execute a series of diagnostic tests. If an error is detected an error code is displayed on the alpha-numeric display 16 indicative of the error detected. If no error is detected, the microprocessor selects the signal level function (FCTN-S) and displays on the alpha-numeric display 16 the signal level currently being detected.

The details of the operation of the electro-optical control system 10 will be discussed with reference to the flow diagrams shown on FIGS. 8 through 31.

FIGS. 8A through 8E show the details of the repetitive main program 100 executed by the microprocessor 92. The main program 100 begins by loading the stack, block 102, executing the Initialize System subroutine (INIT), block 104, executing a Power-up Test subroutine, block 106, executing a Special Function subroutine, block 108, and then executing a Power-up Message subroutine, block 110. The Initialize System subroutine 104, Power-up Test subroutine 106, Special Function subroutine 108, and the Power Up Message subroutine 110 are conventional power-up subroutines and, therefore, need not be discussed in detail.

The program will then read the function to be executed, block 112, and then sequentially inquire, decision blocks 114 through 172 which function has been selected for execution.

If no function is currently active, the program will store the Signal Level Function [FCTN-S] as the active function, block 174, and then return to block 112. In the next iteration of the main program 100, the Signal Level function [FCTN-S] will be read, block 112, and the Signal Level Subroutine 178 will be executed by the microprocessor.

Figure 9:
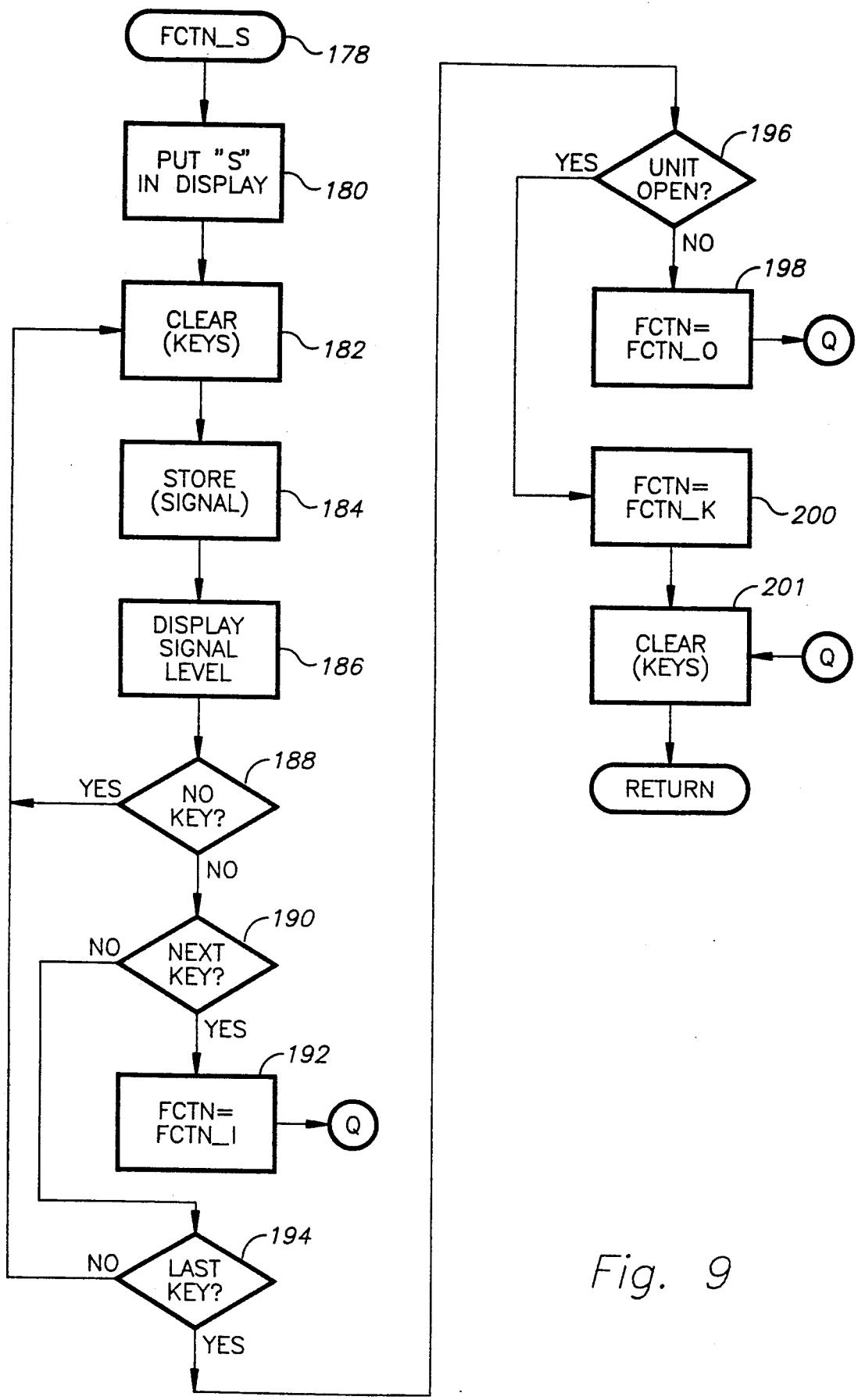
FIG. 9 is a flow diagram of the subroutine Signal Level.

The details of the Signal Level subroutine 178 will be discussed relative to the flow diagram shown on FIG. 9. The Signal Level subroutine (FCTN-S) begins by displaying the letter S, block 180, then clears the keys, block 182. After the keys are cleared, the subroutine will store the detected signal level, block 184, then display the signal level as indicated by block 186. The Signal Level subroutine will then inquire, decision block 188, if a key has been pressed. If no key has been pressed, the program will return to block 182, clear the keys, store the signal and display the signal level as previously described.

If a key is pressed, the subroutine will inquire if the pressed key is the NEXT key, decision block 190. If the pressed key is the NEXT key, the subroutine will set the next function to be executed (FCTN) as the Intensity function (FCNT-I) then jump to block 201, clear the keys, then return to the main program at 112. If the pressed key is not the NEXT key, the subroutine will inquire if the pressed key is the LAST key, block 194. If the pressed key is not the LAST key, the subroutine will return to block 182 and repeat the functions of blocks 182 through 192 or 194 until either the NEXT or LAST key is pressed.

If the LAST key is pressed, decision block 194, the subroutine will inquire, decision block 196, if the electro-optical control system 10 is OPEN. When the electro-optical control system is OPEN, the limits, time delays, and other functions may be changed. However, when the electro-optical control system is not OPEN [LOCKED], these functions may only be viewed, but not changed. If the electro-optical control system 10 is LOCKED, the OPEN function (FCTN-0) is set as the next subroutine to be executed, block 198, the subroutine clears the keys, block 201, and the subroutine returns to the main program. If the electro-optical control system 10 is OPEN, the Key Code Subroutine (FCTN-K) is set as the next function to be executed, block 200, then the keys are cleared, block 201 and the subroutine returns to the main program.

Figure 10:
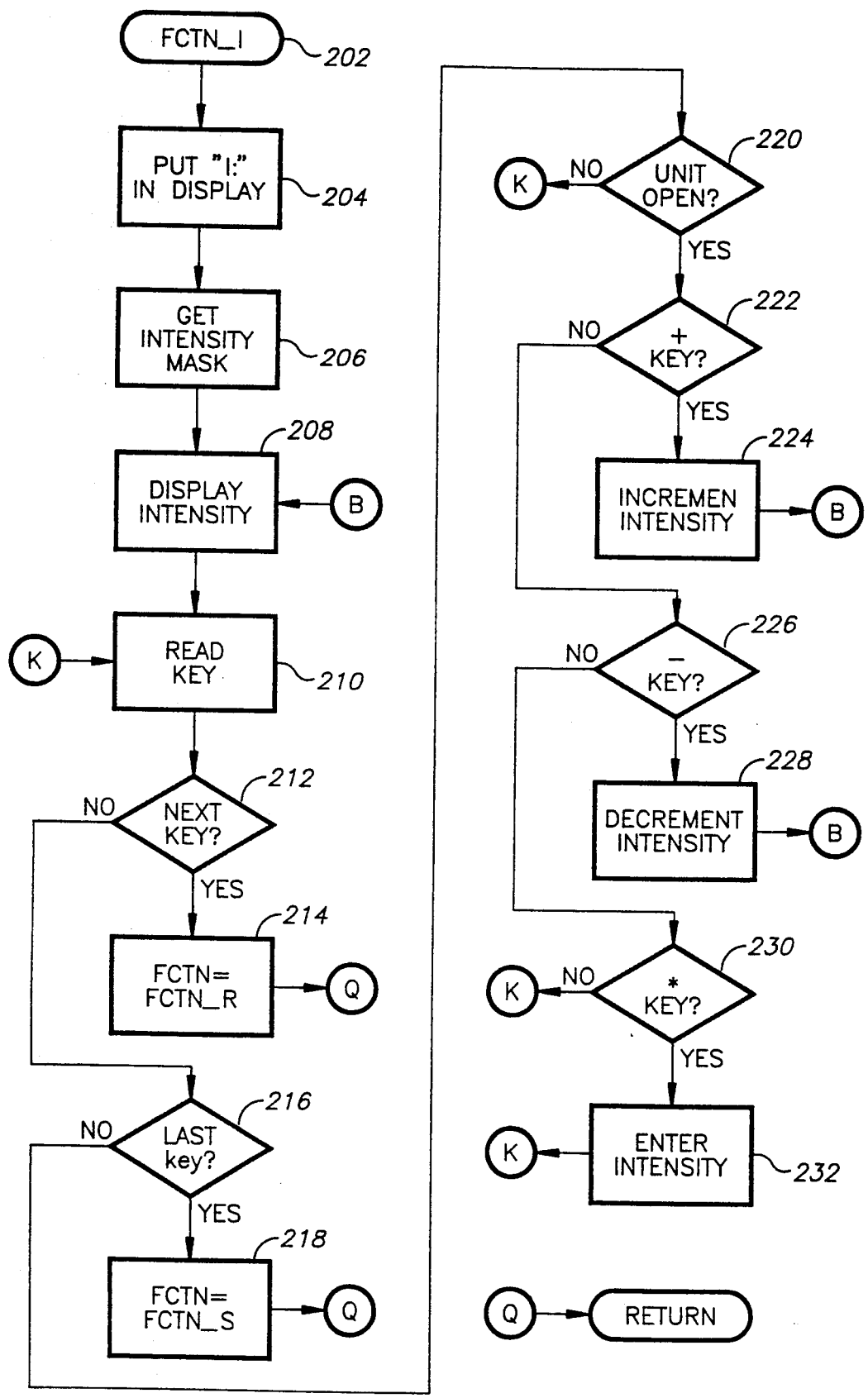
FIG. 10 is a flow diagram of the subroutine Intensity.

The details of the Intensity subroutine (FCTN-I) 202 are shown on FIG. 10. The Intensity subroutine sets the electrical power level to the light emitting diode 140 to high (HI), medium (MED) or low (LO). The intensity subroutine 202 begins by displaying the letter I in the alpha-numeric display 16, block 204, retrieves the current intensity from the memory using the stored mask, block 206, then displays the stored intensity level in the alpha-numeric display 16, block 208. After displaying the stored intensity level, the subroutine will read the keypad 18, block 210, to determine which key has been pressed. The subroutine then inquires, block 212 if the NEXT key has been pressed. If so, the subroutine sets the Response subroutine (FCTN-R) as the next function to be executed and the subroutine returns to the main program. Otherwise, the subroutine will proceed to inquire if the LAST key has been pressed, decision block 216. If the LAST key has been pressed the subroutine sets the Signal Level subroutine (FCTN-S) as the next function to be executed, block 218, then returns to the main program. Otherwise, the Intensity subroutine will proceed to inquire, decision block 220, if the electro-optical control system (UNIT) is OPEN. If the UNIT is not open, the portion of the Intensity subroutine 202 from block 210 to decision block 220 will repeat until either the NEXT or LAST key is pressed. However, if the UNIT is OPEN, the subroutine will proceed to inquire, decision block 222 if the (+) key has been pressed. If so, the subroutine will increment the intensity level to the next highest level, block 224, then return to block 208 and display the incremental intensity level. Otherwise, the subroutine will inquire, decision block 226 if the (−) key has been pressed. If the (−) key has been pressed, the subroutine will decrement the intensity level to the next lowest level, block 228, and return to block 208 and display the new intensity level. If the (−) key and the (+) key have not been pressed, the subroutine will inquire, decision block 230, if the (*) key has been pressed. If it has been pressed it will enter the intensity level into the EEPROM memory (located in the microprocessor 92), block 232, and return to block 210 until the NEXT, LAST or (*) key is depressed.

Figure 11A:
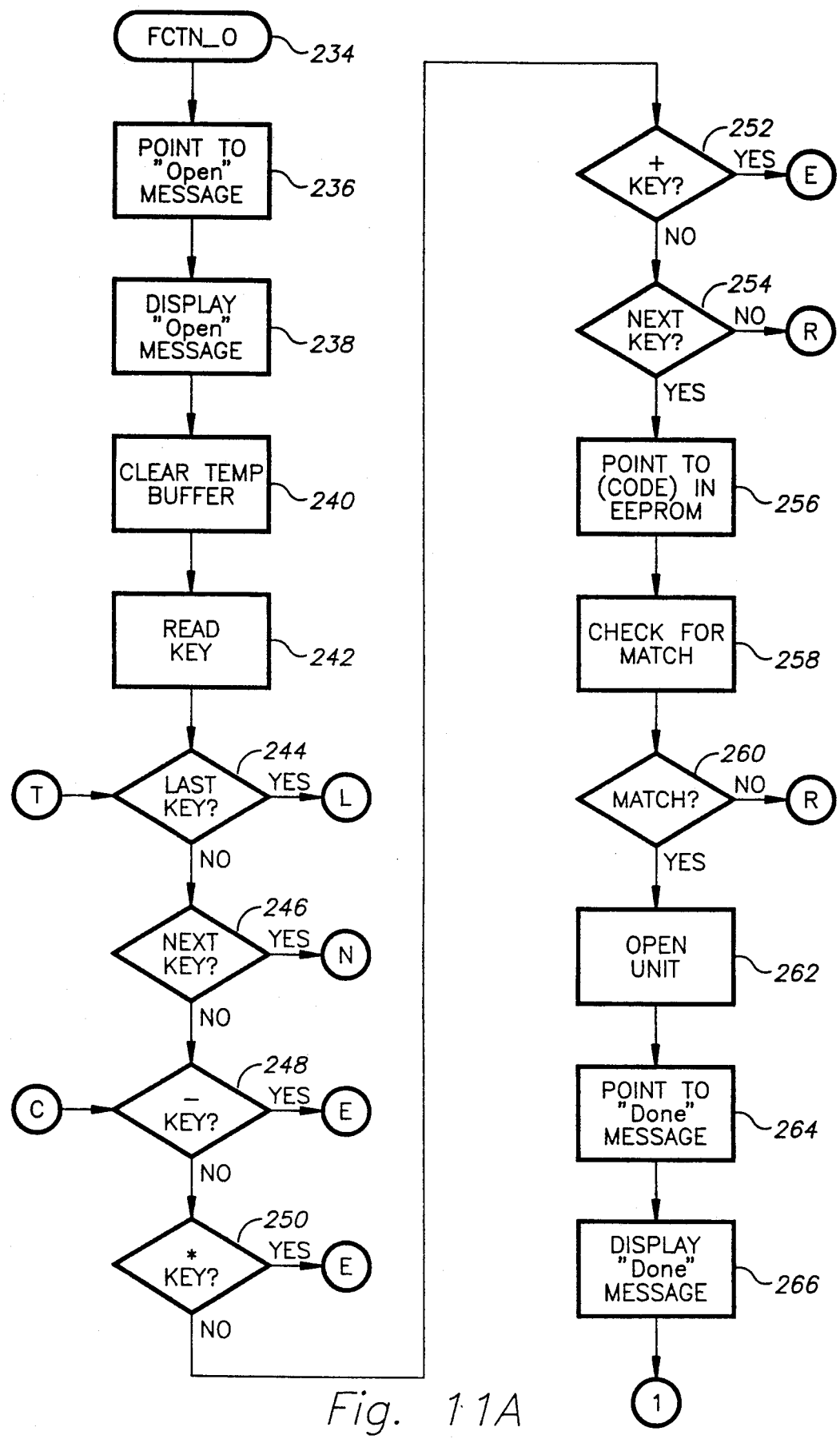
FIG. 11A and 11B are a flow diagram of the subroutine Open.
Figure 11B:
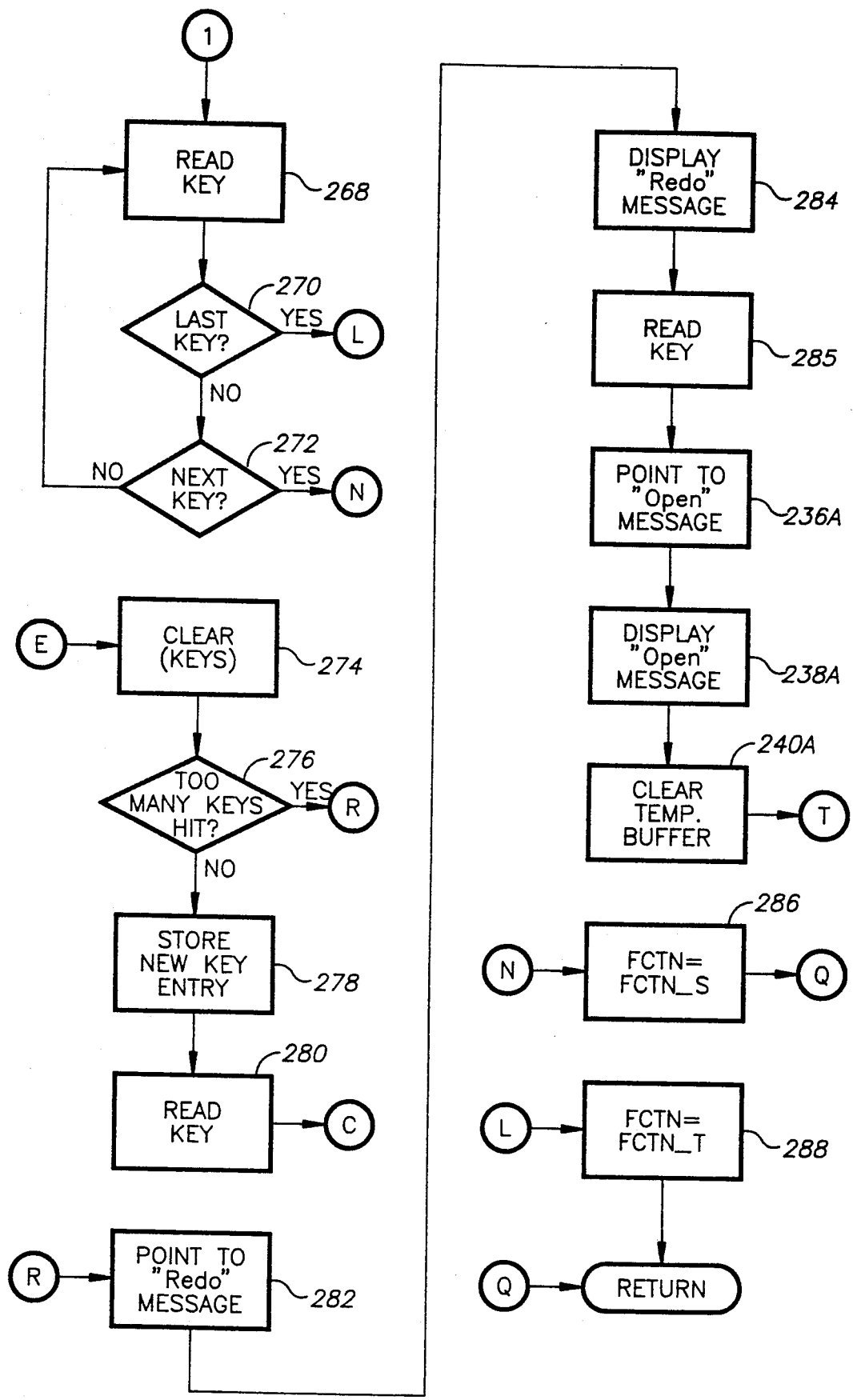

The details of the Open subroutine (FCTN-0) 234 are shown in FIGS. 11A and 11B. The Open subroutine unlocks the electro-optical control system 10 when it is in the LOCKED state. The Open subroutine begins by locating the "Open" message in the memory, block 236, then displaying the "Open" message on the alpha-numeric display 16, block 238. The subroutine then clears the temporary buffer, block 240, reads the keypad 18, block 242, to identify which key has been pressed, then inquires, block 244, if the pressed key is the LAST key. If the key is the LAST key the subroutine sets the Test subroutine, block 288, as the next subroutine to be executed then returns to the main program. If not, the subroutine inquires, decision block 246, if the pressed key is the NEXT key. If it is, the subroutine sets the Signal Level subroutine (FCTN-S) as the next subroutine to be executed, block 286, and returns to the main program. If the pressed key is not the LAST key or the NEXT key, the subroutine inquires, decision block 248, if it is the (−) key. If it is, the subroutine jumps to block 274 and clears the keys on the keypad 18 then inquires, decision block 276, if too many keys have been pressed.

The code for opening the electro-optical control system 10 may consist of up to nine (9) digits. If the number of key entries exceeds the number of digits in the stored code, the subroutine will jump to block 282, locate the "Redo" message in the memory, display the "Redo" message, block 284, then read the keypad, block 285, to determine if any key has been pressed. Upon the pressing of any key, the subroutine will locate the "Open" message, block 236A, display the "Open" message, block 238A, clear the temporary buffer, block 240A, then return to block 244.

Returning to decision block 276, if the number of keystrokes were not too many, the subroutine stores the new key entry in a temporary buffer, block 278, then proceeds to read the next key pressed, block 280, and returns to decision block 248.

The subroutine will then successively inquire, decision blocks 248, 250, and 252, if the pressed key is the (−) key, (*) key, or (+) key. If the key pressed is a (−) key, (*) key or (+) key the program will jump to block 274 and either store the key entry, block 278, or generate a "Redo" message, as previously discussed. If, after being returned to block 248 at least once, and the (−) key, (*) key or (+) key have not been pressed, the subroutine will inquire, decision block 254, if the NEXT key has been pressed. If it has, the subroutine will locate the existing code in the memory, block 256, compare it with the code stored in the temporary buffer, block 258, and inquire, decision block 260, if they match. If the code stored in the temporary buffer matches the code stored in the memory (EEPROM) the electro-optical control system 10 is set OPEN, block 262, and a "Done" message is displayed, blocks 264 and 266. The subroutine will then read the keyboard to determine which key has been pressed subsequent to the display of the "Done" message. The subroutine will then sequentially inquire if the pressed key is the LAST key, decision block 270, or if the pressed key is the NEXT key, decision block 272. If the NEXT key is the key pressed the subroutine will set the Signal Level function (FCTN-S), block 286, as the next function to be executed, however, if the pressed key is the LAST key, the subroutine will set the Test function (FCTN-T) block 288 as the next function to be executed.

Figure 12A:
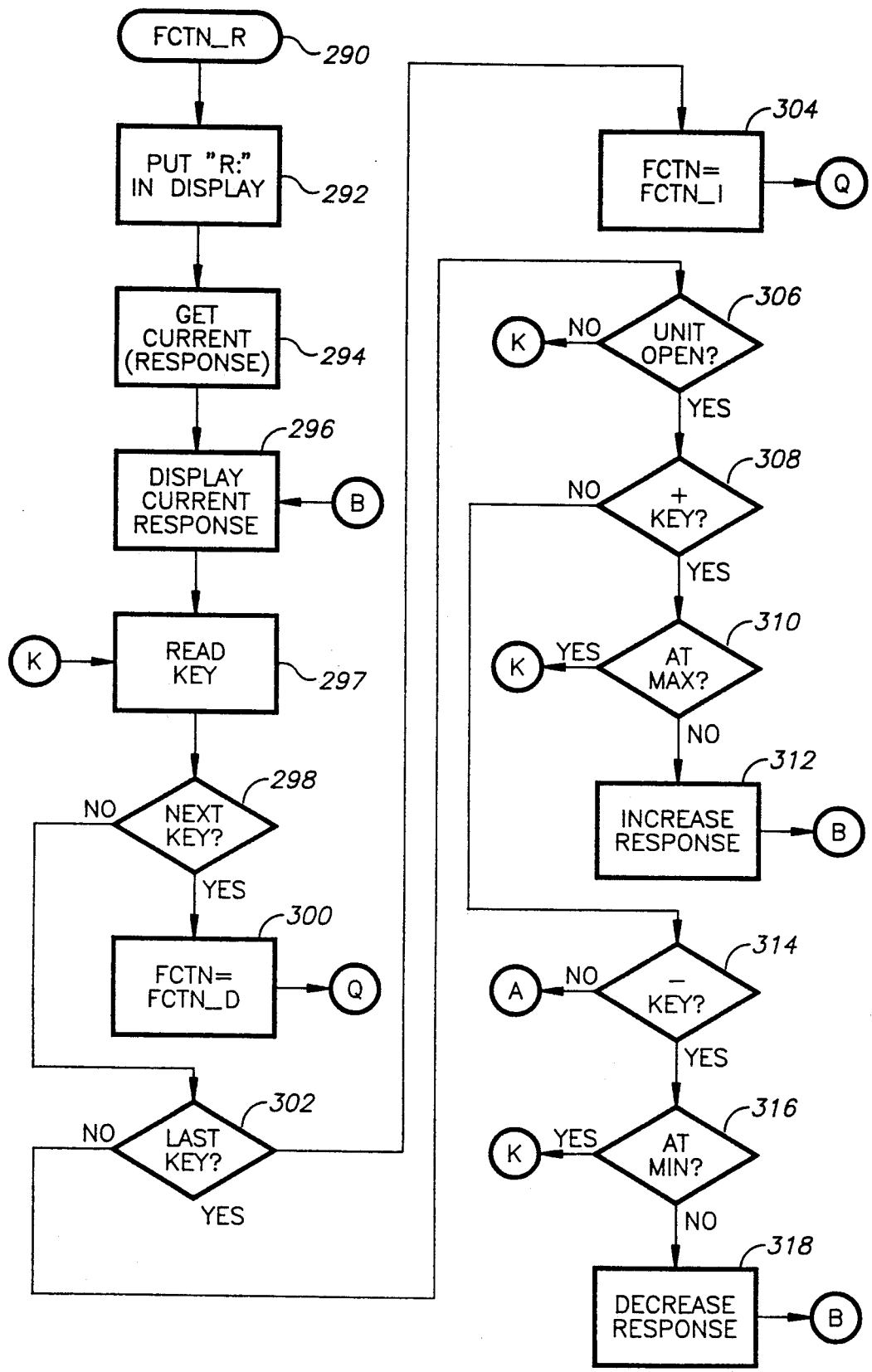
FIGS. 12A and 12B are a flow diagram of the subroutine Response.
Figure 12B:
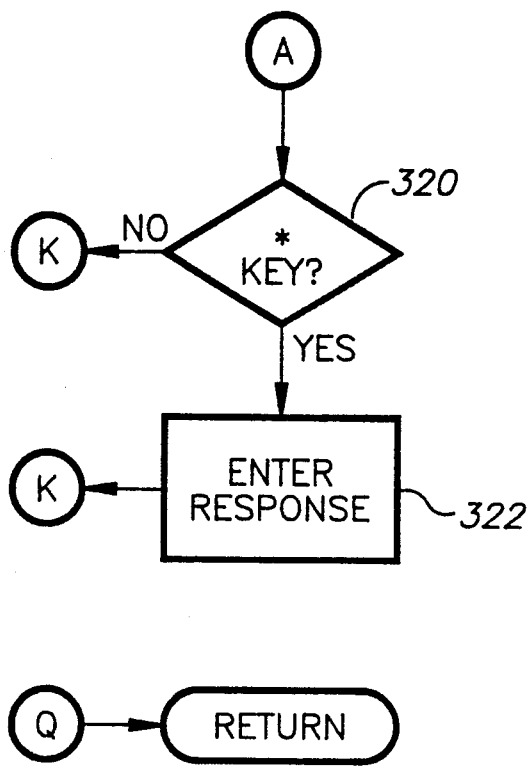

The details of the Response Subroutine (FCNT-R) 290 in the flow diagram is illustrated on FIGS. 12A and 12B. The Response function 290 determines the amount of digital filtering used in processing the signals received by the photodiode 150 to be used in the generation of the signal level. As the Response number decreases the signal becomes more stable but it also becomes slower to change. The programming range of the Response is from 1 (slowest) to 8 (fastest).

The Response function 290 begins by placing the letter R in the alpha-numeric display 16, block 292, then retrieving and displaying the current response number (1 through 8) in the alpha-numeric display, blocks 294 and 296. The subroutine will then read the keypad, block 297, and inquire if the NEXT key has been pressed, decision block 298. If the NEXT key has been pressed, the subroutine sets the Enable Delays function (FCTN-D) as the next function to be executed, block 300, then returns to the main program 100. Otherwise, the subroutine proceeds to inquire, decision block 302, if the LAST key has been pressed. If the LAST key has been pressed, the subroutine enters the Intensity function (FCTN-I) as the next function to be executed, block 304. If neither the NEXT or LAST keys have been pressed, the subroutine will inquire if the electro-optical control system 10 is OPEN. If the electro-optical control system 10 is not OPEN, the subroutine will jump back to block 297 and continue to recycle until either the NEXT or LAST button is pressed. This prohibits the amount of digital filtering from being changed when the electro-optical control system 10 is locked.

If the electro-optical control system 10 is OPEN, the Response subroutine will inquire, decision block 308, if the (+) key has been pressed. If the (+) key has been pressed, the subroutine will inquire, decision block 310, if the response has a maximum value, ie., 8. If not, the subroutine will increase the response, block 312, then return to block 294 and display the increased response number. If the response has a maximum value, decision block 310, the subroutine will return to block 297 and read the next key pressed.

Returning to decision block 308, if the (+) key was not pressed, the subroutine will jump to decision block 314 and inquire of the (−) key has been pressed. If the (−) key has been pressed, the subroutine will inquire, decision block 316, if the response number has its minimum (MIN) value. If the response number is not the minimum number, the response number will be decreased, block 318 then displayed in the alpha-numeric display 16, as indicated by block 296. If the pressed key is neither a (+) key or a (−) key, the subroutine will inquire, decision block 320, if the pressed key is the (*) key. If so, the response shown on the alpha-numeric display is recorded in the EEPROM memory block 322, then the subroutine will return to block 297 and continue to recycle until either the NEXT or LAST key is pressed.

Figure 13:
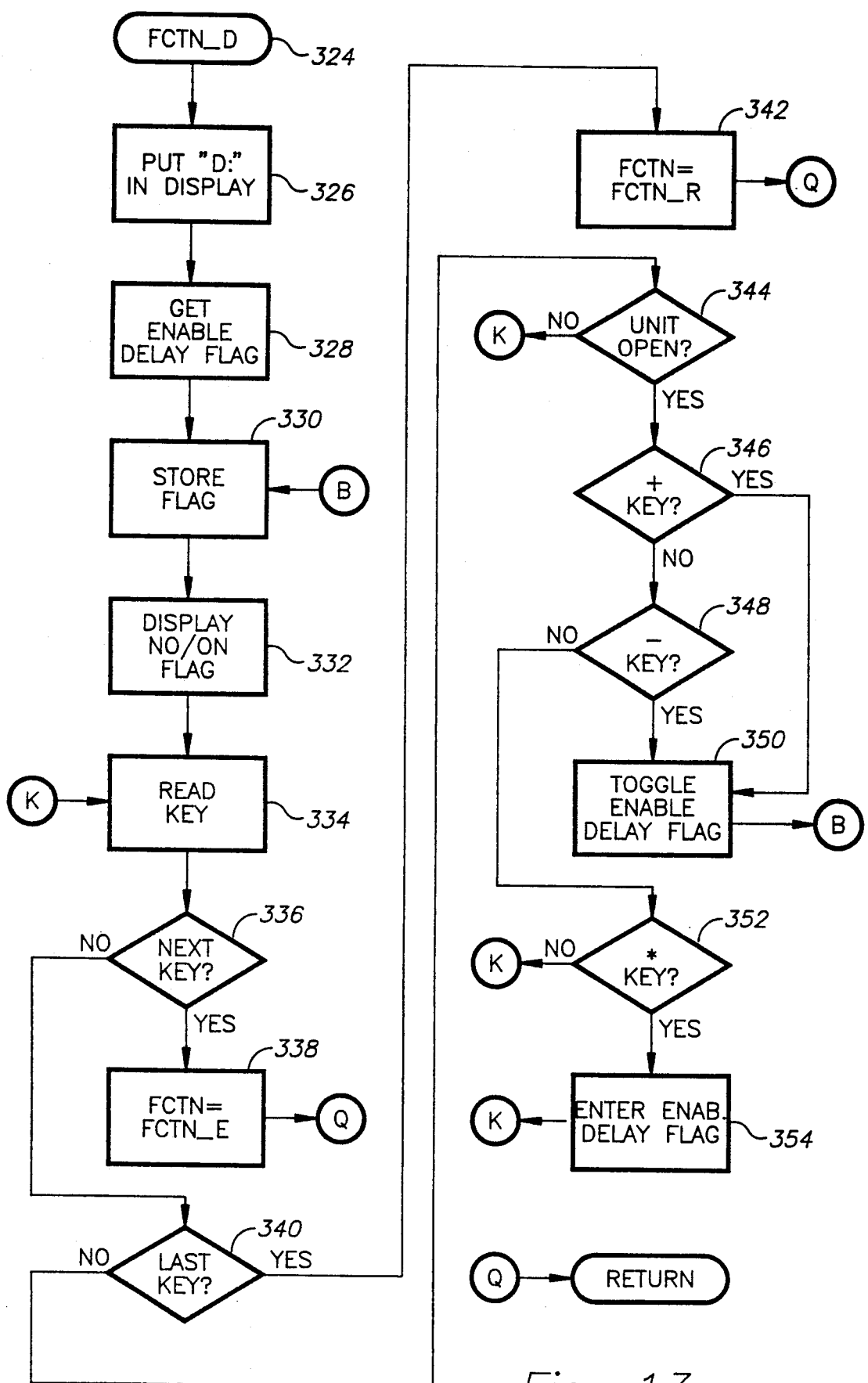
FIG. 13 is a flow diagram of the subroutine Enable Delays.

The details of the Enable Delays subroutine (FCTN-D) 324 are presented in the flow-diagram shown in FIG. 13. This function toggles a two state switch between ON, displayed as "On", and OFF, displayed as "No". OFF, "No", disables all delays and inhibits their display. The Enable Delays function 324 begins by displaying the letter D in the alpha-numerical display 16, block 326, retrieving the Enable Display flag from the EEPROM memory, block 328, temporarily storing the state of the Enable Display flag in a buffer, block 330, then displaying the state of the Enable Delay flag on the alpha-numeric display 16, block 332. The subroutine will then proceed to read the key pressed, block 334, and sequentially inquire if the NEXT or LAST keys have been pressed, decision blocks 336 and 340, respectively. If the NEXT key has been pressed, the subroutine will set the Enable Alternate Delays function (FCTN-E) as the next function to be executed, block 338, or if the LAST key has been pressed, the subroutine will set the Response function (FCTN-R) as the next function to be executed. If neither the NEXT or LAST keys have been pressed, the subroutine will proceed to inquire, decision block 344, if the electro-optical control system 10 is OPEN. If the electro-optical control system 10 is not OPEN, the subroutine will return to block 334 and continue to recycle until either the NEXT or LAST keys are pressed. If the electro-optical control system 10 is OPEN, the subroutine will inquire if either the (+) key or (−) key have been pressed, decision blocks 346 and 348, respectively. If either the (+) or the (−) key has been pressed, the Enable Delay flag is toggled to the alternate state, block 350, and the new state of the Enable Delay flag is temporarily stored in the buffer, block 330, and displayed, block 332. If neither the (+) or (−) key have been pressed the subroutine will inquire, decision block 352, if the (*) key has been pressed. If it has, the current state of the Enable Delay flag stored in the buffer is entered, block 354, into the EEPROM memory as the state of the Enable Delay flag. The subroutine will then return to block 344 and continue to cycle until either the NEXT or LAST key is pressed.

Figure 14A:
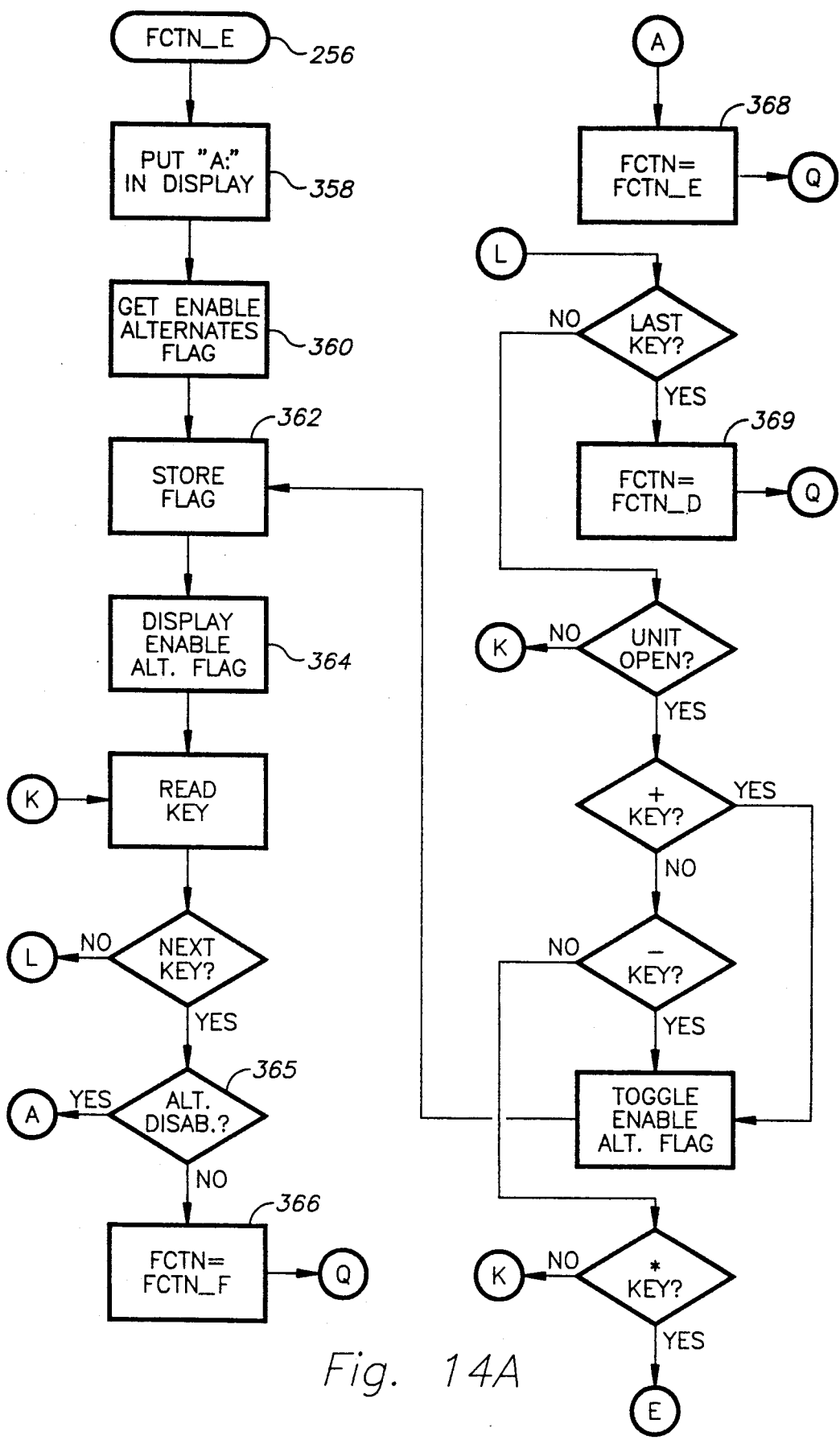
FIGS. 14A and 14B are a flow diagram of the subroutine Enable Alternate.
Figure 14B:
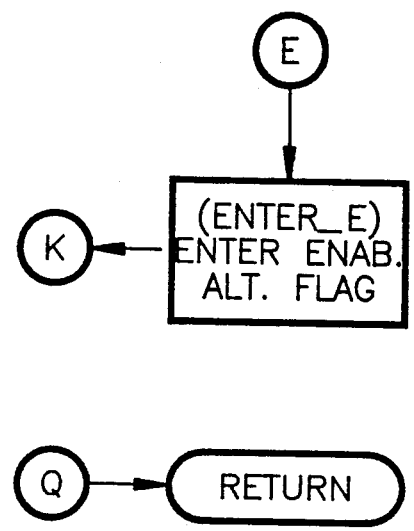

The Enable Alternates subroutine (FCTN-E) 256 toggles a two-state switch between OFF "No" and ON "On" state. The OFF state disables the alternate limits and inhibits their display and disallows the Force input function. The Enable Alternates subroutine 256 is shown in FIGS. 14A and 14B and is substantially the same as the Enable Delay subroutine shown on FIGS. 13A and 13B with the exception that the state of the Alternate Disable flag is displayed on the alpha-numeric display 16 proceeded by the letter A, as indicated by blocks 358 through 364. The next function to be executed in response to the NEXT key being pressed is the Alternate Disable flag, decision block 365. If the alternates are disabled, the next function to be executed is the Enable Alternates function (FCTN-E), block 368. If not, the next function to be executed is the Force Input function (FCTN-F), block 366, and the function to be executed in response to depressing the LAST key is the Enable Delays function (FCTN-D), block 369. Therefore, the Enable Alternates subroutine need not be discussed in detail for an understanding of this subroutine.

Figure 15:
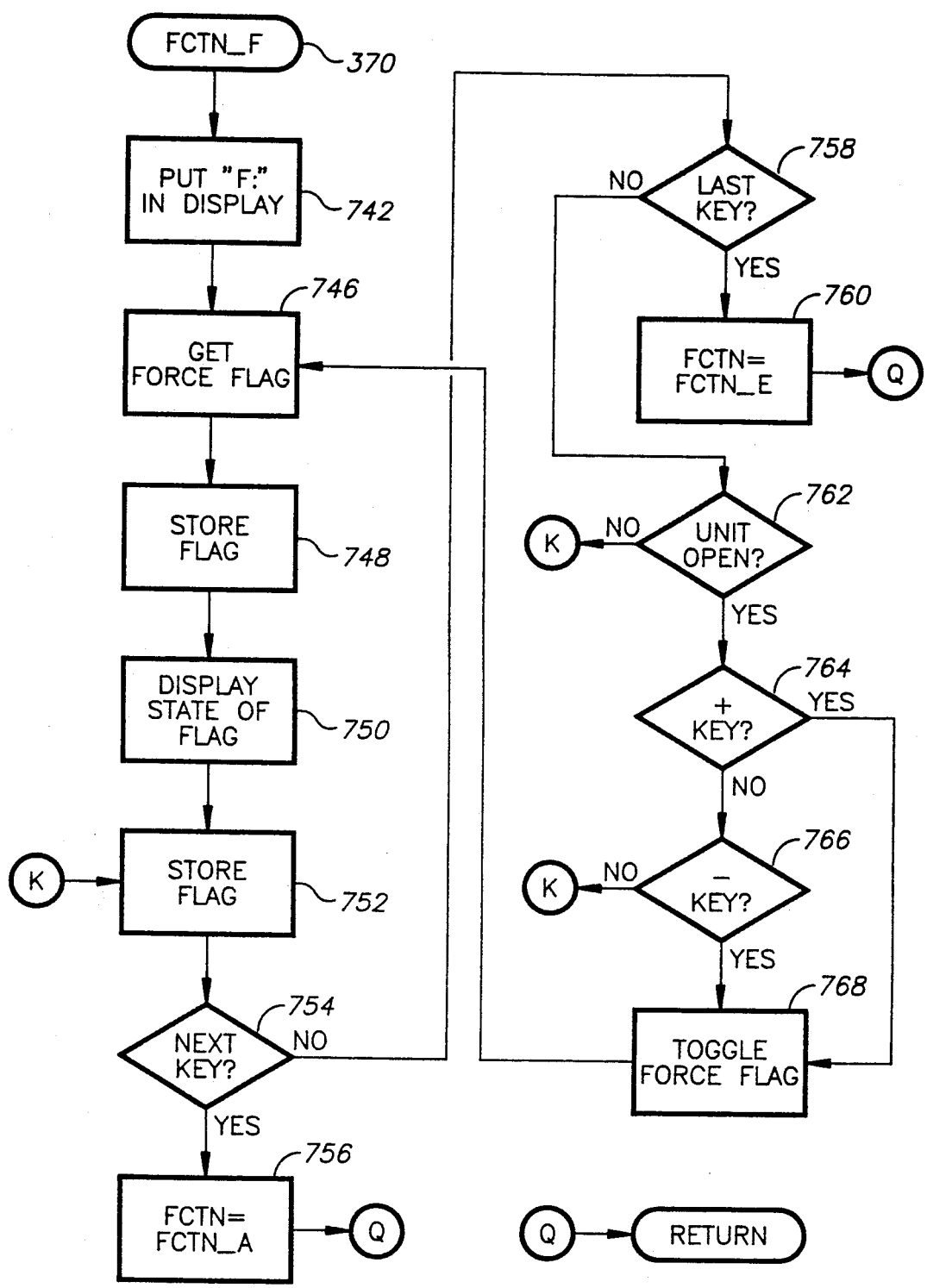
FIG. 15 is a flow diagram of the subroutine Force.

The details of the Force Input subroutine (FCTN-F) 370 are shown in the flow diagram illustrated in FIG. 15. The Force Input subroutine toggles a two state switch between OFF "No" and ON "On" when the input is forced ON, the alternate limits replace the regular limits just as if the external input has been energized and the EXT IN indicator lamp blinks to indicate that the electro-optical control system 10 has been forced ON.

The initialization subroutine powers-up the electro-optical control system 10 in the unforced state. The Force Input subroutine 370 is similar to the Enable Delay subroutine 256. The Force Input subroutine 370 begins by displaying the letter F in the display, block 742, retrieving the state of the Force flag, block 746, storing the Force flag in a buffer, block 748, displaying the state of the Force flag ("No" or "On"), block 750, then reading the keypad to determine which key has been pressed. The subroutine will then inquire, decision blocks 754 and 758, if the NEXT or LAST key has been pressed to set either the Lower Limit A subroutine or the Enable Alternates subroutine as the next subroutine to be executed, blocks 756 and 760, respectively, then return to the main program 100. If neither the NEXT or LAST key is pressed, the subroutine will then inquire, decision block 762 if the electro-optical control system 10 is OPEN. If the electro-optical control system 10 is OPEN pressing either the (+) or (−) key, blocks 764 and 766 will toggle the state of the Force flag block 768. After setting the state of the Force flag the subroutine will return to blocks 746, 748 and 750 and retrieve, store in the buffer and display the state of the Force flag. If neither the (+) nor (−) key is pressed the subroutine will return to block 752 and await the pressing of either the NEXT or LAST key.

Figure 16A:
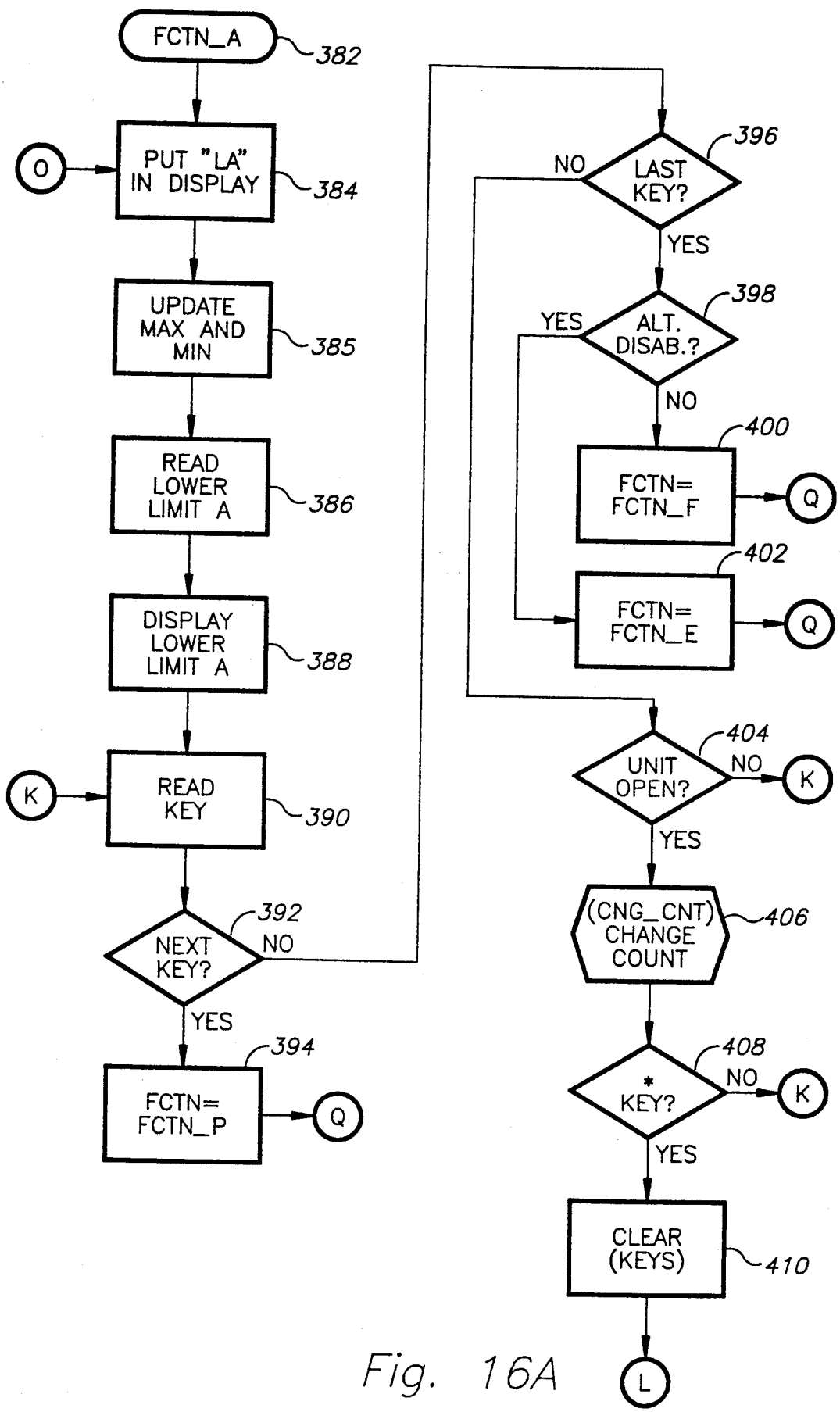
FIGS. 16A and 16B are a flow diagram of the subroutine Lower Limit A.
Figure 16B:
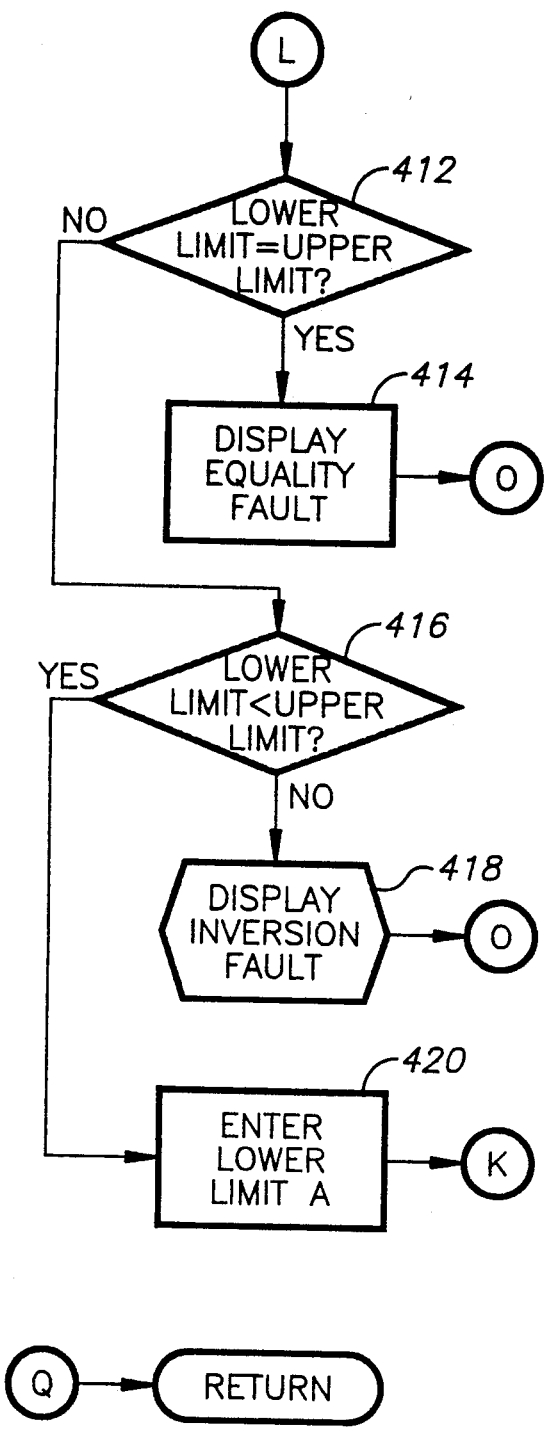

The details of the Lower Limit A subroutine are shown in the flow diagram shown in FIGS. 16A and 16B. During normal operation, the Signal Level is continuously compared to both a Lower Limit A and an Upper Limit A, if the Signal Level is at or between these Upper and Lower Limits A, the OUT A indicator and its corresponding output are turned ON. Conversely, if the Signal Level is below the Lower Limit A or above the Upper Limit A, the OUT A indicator and its corresponding output are turned OFF.

The Lower Limit A can be adjusted between 0 and 99% while the Upper Limit A may be adjusted between 1 and 100%. The subroutine will not allow the value of the Lower Limit A to be greater than the value of the Upper Limit A.

The Lower Limit A subroutine (FCTN-A) 382 begins with displaying the letters LA in the alpha-numeric display 16, block 384, updating the maximum and minimum values of the limits of A, block 385, then reading the Lower Limit A, block 386, and displaying the current value of the Lower Limit A in the alpha-numeric display, block 388. The subroutine then reads the keypad, block 390, and inquires, decision block 392, if the NEXT key has been pressed. If it has, the Upper Limit A function (FCTN-P) is entered as the next subroutine to be executed, block 394. Alternatively, the subroutine inquires if the LAST key has been pressed, decision block 396. If it has, the subroutine inquires if the alternate limits are disabled, decision block 398. If the alternate limits are not disabled, the Force Input subroutine (FCTN-F) is entered as the next function to be executed, block 400. Otherwise, the Enable Alternates subroutine (FCTN-E) is entered, block 402, as the next function to be executed and the subroutine will return to the main program 100.

The subroutine will inquire, decision block 404, if the electro-optical control system 10 is OPEN if neither the NEXT or LAST key have been pressed. When the electro-optical control system 10 is not OPEN, the subroutine will return to block 390 and continue to cycle until either the NEXT or LAST key is pressed. If the electro-optical control system 10 is OPEN the subroutine will execute subroutine Change Count (CNG-CNT) block 406 then inquire, decision block 408, if the (*) key has been pressed.

The Change Count subroutine 406 will permit the value of the Lower Limit A to be changed. The details of the Change Count (CNG-CNT) subroutine will be discussed relative to FIGS. 17A-17C.

If the (*) key has not been pressed, the Lower Limit A function will return to block 390 and recycle. After the (*) key is pressed, the subroutine will clear the key, block 410, then inquire in a sequential order, whether the Lower Limit A is equal to the Upper Limit A then whether the Lower Limit A is greater than the Upper Limit A, decision blocks 412 and 416 respectively. If the Lower Limit A is equal to Upper Limit A, the subroutine will cause an equality fault to be displayed, block 414. In a like manner, if the Lower Limit A is greater than the Upper Limit A the subroutine causes an inversion fault to be displayed, block 418, and returns to block 384. The Lower Limit A will be entered into the EEPROM memory, block 420, when the lower limit A is determined to be less than the Upper Limit A in decision block 416. After the Lower Limit A is stored in the EEPROM memory, the Lower Limit A subroutine will return to block 390 and continue t cycle until either the NEXT or LAST key is pressed.

Figure 17A:
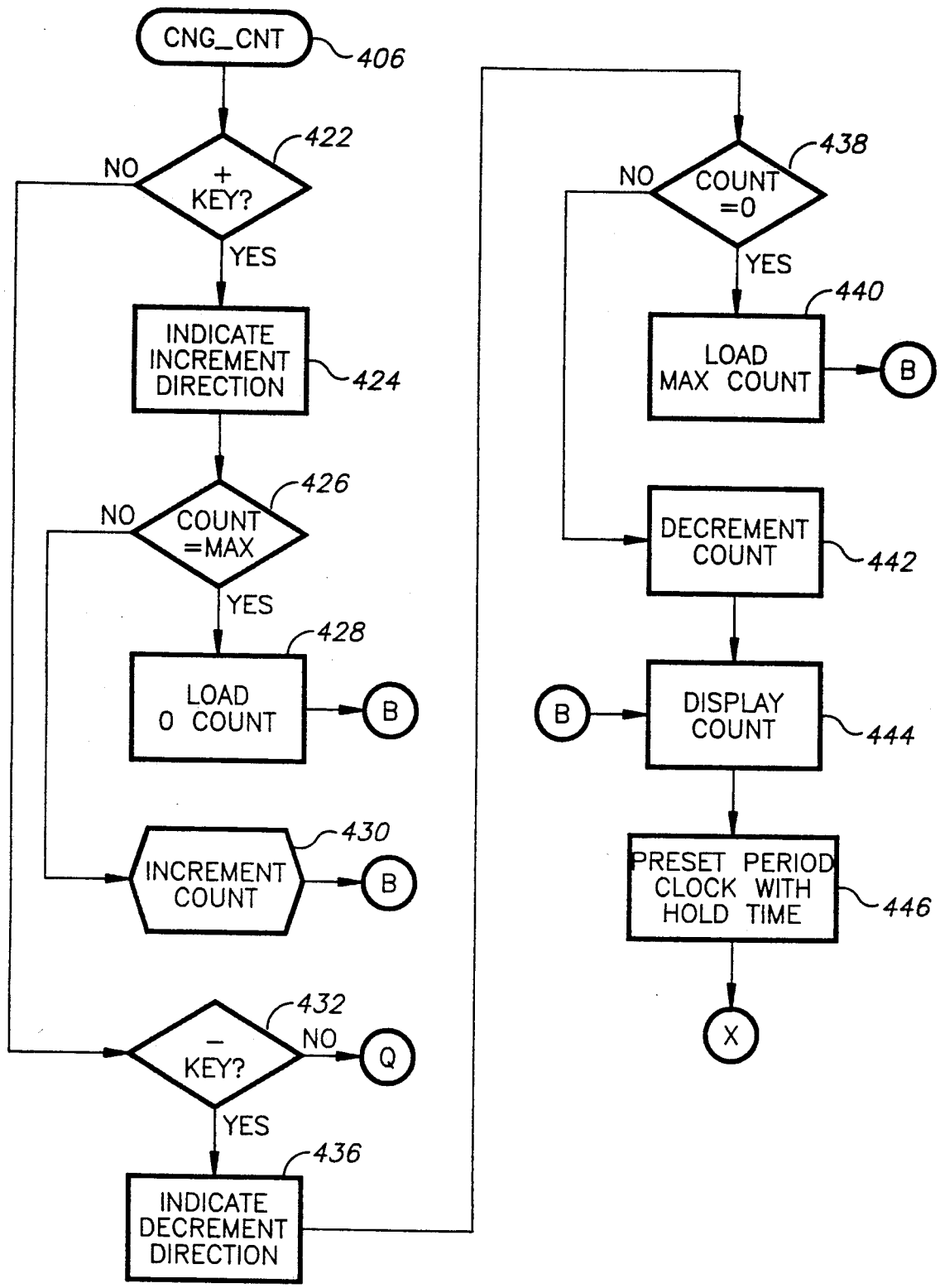
FIGS. 17A–17C a flow diagram of the subroutine Change Count.
Figure 17B:
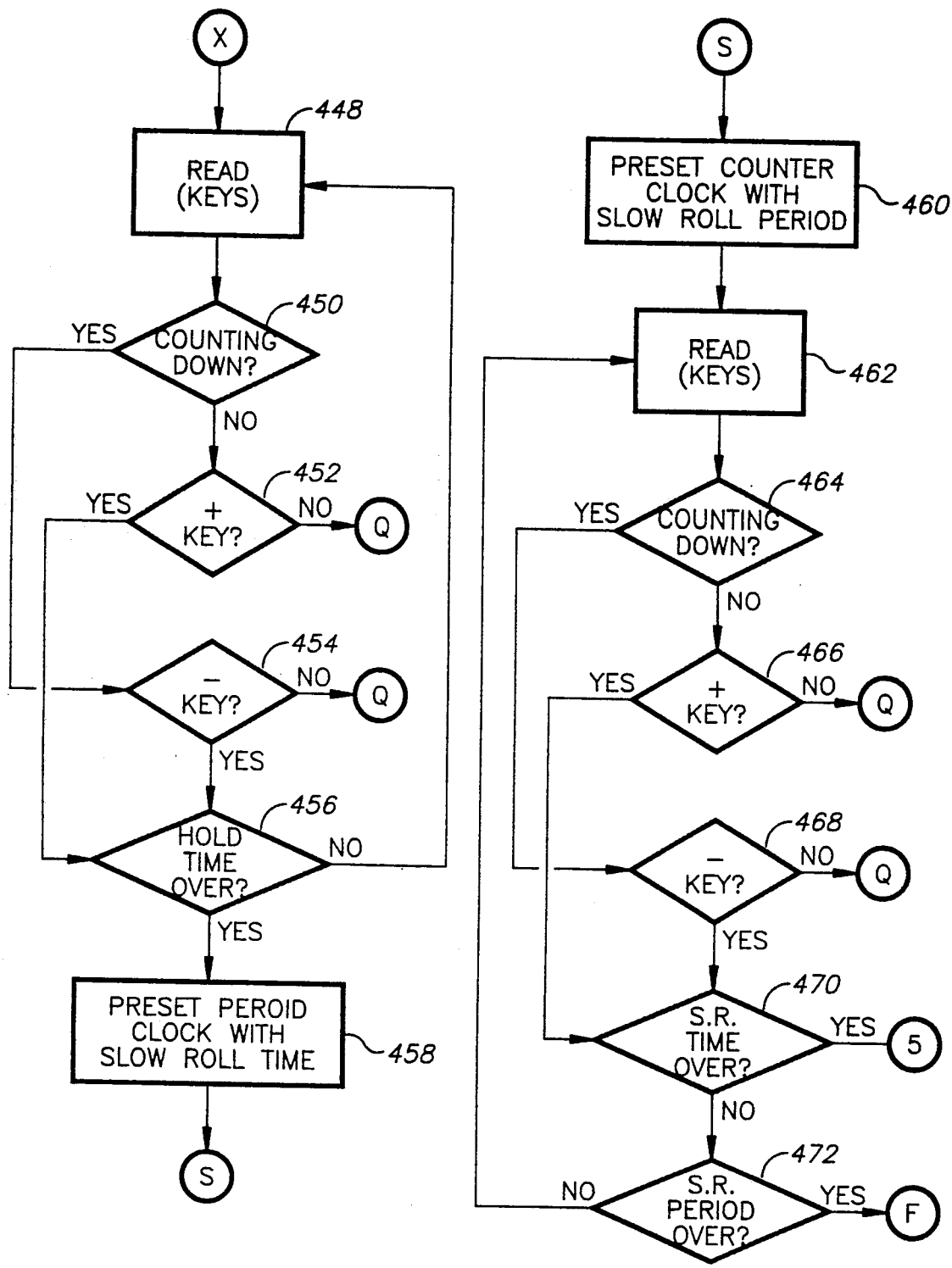
Figure 17C:
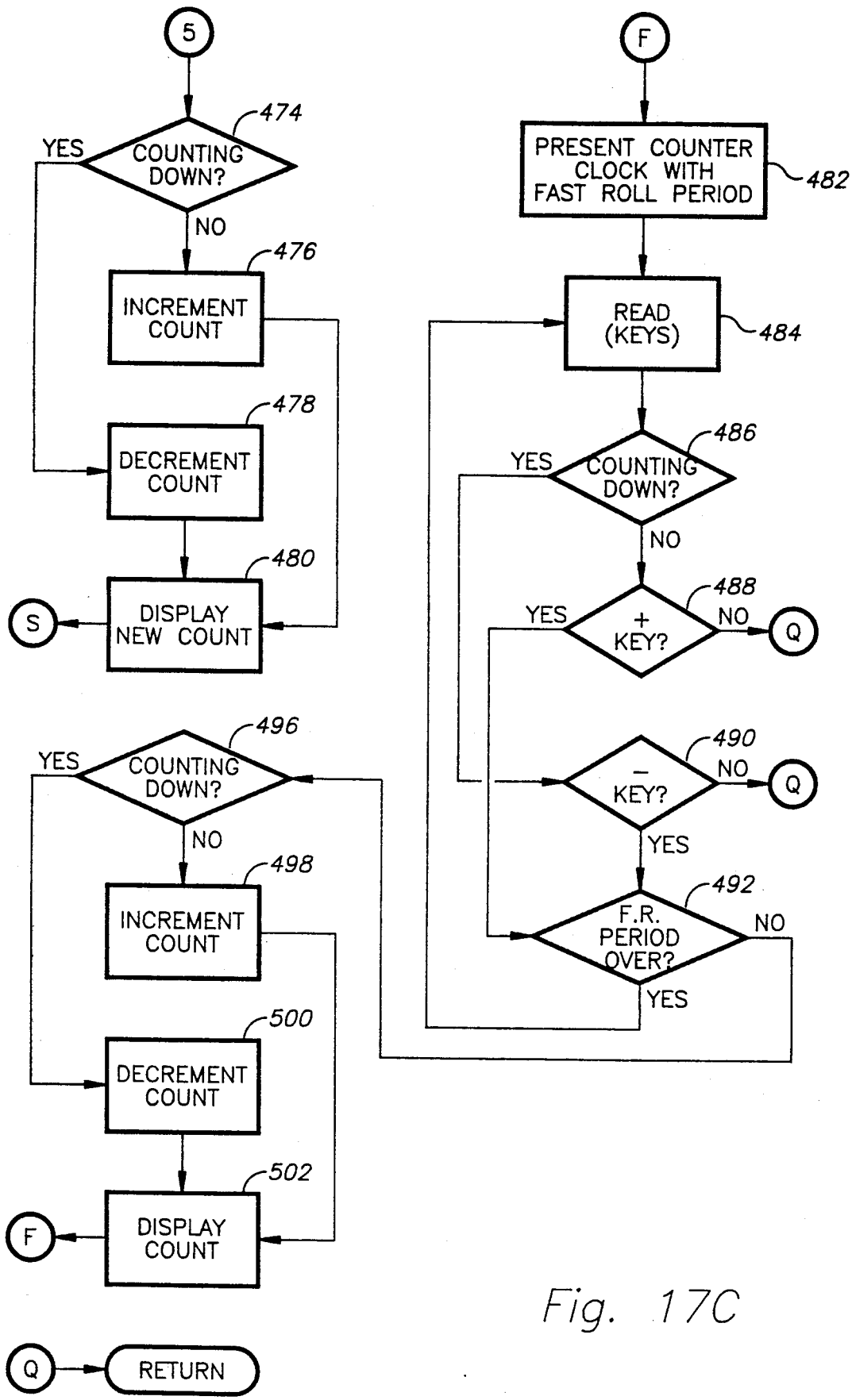

The details of the Change Count subroutine (CNG-CNT) 406 are shown in the flow diagram of FIGS. 17A-17C. The Change Count subroutine, as previously indicated, permits the user to increase or decrease the value of the limits.

The Change Count subroutine 406 begins by inquiring, decision block 422, if the (+) key has been pressed. If it has, the subroutine will set the pointer in the increment direction, block 424, then inquire, decision block 426, if the count equals maximum count. If the count is equal to the maximum count, the counter is loaded with zero (0) counts and the count is displayed as indicated by block 444. If the count is not equal to the maximum count, the subroutine will increment the count in the counter, block 430, then display the incremented count as indicated in block 444, returning to decision block 422. If the (+) key is not the one pressed, the subroutine inquires if the (−) key is pressed, decision block 432. If the (−) key is not pressed the subroutine will return to the main program. If the (−) key has been pressed, the pointer will be set to indicate the decrement or point down direction, block 436, then inquire, decision block 438, if the count is equal to zero (0). If the count is equal to zero (0), the counter is loaded with the maximum count, block 440, then the maximum count is displayed as indicated in block 444. If the count is not equal to zero (0), the subroutine decrements the count, block 442, then displays the decremented count, as indicated by block 444.

After the count is displayed, the subroutine presets a period clock with a hold time, block 446, reads the keys, block 448, then inquires whether the direction pointer is set to the decrement (count-down) position as indicated by decision block 450. If the direction pointer is set in the decrement position, the subroutine will proceed to inquire if the (−) key is pressed, decision block 454. If the (−) key is pressed, the subroutine will inquire, decision block 456, if the hold time has expired. Otherwise, the subroutine will return to the program which called it up. This subroutine may be called up by the Upper Limit A function (FCTN-P), the Alternate Lower Limit function a (FCTN-a), the Alternate Upper Limit a function (FCTN-p), the Lower Limit B function (FCTN-B), the Upper Limit function B (FCTN-Q), the Alternate Lower Limit b function (FCTN-b) and the Alternate Upper Limit b function (FCTN-q).

If the direction pointer is not pointing to the decrement direction, decision block 450, the subroutine will inquire if the (+) key is being pressed, decision block 452. If the (+) key is not being pressed, the subroutine will return to the subroutine which called it up. However, if the (+) key is being pressed, the subroutine will inquire if the hold time has expired, decision block 456. After the hold time has expired, the subroutine presets the period clock to a slow roll time, block 458, and presets the counter clock to a slow roll period, block 460. The subroutine then reads the keys, block 462, and inquires if the direction pointer is pointing in the decrement or counting down direction. The subroutine will inquire, decision block 468, if the (−) key is being pressed. Otherwise, the subroutine will inquire, decision block 466 if the (+) key is being pressed. If neither the (−) or (+) key is being pressed, the subroutine will return to the program which called it up. If the direction counter is pointing in the count-down position and the (−) key is pressed or the direction pointer is pointing in the count-up position and the (+) key is pressed, the subroutine will inquire, decision block 470, if the slow roll time is over. If it is not, the subroutine will inquire, decision block 472, if the slow roll period is over. If it is not, the subroutine will continue to repeat the steps shown in blocks 462 through 472 until the slow roll period is over or the pressed key is released. A slow roll period is the time required for the counter to be changed by one digit. If the slow roll period is over, the subroutine will proceed, again inquire if the direction pointer is pointing in the count down direction, decision block 474, decrement or increment the counter as determined by the state of the direction pointer, blocks 476 and 478 respectively, display the new count, block 480 then return to block 460, preset the counter clock, and repeat the cycle until the slow roll (SR) time has expired.

After the slow roll time has expired, the Change Count subroutine will preset the counter clock with a fast roll (FS) period, block 482, read the keys, block 484, then inquire, decision block 486, if the direction pointer is pointing in the count-down state. If the direction pointer is in the count-down state, and the (−) key is not pressed, decision block 490, the subroutine will return to the subroutine which called it up. Otherwise, the subroutine will proceed to inquire if the FR period is over, decision block 492. In a like manner, if the direction pointer is not in the count-down state and the (+) key is not pressed, decision block 488, the subroutine will return to the function that called it up. Otherwise, it will proceed to inquire if the fast roll period has expired, decision block 492. If the fast roll period has not expired, the subroutine will inquire, decision block 496, if the direction pointer is in the count-down state, increment or decrement the counter, blocks 498 or 500, display the new count, block 502, then return to block 482. When the fast roll period expires, the subroutine will return to block 484 and continue to cycle through to block 492 until the pressed (−) or (+) key is released.

The Change Count subroutine, 406, as indicated above, will change the count by a single digit if either a (−) or (+) key is momentarily pressed for a time shorter than the period time of the counter clock. If the key remains pressed after the expiration of the counter clock's period, the subroutine will increment or decrement the counter for a fixed period (slow roll) of time at a slow rate determined by the slow roll period. After the slow roll time expires, the count will be changed at a much faster rate until the pressed key is released, or until the maximum or minimum count is reached.

Figure 18A:
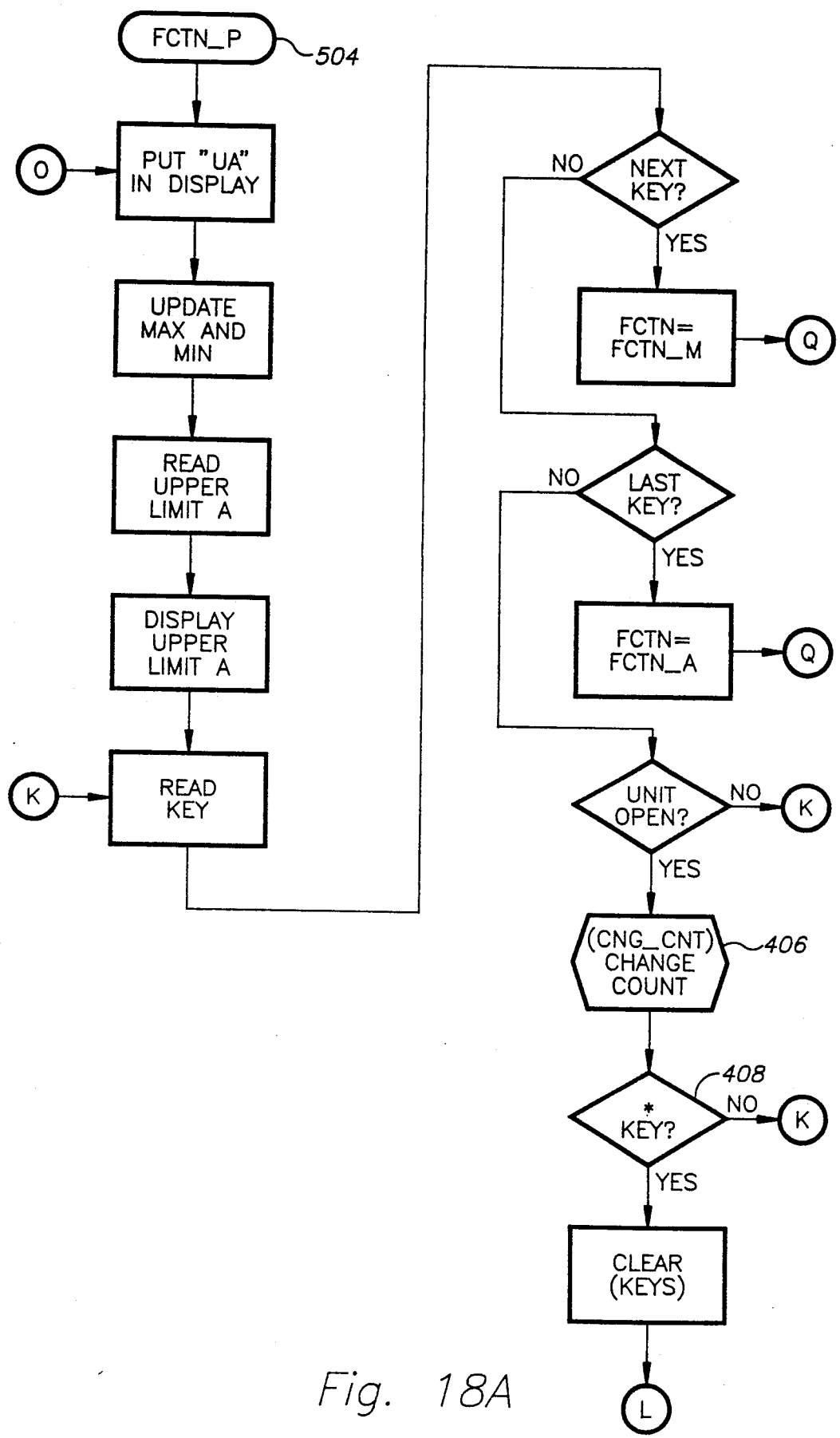
FIG. 18A–18B are a flow diagram of the subroutine Upper Limit A.
Figure 18B:
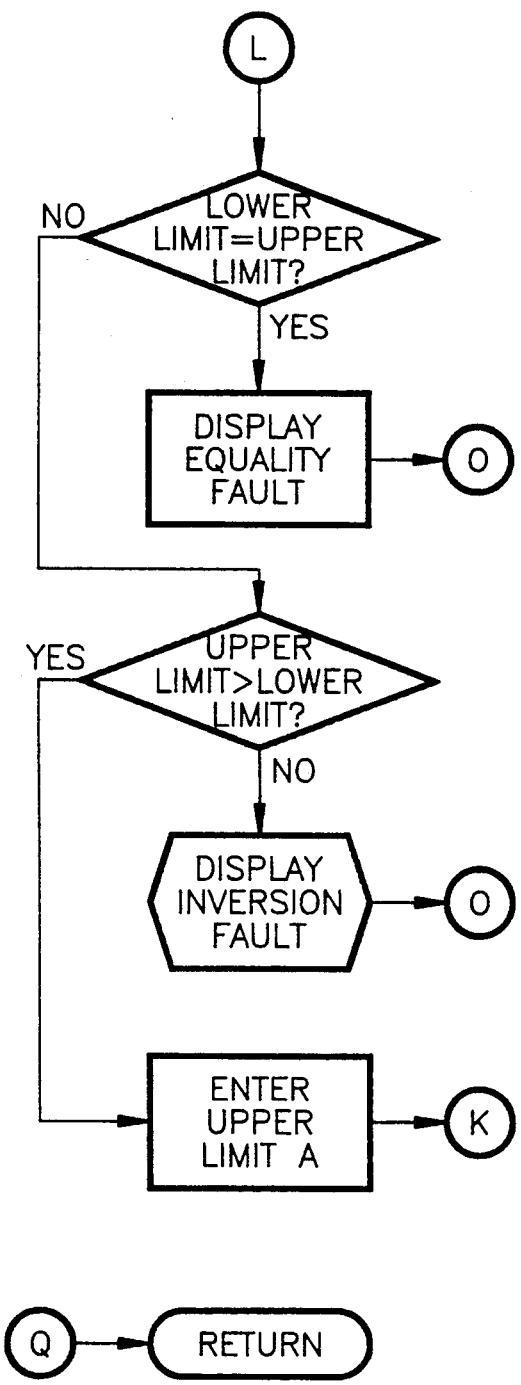

The Upper Limit A subroutine (FCTN-P) 504, shown on FIG. 18, is substantially the same as the Lower Limit A subroutine (FCTN-A) 382, discussed relative to the flow diagram shown on FIG. 16. Therefore, a detailed discussion of the Upper Limit A subroutine would be redundant. In the Upper Limit A subroutine 504, the value of the Upper Limit A is determined by the user and stored in the memory.

Figure 19A:
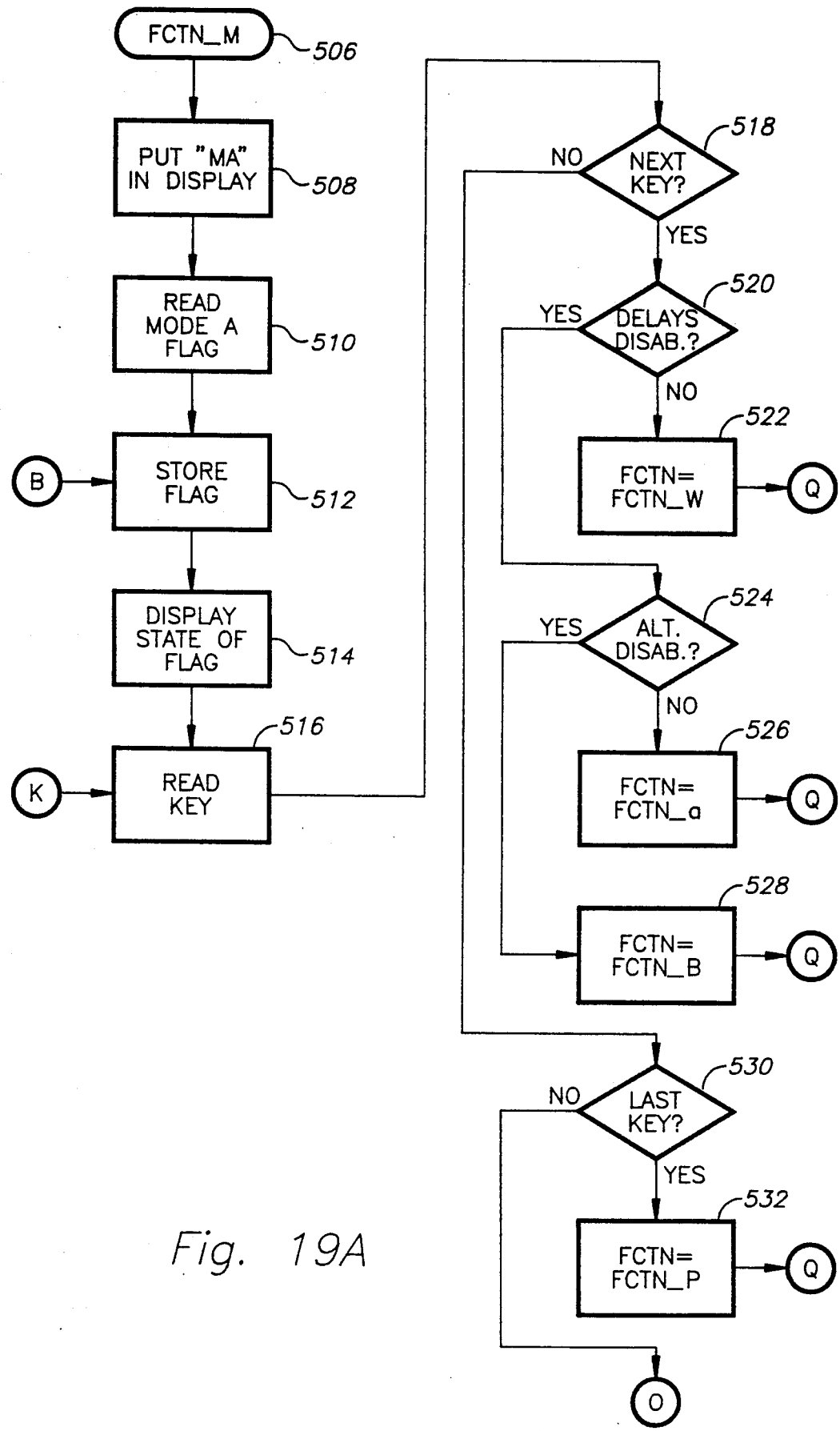
FIGS. 19A and 19B are a flow diagram of the subroutine Mode A.
Figure 19B:
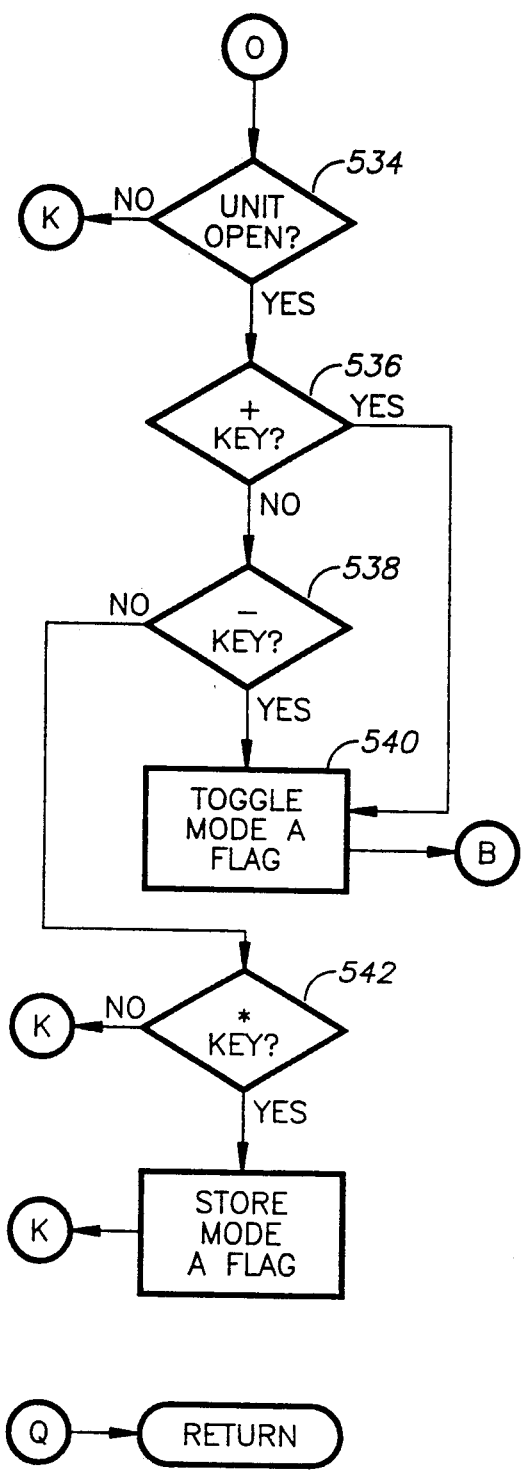

The details of the Mode A subroutine (FCTN-M) 506, is shown on FIG. 19. This subroutine toggles a two-state switch between a normal state and an inverted state. When in the inverted state, the OUT A indicator lamp and its corresponding output are reversed as shown in FIGS. 5A-5C. The Mode A subroutine begins by displaying the letters MA on the alpha-numeric display 16, block 508, reading, storing and displaying the state of the current mode A flag, blocks 510, 512 and 514. The subroutine will then read the key pressed and sequentially inquire, decision blocks 518 and 530, if the pressed key is the NEXT or LAST key. If the NEXT key is pressed, the subroutine will sequentially inquire, decision blocks 520 and 524 if the delays are disabled and alternate limits are disabled. If both the delays and alternate limits are disabled, the subroutine will set the Lower Limit B subroutine (FCTN-B), block 528, as the next subroutine to be executed then return to the main program 100, shown in FIG. 8. However, if the delays are not disabled, decision block 520, the subroutine will set the Wait Delay subroutine (FCTN-W), block 522, as the next subroutine to be executed and return to the main program. In a like manner, if the alternate limits are not disabled, the subroutine will set the Alternate Lower Limit A subroutine (FCTN-a), block 526, as the next subroutine to be executed and return to the main program.

If the pressed key is the LAST key, as indicated by decision block 530, the subroutine will set the Upper Limit A subroutine (FCTN-P) as the next subroutine to be executed, block 532, and return to the main program.

When neither the NEXT or LAST key is the pressed key, the subroutine will inquire, decision block 534, if the electro-optical control system 10 is OPEN. If it is not OPEN, the subroutine will return to block 516 and continue to cycle until the NEXT or LAST key is pressed. If the electro-optical control system 10 is OPEN, the subroutine will sequentially inquire if the (+) or (−) key is pressed, decision blocks 536 and 538, respectively. If either the (+) or (−) key is pressed, the subroutine will toggle the stored Mode A flag, block 540, and return to blocks 512 and 514 in which it is stored and displayed. When neither the (+) or (−) keys are pressed, the subroutine will inquire, decision block 542, if the (*) key is pressed. If the (*) key is pressed, the subroutine will store the current Mode A flag, return to block 516, and continue to cycle until either the NEXT, LAST, or (*) key is pressed. If the (*) key is not pressed, the subroutine will return to block 516 and continue to cycle until either the NEXT, LAST or (*) key is pressed.

Figure 20:
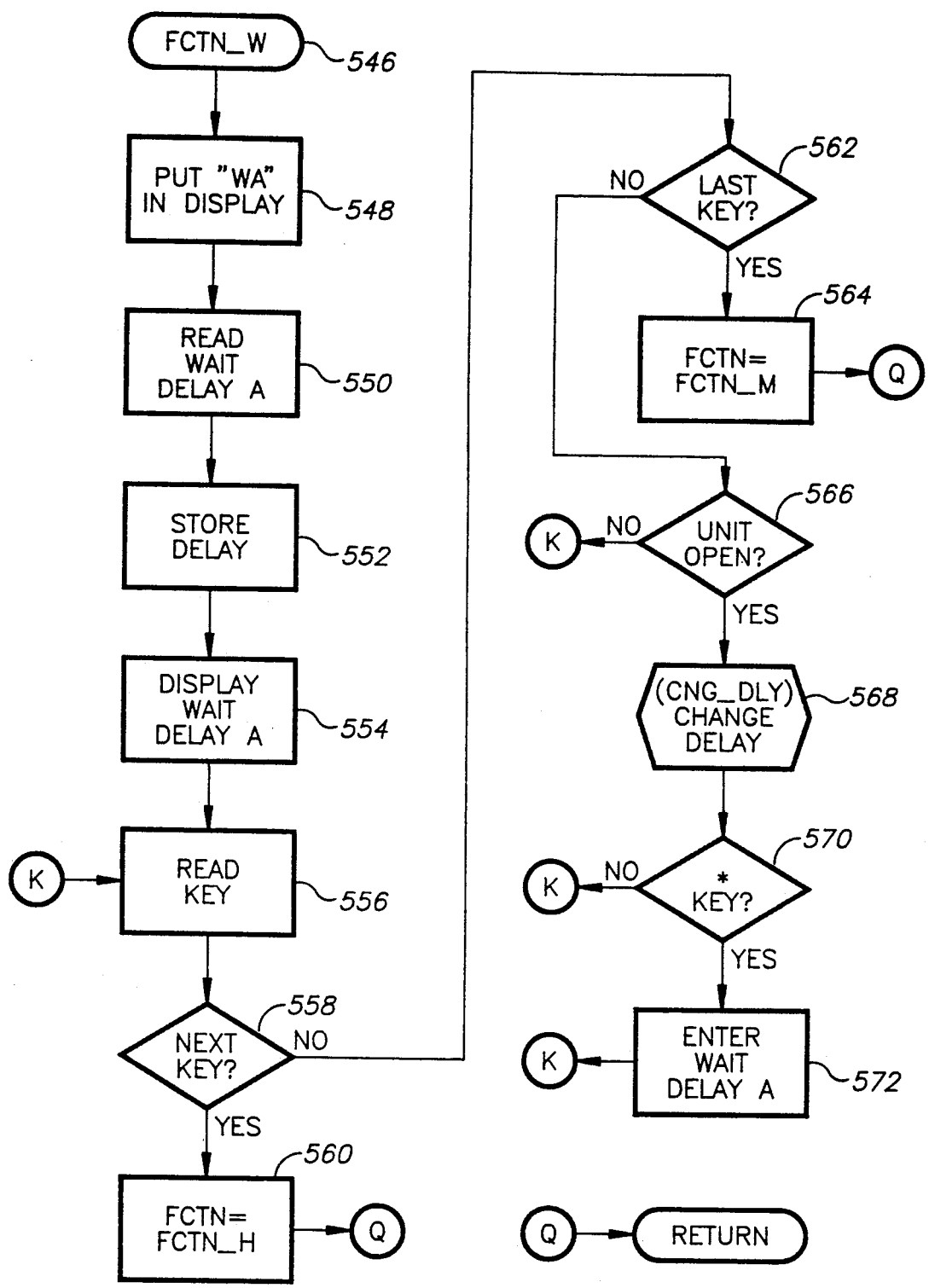
FIG. 20 is a flow diagram of the subroutine Wait Delay A.

The details of the Wait Delay A (FCTN-W), subroutine 546, are shown in the flow diagram of FIG. 20. The wait delay is the time interval from when the signal level goes active to when the associated output indicator lamp, OUT A or OUT B, and output switch is closed. "Active" is defined as the state when the signal level is between the upper and lower limits in a normal mode of operation or when the Signal Level is outside of the signal range set by the upper and lower limits when the electro-optical control system 10 is in the inverted mode of operation, as indicated in FIG. 6C. The delay is programmable in the range from 0 to 1 second in increments of 0.1 seconds and from 1 to 99 seconds in intervals of 1 second.

The Wait Delay A subroutine 546 begins by displaying the letters WA on the alpha-numeric display 16, reading Wait Delay A, placing Wait Delay A in a temporary buffer and displaying the stored Wait Delay A, blocks 548 through 554. After the Wait Delay A is displayed, the keypad is read, block 556, and the subroutine sequentially inquires, decision blocks 558 and 562 if the NEXT or LAST key has been pressed. If the NEXT key is pressed, the Hold Delay A, (FCTN-H), is set as the next subroutine to be executed, block 560, or if the LAST key is pressed the Mode A subroutine (FCTN-M), is set as the next subroutine to be executed, block 564. If neither the NEXT or the LAST key has been pressed, the subroutine will inquire, decision block 566, if the electro-optical control system 10 is OPEN. If the electro-optical control system 10 is not OPEN the subroutine will return to block 556 and continue to cycle until either the NEXT or LAST key is pressed. Alternatively, the subroutine will execute a Change Delay, subroutine 568, which is substantially the same as the Change Count subroutine (CNG-CNT) 406, discussed relative to FIG. 17, and, therefore, need not be discussed in detail for an understanding of how the Wait Delay A is changed.

After the execution of the Change Delay subroutine 568, the subroutine inquires, decision block 570, if the (*) key has been pressed. If not, the subroutine will return to block 556 and continue to cycle until the NEXT, LAST, or (*) key is pressed. If the (*) key is pressed, the subroutine will enter the new wait delay into the memory as indicated by block 572 then return to block 556 and continue to cycle until either the NEXT, LAST, or (*) key is pressed.

Figure 21:
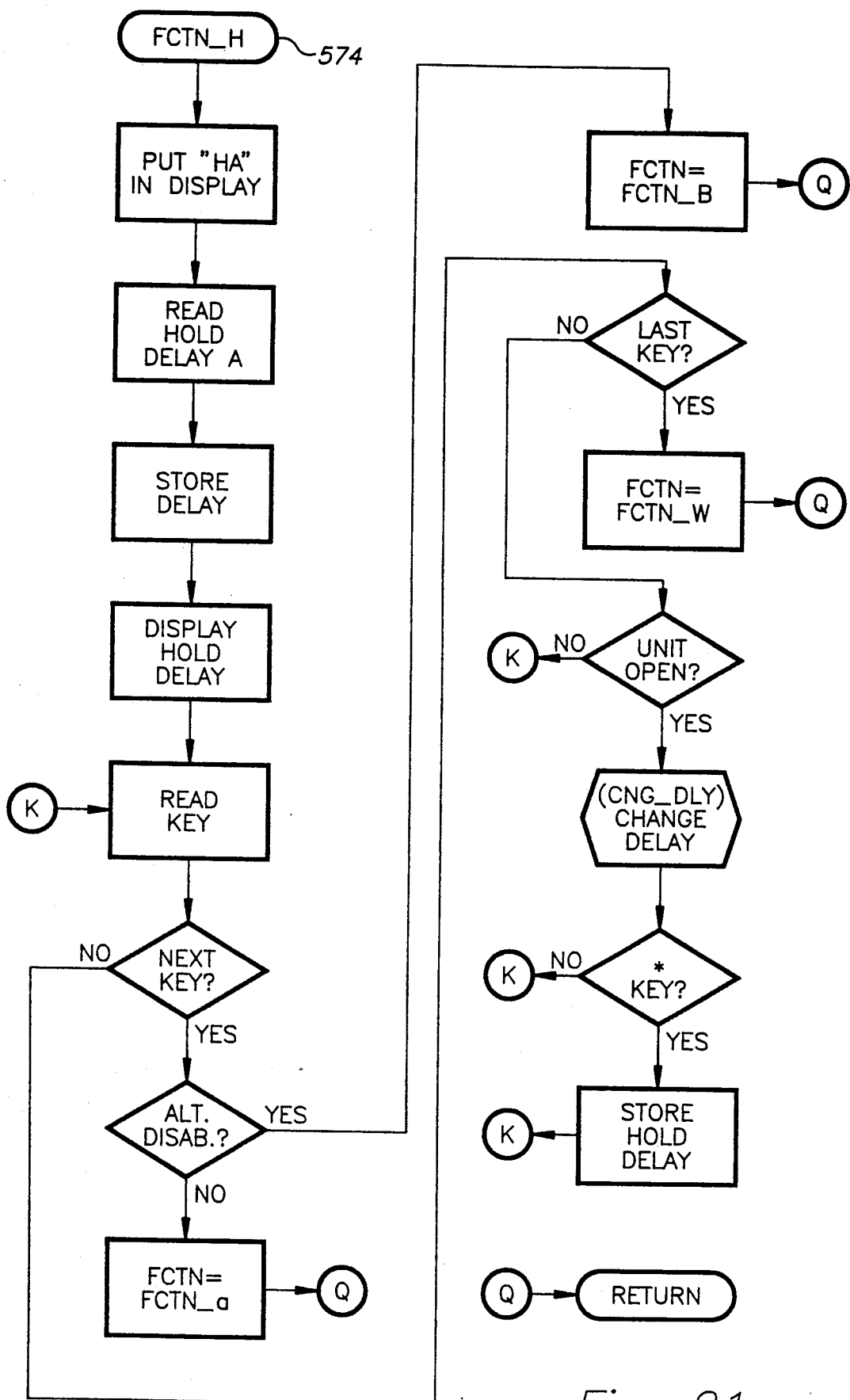
FIG. 21 is a flow diagram of the subroutine Hold Delay A.
Figure 22A:
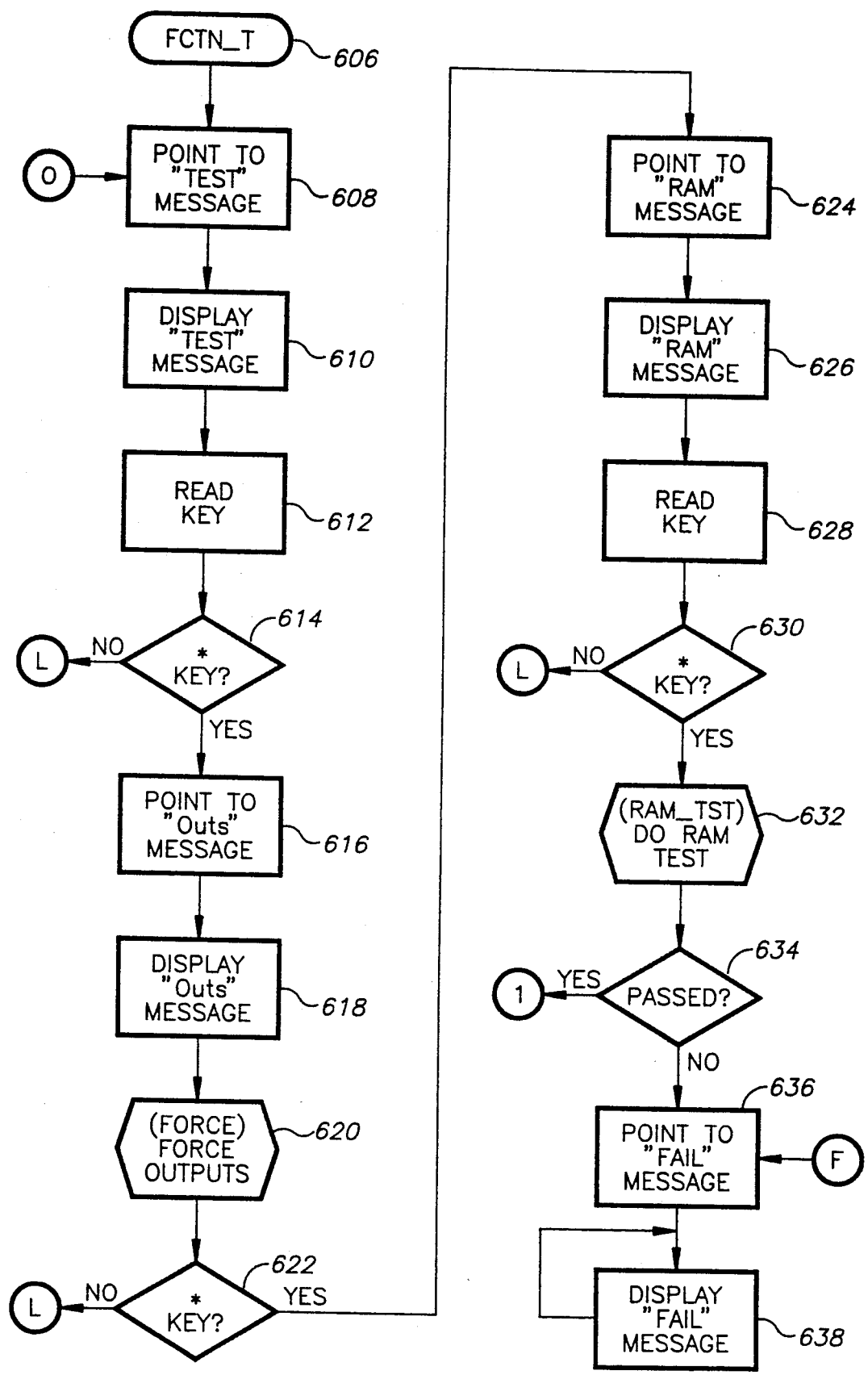
FIGS. 22A through 22E are a flow diagram of the subroutine Test.
Figure 22B:
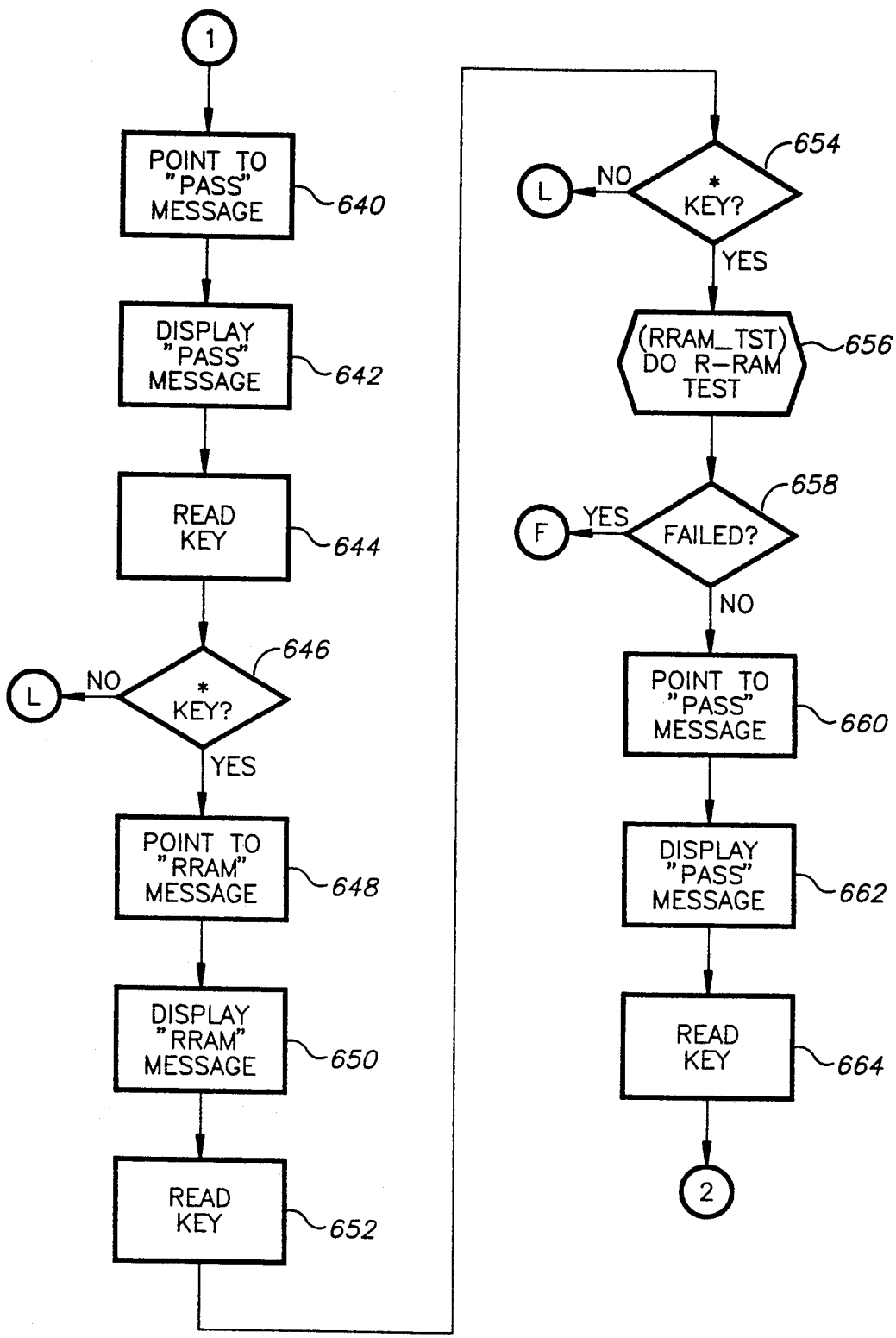
Figure 22C:
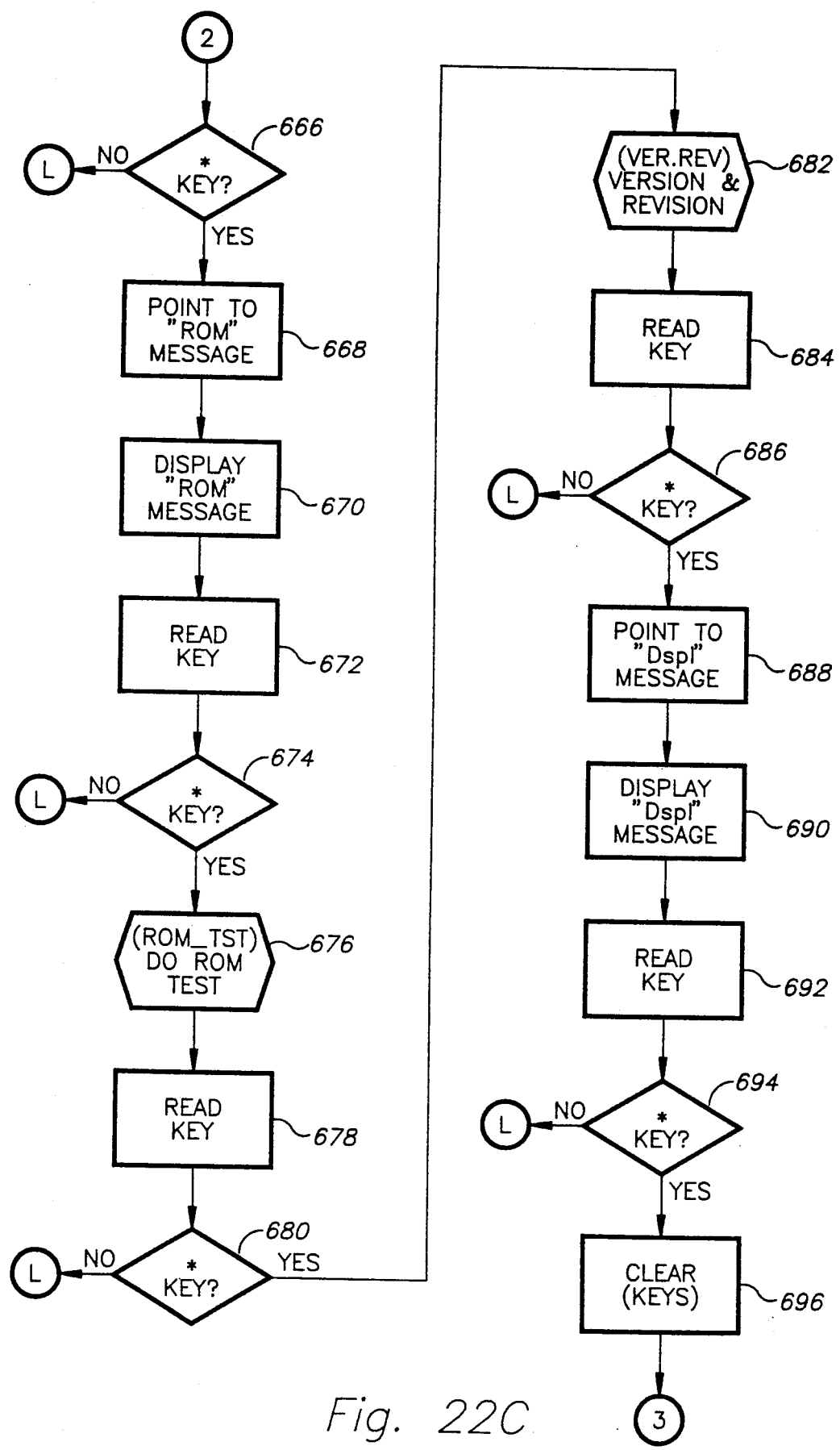
Figure 22D:
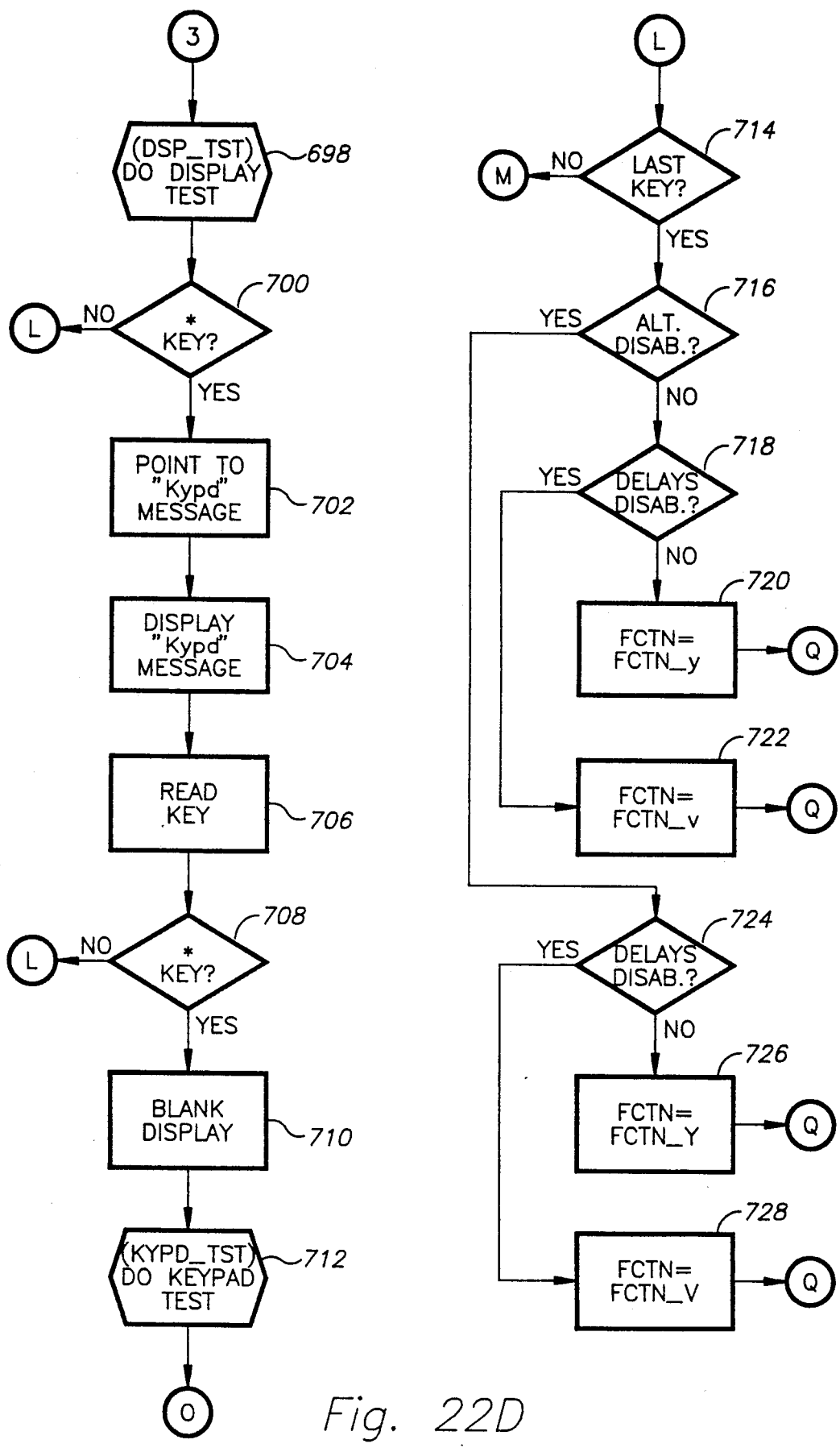
Figure 22E:
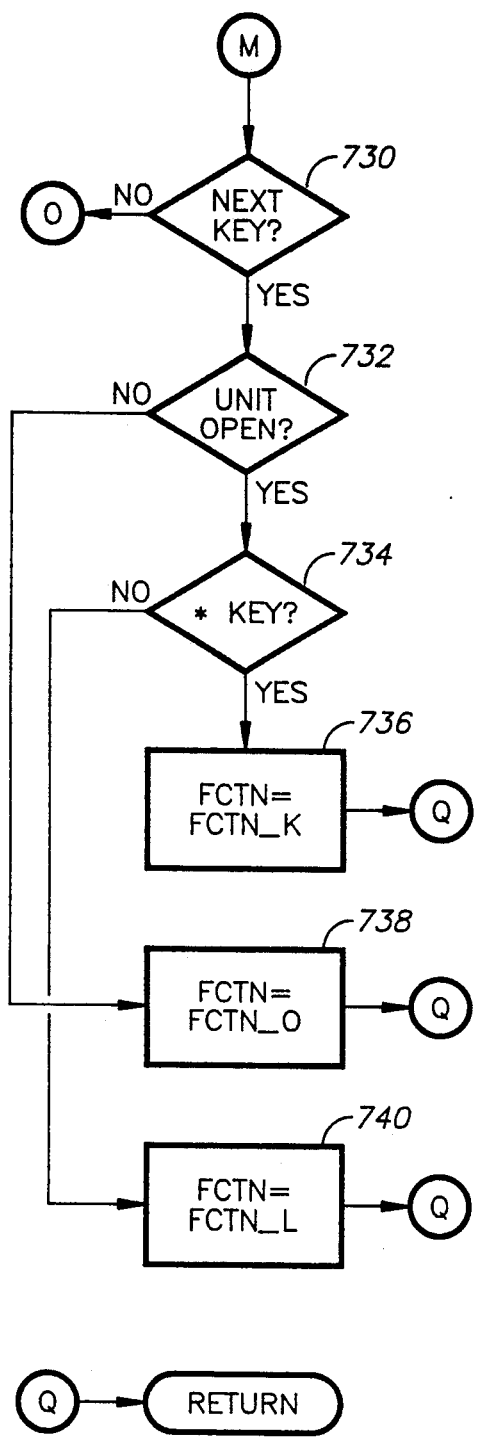

The details of the Hold Delay subroutine (FCTN-H) 574, are shown on FIG. 21. The Hold Delay A is the time interval from when the signal level goes inactive to when the OUT-A indicator lamp and the corresponding output go inactive. "Inactive" is the OFF state of the output A switch when the mode is normal or the ON state when the mode is inverted, as shown in FIGS. 6B and 6C. The electro-optical control system 10 can be programmed from 0 to 1 second and from 1 to 99 seconds in the same manner as the Wait Delay A.

The Hold Delay subroutine 574 shown on FIG. 21 is substantially the same as the Wait Delay subroutine 546. Therefore, a detailed description of the subroutine is not necessary for an adequate understanding of the operation of this subroutine.

The Alternate Lower Limit a subroutine (FCTN-a) 576, the Alternate Upper Limit a, subroutine (FCTN-p), 578 and the Alternate Mode a, subroutine (FCTN-m) 580, are substantially the same as Lower Limit A subroutine (FCTN-A) 382, Upper Limit A subroutine (FCTN-P) 504 and Mode A subroutine (FCTN-M) 506 shown in FIGS. 16, 18 and 19, respectively, and, therefore, need not be discussed in detail. In a like manner, the Alternate Wait Delay a subroutine (FCTN-w) 582 and the Alternate Hold Delay a subroutine (FCTN-h) 584 are substantially the same as the Wait Delay A subroutine (FCTN-W) 546 and the Hold Delay A subroutine (FCTN-H) 574 shown on FIGS. 20 and 21, respectively. Therefore, a detailed discussion of these subroutines is not required for an understanding of the invention.

The Lower Limit B subroutine (FCTN-B) 586, the Upper Limit B subroutine (FCTN-Q) 588 as well as the Mode B subroutine (FCTN-V) 590, the Wait Delay B subroutine (FCTN-X) 592 and the Hold Delay B subroutine (FCTN-Y) 594 are substantially identical to the corresponding subroutines for Lower Limit A 382, FIG. 16, Upper Limit A 504, FIG. 18, Mode A, 506, FIG. 19, the Wait Delay A subroutine 546, FIG. 20, and the Hold Delay A subroutine 574, FIG. 21. The subroutines 586 through 594 relate to output B in the same manner as subroutines 382, 504, 506, 546 and 574 relate to output B.

In a like manner, Alternate Lower Limit b subroutine (FCTN-b) 596, Alternate Upper Limit b subroutine (FCTN-q) 598, Alternate Mode b subroutine (FCTN-v)

600, Alternate Wait Delay b subroutine (FCTN-x) 602 and Alternate Hold Delay b subroutine (FCTN-y) 604 are substantially the same as the corresponding subroutines related to output A and, therefore, a detailed discussion of these subroutines would be redundant.

The details of the Test subroutine (FCTN-T) 606 are shown in FIGS. 22A through 22E. The Test subroutine begins by pointing to the "Test" message, block 608, displaying the "Test" message on the alpha-numeric display 16, block 610, reading the keypad 18, block 612, then inquiring, decision block 614, if the (*) key is pressed. If not, the subroutine will jump to decision block 714 and inquire if the LAST key is pressed. If the (*) key is pressed, the subroutine will point to an "Outs" message, block 616, and display an "Outs" message, block 618, then execute a Force Outputs subroutine (FORCE), 620.

In the Force Outputs subroutine (FORCE) 620, an "Outs" message will be displayed on the alpha-numeric display 16, which indicates that the 120 VAC outputs can be toggled to a desired state independent of the true state of the machine. Each time the (+) key is pressed, the OUT A indicator lamp and the corresponding output switch A, 124 shown in FIG. 7, is toggled to the alternate state, ie., from OFF to ON and vice versa. Each time the (−) key is pressed, the OUT B indicator lamp and the corresponding output switch B, 128 shown on FIG. 7, is toggled to the alternate state.

After the Force Outputs subroutine block 620, is completed, the subroutine will again inquire, decision block 622 if the (*) key is pressed. If the (*) key is not pressed the subroutine will jump to decision block 714, otherwise the subroutine will point to the RAM message, block 624, display the RAM message, block 626, read the keypad 628, then again inquire, decision block 630, if the (*) key is pressed. If not pressed, the Test subroutine will jump to decision block 714. Otherwise, the subroutine executes the Do Ram Test subroutine (RAM-TST) 632.

After executing the Do Ram Test subroutine 632, the subroutine will inquire if the electro-optical control system 10 passed the test, decision block 634. If the electro-optical control system 10 passed the Do Ram Test 632, the subroutine proceeds to locate the "PASS" message, block 640, then display the "PASS" message, block 642. When the electro-optical control system 10 fails the Do RAM Test 632, the subroutine locates the "FAIL" message, block 636, and displays the "FAIL" message, block 638. Once the "FAIL" message is displayed, the subroutine loops back and continues to display the "FAIL" message inhibiting any further operation of the electro-optical control system 10.

After the "PASS" message is displayed, the Test subroutine reads the keypad 18, block 644, then again inquires if the (*) key has been pressed. If the (*) key has been pressed the subroutine locates the "RRAM" message, block 648, then displays the "RRAM" message, block 650. Otherwise, the subroutine proceeds to decision block 714 as before. After the "RRAM" message is displayed, the keypad is read again, block 652, and if the (*) key is pressed, decision block 654, the subroutine proceeds to execute the Do R-RAM Test subroutine 656. If the (*) key is not the key being pressed, the Test subroutine jumps to decision block 714 as before.

After the Do R-RAM Test 656 is completed, the subroutine inquires if the R-RAM memory failed the test, decision block 658. If the R-RAM failed the test, the subroutine jumps to block 636, and continuously displays the "FAIL" message. If the R-RAM passed the test, the subroutine calls up the "PASS" message, block 660, displays the "PASS" message 662, reads the keypad 664, then inquires, decision block 666, if the (*) key is pressed. If the (*) key is not pressed, the subroutine jumps to decision block 714. However, if the (*) key is pressed, the Test subroutine, locates the "ROM" message, block 668, displays the "ROM" message, block 670, reads the keypad 672 then again inquires, decision block 674, if the (*) key is pressed.

If the (*) key is not pressed the subroutine jumps to decision block 714. However, if the (*) key is pressed, the subroutine executes a Do ROM Test subroutine, 676. In the Do ROM Test, the microprocessor will calculate and display the "check sum" so that it can be compared with the check sum number printed on the internal EPROM chip. After executing the Do ROM Test subroutine 676, the Test subroutine will read the keypad, block 678, and inquire, decision block 680, if the (*) key is pressed. If it is pressed, the Test subroutine will execute the version-revision subroutine 682, in which the version and current revision of the program in the electro-optical control system 10 is displayed. If the (*) key is not the pressed key, the subroutine will jump to decision block 714. After the version and revision are displayed, the subroutine will read the keypad, block 684, and inquire if the (*) key is being pressed, decision block 686. If it is, the subroutine will locate the "Dspl" message, block 688, display the "Dspl" message, block 690, read the key pad, block 692, then inquire if the (*) key is pressed. If the (*) key is pressed, the Test subroutine will execute the Do Display Test 698. Otherwise, the subroutine jumps to decision block 714.

In the Do Display Test subroutine 698, a first press of the (*) key will start the test in which the 96 displayable characters are shifted into the right side of the alpha-numeric display 16, one at a time. Pressing the (*) key a second time will terminate the Do Display Test subroutine.

After the Do Display Test is terminated by pressing the (*) key, the Test subroutine will inquire if the (*) key has been pressed again, decision block 700. If it has, the "Kypd" message is located, block 702, the "Kypd" message is displayed, block 704, the keypad is read, block 706, then the subroutine inquires, decision block 708 if the (*) key is pressed. If so, the subroutine will blank the display, block 710, and execute the Do Key Pad Test subroutine. Otherwise, the subroutine jumps to decision block 714. In the Do Key Pad Test subroutine 712, as each key is pressed, a symbol representing that key is shifted in from the left side of the display. The Do Key Pad Test subroutine is exited by simultaneously pressing the NEXT and LAST key. This returns the subroutine to block 608 and the Test subroutine may be exited by pressing either the NEXT or LAST key.

Any time a key, other than the (*) key, is pressed during the Test subroutine (FCTN-T) 606, the Test subroutine will sequentially inquire, block 714 and block 730, if the LAST or NEXT key respectively, has been pressed. If the LAST key has been pressed the subroutine will inquire, block 716, if the alternate limits are disabled. If the alternate limits are disabled and the delays are disabled, decision block 724, the subroutine will set the Mode B subroutine (FCTN-V), block 728, as the next subroutine to be executed. Otherwise, if the delays are not disabled it will set the Hold Delay B subroutine (FCTN-Y), block 726, as the next subroutine to be executed. If the alternate limits are not disabled, decision block 716, and the delays are not disabled, decision block 718, the Test subroutine will set the Alternate Hold Delay b subroutine (FCTN-y) 720 as the next subroutine to be executed. Otherwise, if the delays are disabled, it will set the Alternate Mode b subroutine (FCTN-n) 722 as the next subroutine to be executed After setting any one of the subroutines as the next subroutine to be executed, the Test subroutines will return to the main program.

In a corresponding manner, if the key pressed is the NEXT key, decision block 730, the Test subroutine inquires, decision block 732, if the electro-optical control system 10 is OPEN and if the (*) key has been pressed, decision block 734. If the electro-optical control system 10 is OPEN and the (*) key has been pressed, the subroutine will set the Key Code subroutine (FCTN-K), block 736, as the next subroutine to be executed.

If the electro-optical control system 10 is not OPEN, decision block 732, the Test subroutine will set the Open subroutine (FCTN-O), block 738, as the next subroutine to be executed. After setting any one of the subroutines as the next subroutine to be executed, the Test subroutine will return to the main program.

Figure 23:
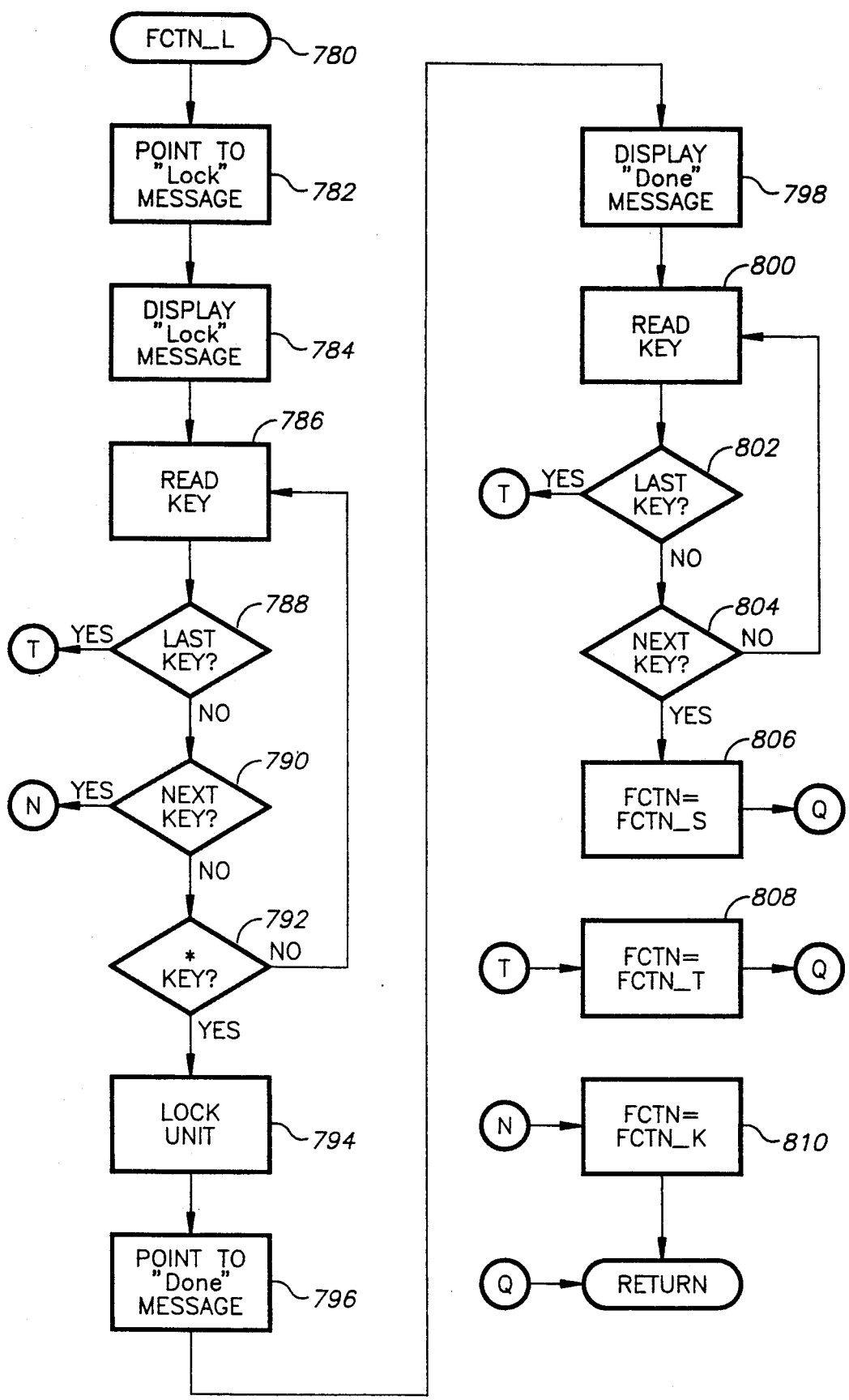
FIG. 23 is a flow diagram of the subroutine Lock.

The details of the Lock subroutine (FCTN-L), block 780, are shown in FIG. 23. The Lock subroutine locks the current values of the limits, upper and lower, wait periods and hold periods; and, when the electro-optical control system 10 is in the locked state, the values of the limits, wait delay periods and hold delay periods may be viewed but not changed as previously discussed. The Lock subroutine 780 will be bypassed if the electro-optical control system is already locked.

The Lock subroutine begins by locating the "Lock" message, block 782, displaying the "Lock" message on the alpha-numeric display 16, block 784, reading the keypad, block 786, then inquiring if the LAST key is pressed, decision block 788. If the LAST key is pressed, the Lock subroutine sets the Test subroutine (FCTN-T), block 808, as the next subroutine to be executed then returns to the main program 100. Alternatively, the subroutine will inquire if the NEXT key is pressed. If the NEXT key is pressed the subroutine will set the Key Code subroutine (FCTN-K), block 810, as the next subroutine to be executed, and then return to the main program 100.

When neither the LAST or NEXT key have been pressed, the subroutine will inquire, block 792, if the (*) key has been pressed. If the (*) key is not pressed, the subroutine will return to block 786 and repetitively cycle until the NEXT, LAST or (*) key is pressed. The pressing of the (*) key will lock the electro-optical control system 10, block 794, locate the "Done" message, block 796, display the "Done" message, block 798, read the keypad 18, block 800, then inquire, decision block 802, if the LAST key is being pressed. If the LAST key is pressed, the subroutine will jump to block 808, set the Test subroutine (FCTN-T) as the next subroutine to be executed and return to the main program 100 shown in FIGS. 8A-8E. Otherwise, the subroutine will inquire, decision block 804, if the NEXT key is pressed. If not the subroutine will return to block 800 and cycle until either the LAST or NEXT key is pressed. When the NEXT key is pressed the subroutine will set the Signal Level subroutine (FCTN-S) 178 as the next subroutine to be executed, block 806, then return to the main program.

Figure 24A:
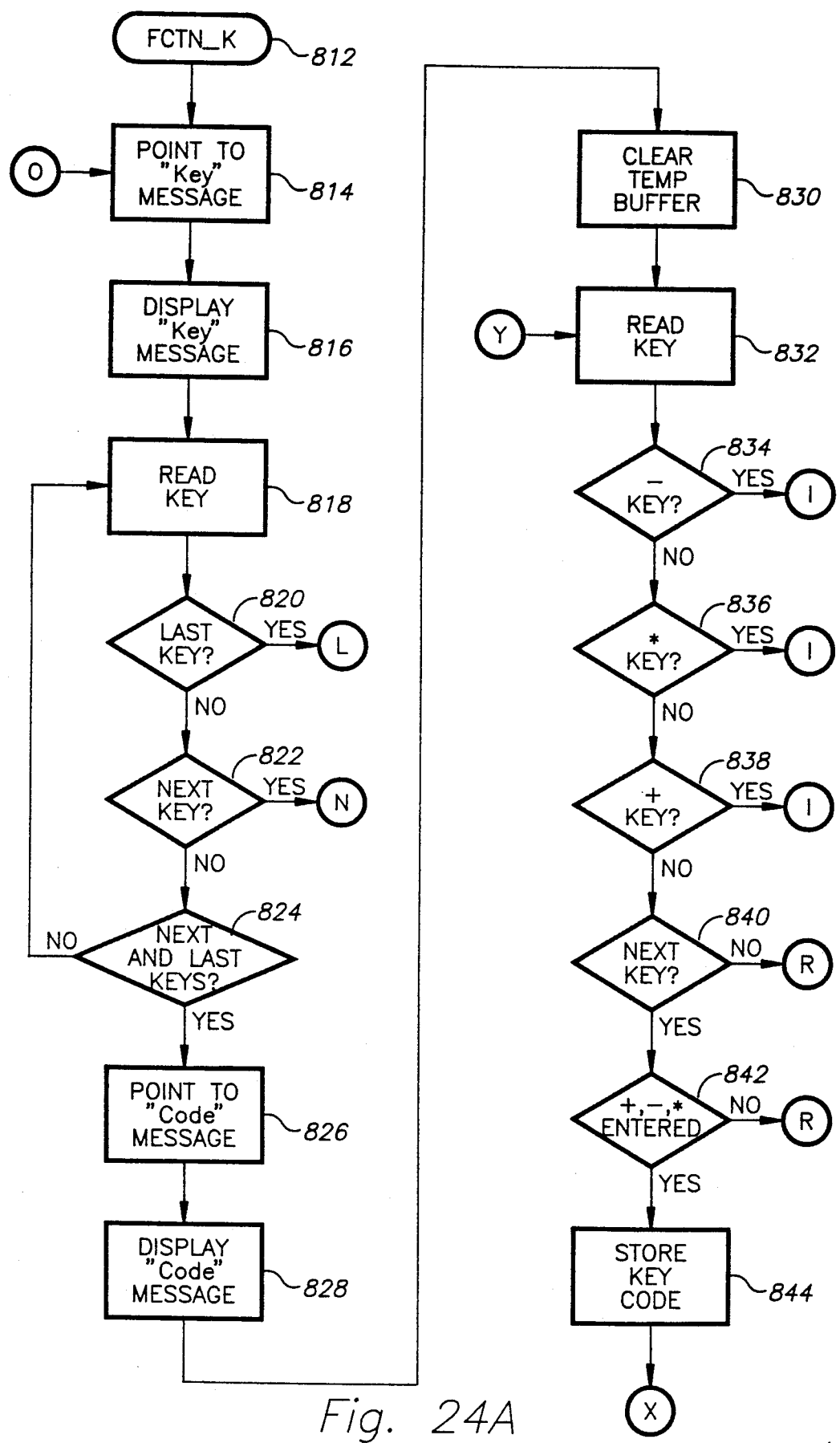
FIGS. 24A through 24C are a flow diagram of the subroutine Key Code.
Figure 24B:
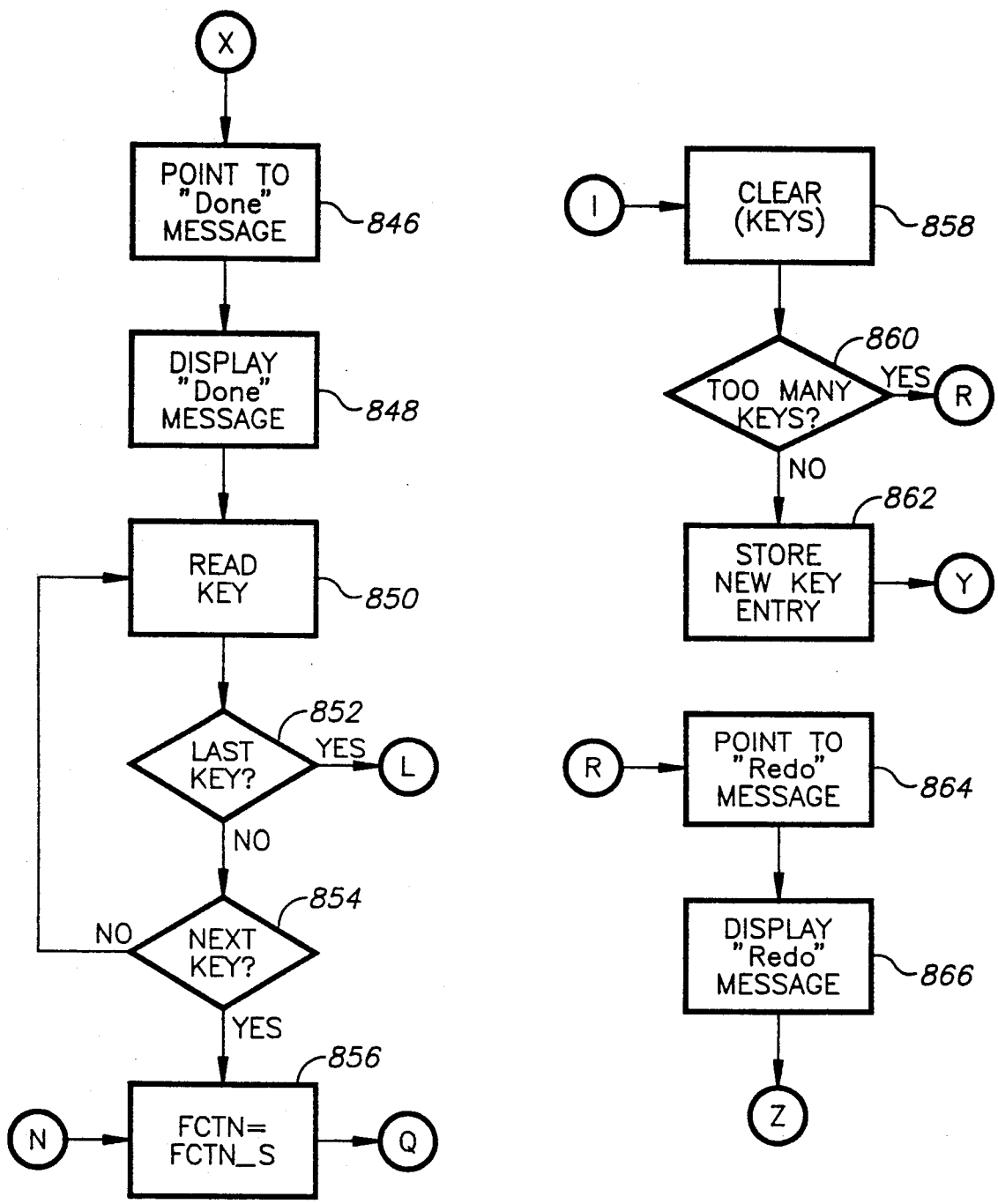
Figure 24C:
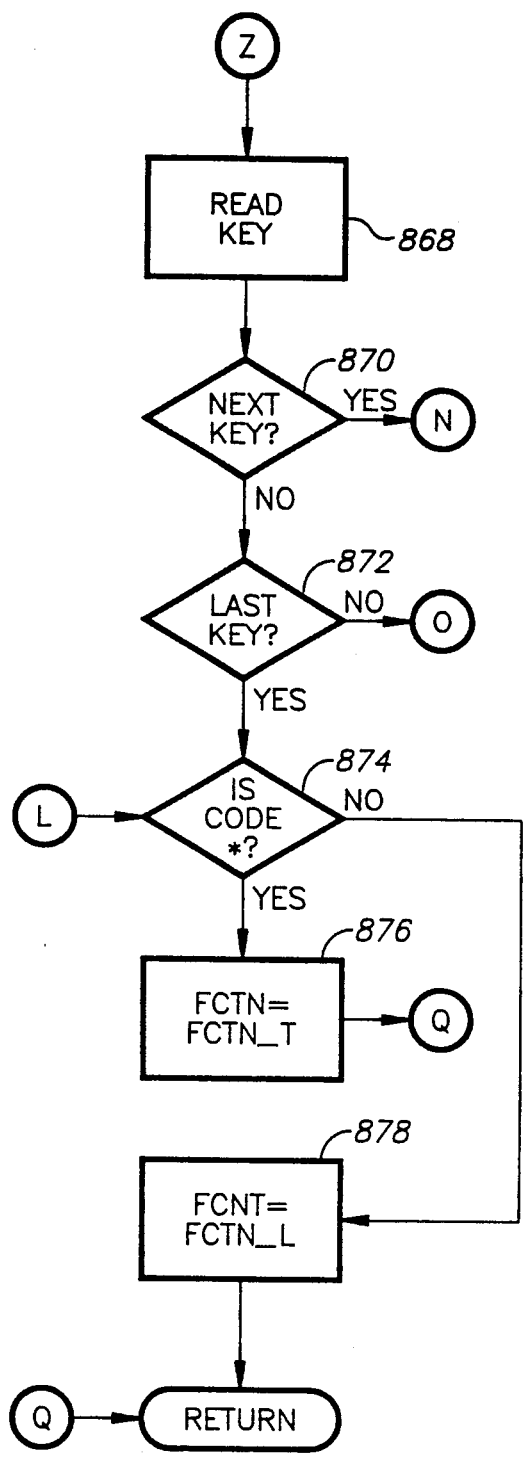

The details of the Key Code subroutine (FCTN-K) 812, are shown in FIGS. 24A-24C. The Key Code subroutine 812 stores a unique users code in the EEPROM memory which is used to OPEN the electro-optical control system 10 as described relative to the subroutine for setting the upper and lower limits, the wait delay period and the hold delay periods.

The Key Code subroutine (FCTN-K) 812, begins by locating the "Key" message, displaying the "Key" message, then reading the keypad 18, blocks 814 through 818. After reading the keypad, the subroutine will sequentially inquire if the LAST or NEXT key has been pressed, decision blocks 820 and 822. If the LAST key is pressed the subroutine will inquire, decision block 874, if the code currently stored is a single star (*) code. If it is, the subroutine will set the Test subroutine (FCTN-T) 876 as the next subroutine to be executed. If the NEXT key is pressed, the subroutine will jump to block 856 and set the Signal Level subroutine (FCTN-S) 178 as the next subroutine to be executed.

If neither the LAST or NEXT key is individually pressed, the subroutine will inquire, block 824, if the LAST and NEXT key have been pressed simultaneously. If both the LAST and NEXT keys are simultaneously pressed, the subroutine will locate and display a "Code" message, blocks 826 and 828, then clear the temporary buffer, block 830.

After clearing the temporary buffer, the subroutine will read the keypad 18, block 832, then sequentially inquire if the (−) key, (*) key, (+) key or NEXT key have been pressed, decision block 834 through 840. If the (−) key, (*) key or (+) key have been pressed, the subroutine will jump to block 858, clear the keypad, and then inquire, decision block 860, if too many keys were pressed. If too many keys were not pressed the subroutine will store the pressed key, block 862, then return to block 832 and determine the next key pressed as previously described.

If too many keys were pressed, decision block 860, the subroutine will jump to block 864, and locate and display a "Redo" message, block 866. After displaying the "Redo" message, the subroutine will sequentially inquire if the NEXT or LAST key is pressed. The pressing of the NEXT key will set the Signal Level subroutine as the next subroutine to be executed. But, if the LAST key is pressed the subroutine will inquire, decision block 874, if the stored code is a single (*) code. If neither the NEXT or LAST key is pressed, the subroutine will return to block 814 and the subroutine will be started all over again. If the stored code is a single (*) code, the subroutine will set the Test subroutine (FCTN-T) 876 as the next subroutine to be executed. Otherwise, the subroutine will set the Lock subroutine (FCTN-L) 878 a the next subroutine to be executed by the main program. After setting the Signal Level, Test or Lock subroutine as the next subroutine to be executed, the subroutine will return to the main subroutine 100 shown of FIGS. 8A-8E.

Returning to decision block 840, if neither the (−) key, (*) key, (+) key or NEXT key have been pressed, the subroutine will jump to block 864, locate the "Redo" message, display the "Redo" message, block 866, read the keypad 18, block 868, then effectively restart the Keypad subroutine from its beginning if neither the NEXT or the LAST key is pressed. If the NEXT key is pressed, decision block 840, the subroutine will inquire, block 842 if at least one valid key, ie., the (+), (−) or (*) keys, has been entered into the temporary buffer. If not, the subroutine will display a "Redo" message, blocks 864 and 866, then proceed to block 868 and effectively restart the Keypad subroutine. However, if at least one valid key has been entered into the temporary buffer, the subroutine will transfer the code stored in the temporary buffer into the EEPROM memory, block 844, then locate and display a "Done" message, blocks 846 and 848. After the "Done" message is displayed the subroutine will read the keypad 18, block 850, and await either a LAST or NEXT key to be pressed, decision blocks 852 and 854. If the LAST key is pressed, decision block 852, the subroutine will jump to block 874 and inquire if the code is a single (*) code. If so, the subroutine as previously described will set the Test subroutine (FCTN-T) as the next subroutine to be executed, block 876, then return to the main program 100. If the stored code is not a single (*) code, the subroutine will set the Lock subroutine (FCTN-L) as the next subroutine to be executed, block 878, then return to the main program.

As previously discussed, the zero cross circuit 99 shown in FIG. 7 converts the 60 Hz AC signal which powers the electro-optical control system 10 to a 0-5 V 60 Hz square wave which is applied to the interrupt input of the microprocessor 92. The microprocessor is programmed to respond to the falling edge of the square wave 60 Hz signal to generate an interrupt every 16.67 milliseconds. By responding to only one edge of the square wave, it is possible to operate two separate electro-optical control systems 10 which are sensing the same work site completely independent of each other by reverse phasing the input power of the electro-optical control systems relative to each other.

Figure 25:
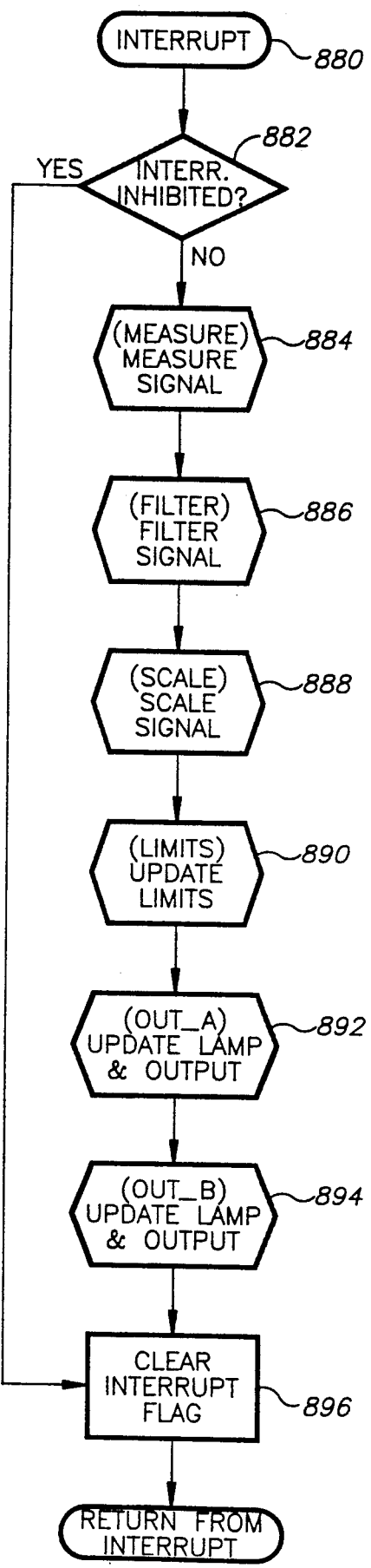
FIG. 25 is a flow diagram of the Interrupt subroutine.

The Interrupt subroutine 880 is shown in FIG. 25. The Interrupt subroutine is initiated by the falling edge of the 60 Hz square wave generated by the zero cross circuit 99, which sets an interrupt flag. The subroutine begins by inquiring if the interrupt is prohibited, block 882. If the interrupt is prohibited, the subroutine will jump to block 896, clear the interrupt flag and return to the main program. However, if the Interrupt subroutine is not prohibited it will sequentially execute the Measure Signal subroutine (MEASURE) 884, the Filter Signal subroutine (FILTER) 886, the Scale Signal subroutine (SCALE) 888, the Update Limits subroutine (LIMITS) 890, the Update Lamp and Output A subroutine (OUT-A) 892, the Update Lamp and Output B subroutine (OUT-B) 894, clear the interrupt flag, block 896, then return to wherever it was interrupted from.

Figure 26:
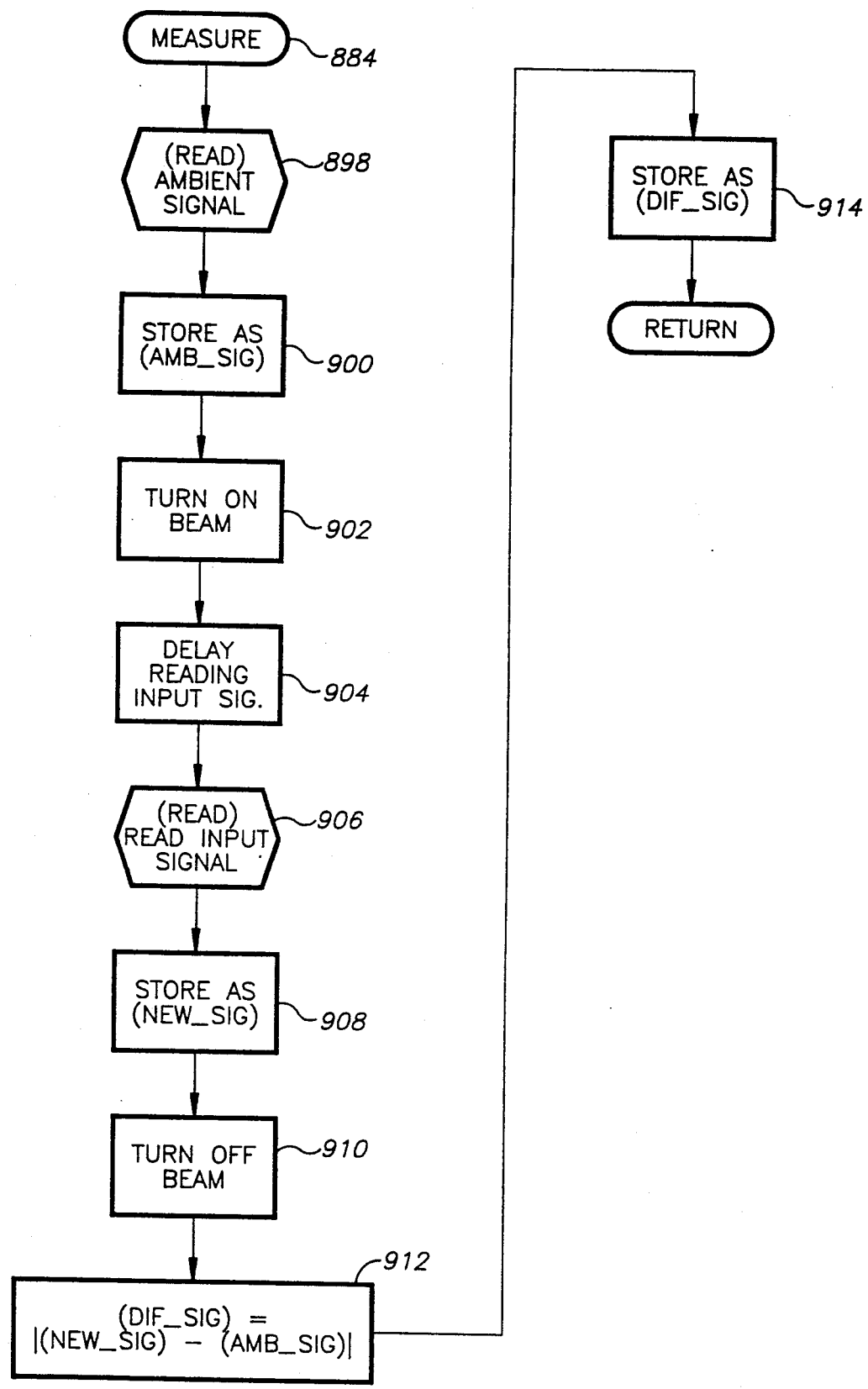
FIG. 26 is a flow diagram of the Interrupt subroutine Measure.

The details of the Measure Signal (MEASURE) subroutine 884 are shown on FIG. 26. This subroutine begins by executing the READ subroutine 898 which generates a signal, AMB-SIG, which is the average of four sequential signals generated by the photodiode 150 and amplified by amplifier 152. As previously indicated, the analog ambient signal output of amplifier 152 is converted to a digital signal by the microprocessor 92 and stored therein as indicated by block 900. The subroutine then activates the infrared emitting diode to generate a light beam, Block 902, then delays reading the signal for a predetermined period of time selected to permit the light beam to stabilize, block 904. The subroutine then executes the (READ) subroutine 906 to generate an input signal which is stored as a new signal (NEW-SIG), block 908. After the signal with the light beam ON is read and stored the infrared emitting diode 140 is turned off, block 910, a difference signal (DIF-SIG) is generated which has a value equal to |(NEW-SIG)-(AMB-SIG)| as indicated in block 912. This difference signal (DIF-SIG) is stored as indicated by block 914 and the subroutine returns to the Interrupt subroutine.

Figure 27:
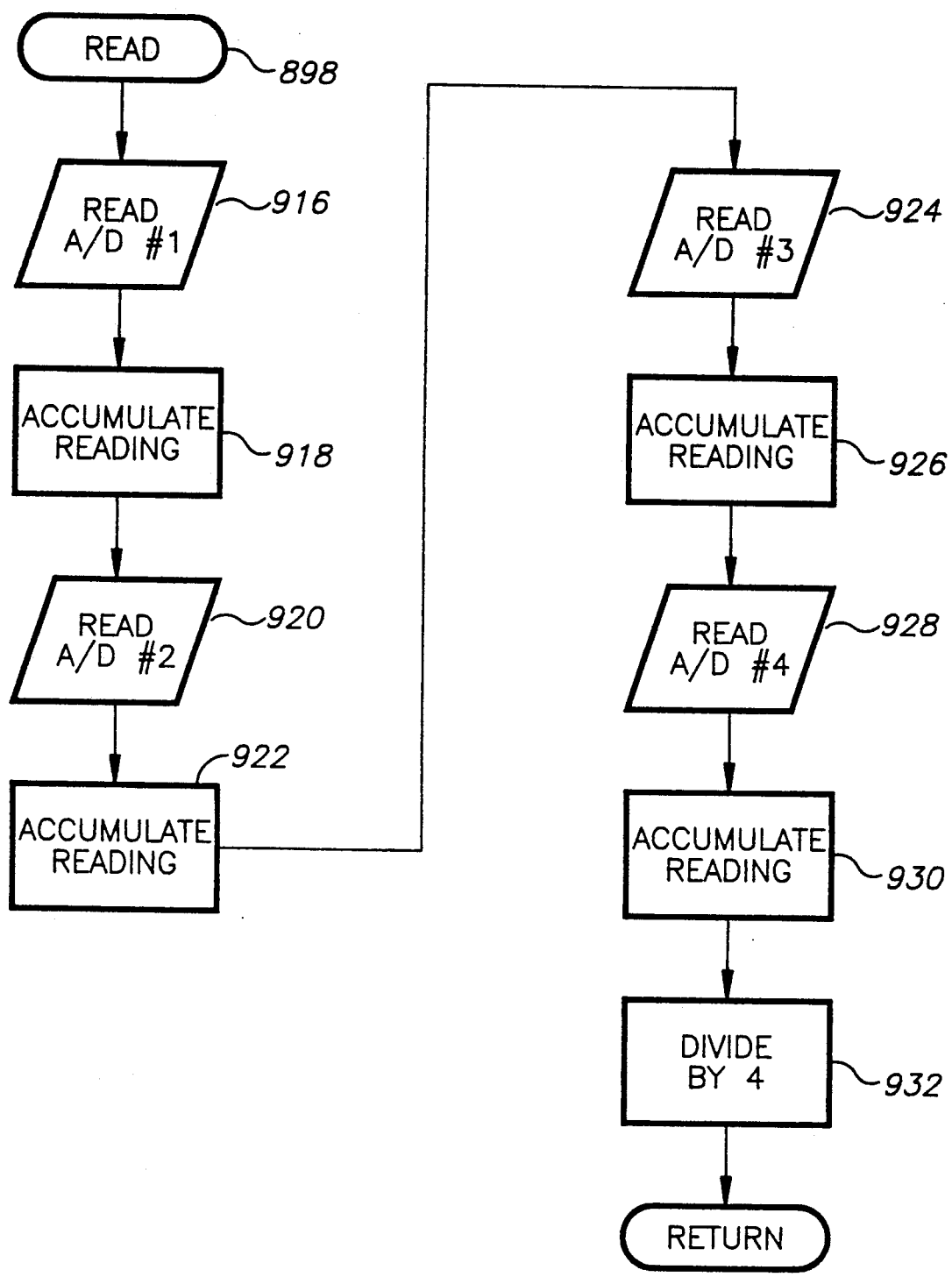
FIG. 27 is a flow diagram of the Interrupt subroutine Read.

The details of the Read Signal subroutine, called in 898 and 906, are shown in FIG. 27. The Read Signal subroutine reads and accumulates four sequentially stored signals to generate an accumulated signal as indicated by blocks 916 through 930. The accumulated signal is then divided by four (4) as indicated by block 932 to generate the signal which is the ambient signal (AMB-SIG) when the Read Signal subroutine is called from block 898 or the new signal (NEW-SIG) when the Read Signal subroutine is called from block 906.

Figure 28:
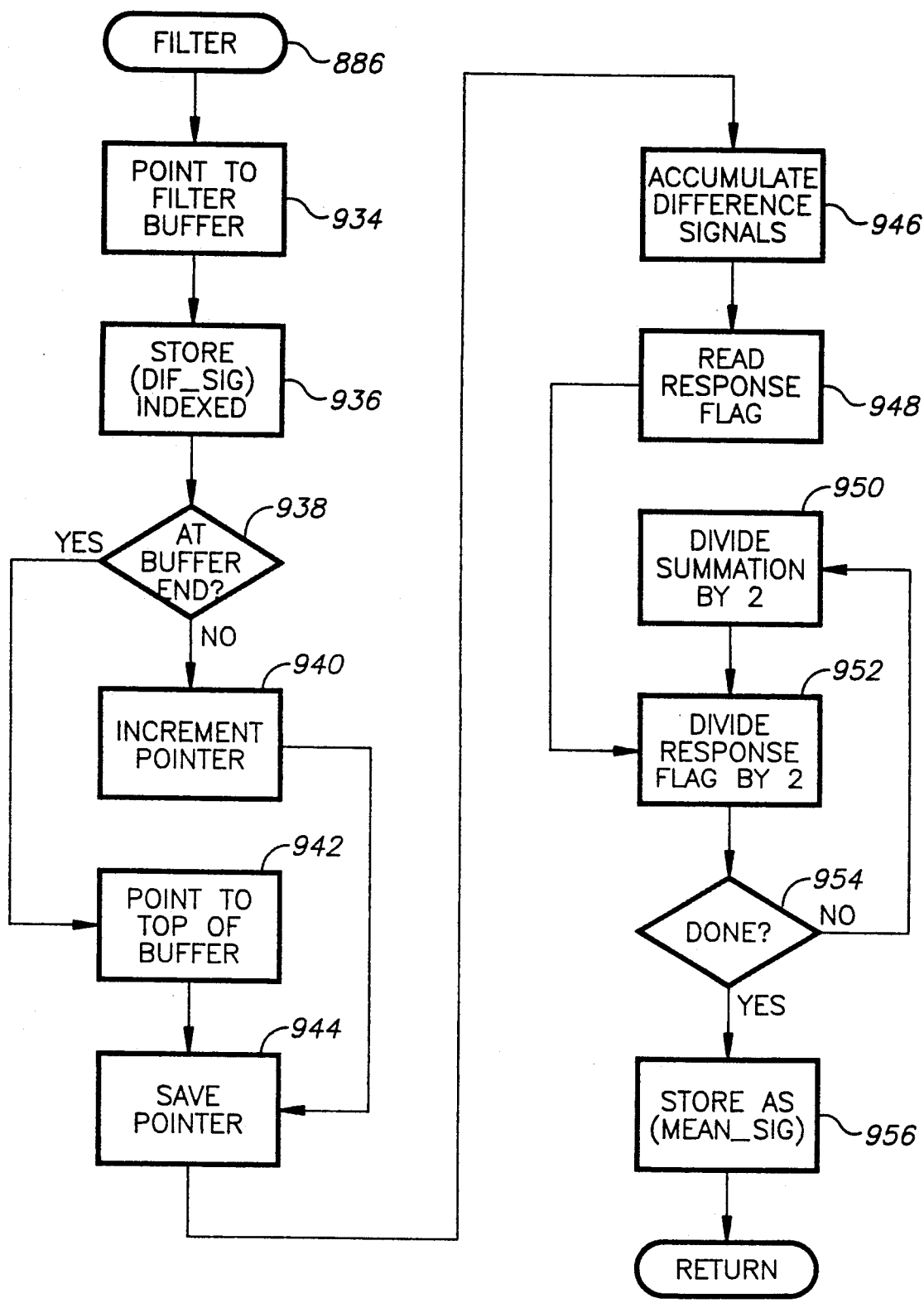
FIG. 28 is a flow diagram of the Interrupt subroutine Filter.

The details of the Filter Signal (FILTER) subroutine 886, are shown in the flow diagram of FIG. 28. The Filter Signal subroutine 886 generates a mean value by averaging from 1 to 128 of the last difference signals (DIF-SIG) generated by the Measure subroutine 884. The number of difference signals used to generate the mean signal is determined by the response number selected by the user in the Response subroutine 290 shown in FIGS. 12A and 12B. The Response subroutine 290 sets a flag corresponding to the response number stored.

The Filter Signal subroutine 886 begins by identifying the filter buffer with a pointer, block 934, then stores the newest difference signal (DIF-SIG) in the filter buffer indexed into the next available memory slot, block 936. The subroutine then asks if the buffer pointer is at the end of the buffer, decision block 938. If it is, the pointer is set to the top of the filter buffer block 942. If the pointer is not at the end, the pointer is incremented to the next memory slot, block 940. The location of the pointer is saved, block 944 and the difference signals are accumulated to generate a summation, block 946.

The Response flag is then read, block 948, then the Response flag is divided by two (2), block 952, and the summation is divided by two (2) as indicated by block 950. The Response flag is stored as a power of two indicative of the response number and the divide by (2) function is accomplished by shifting the value in the summation and the Response flag right by one place, so that the response flag is equal to zero (0) when the filtering is done. The subroutine will then inquire, decision block 954, if the filtering is done. If the required filtering is done, the divided summation is stored as a mean signal (MEAN-SIG) and the subroutine returns to the Interrupt subroutine 880.

Figure 29:
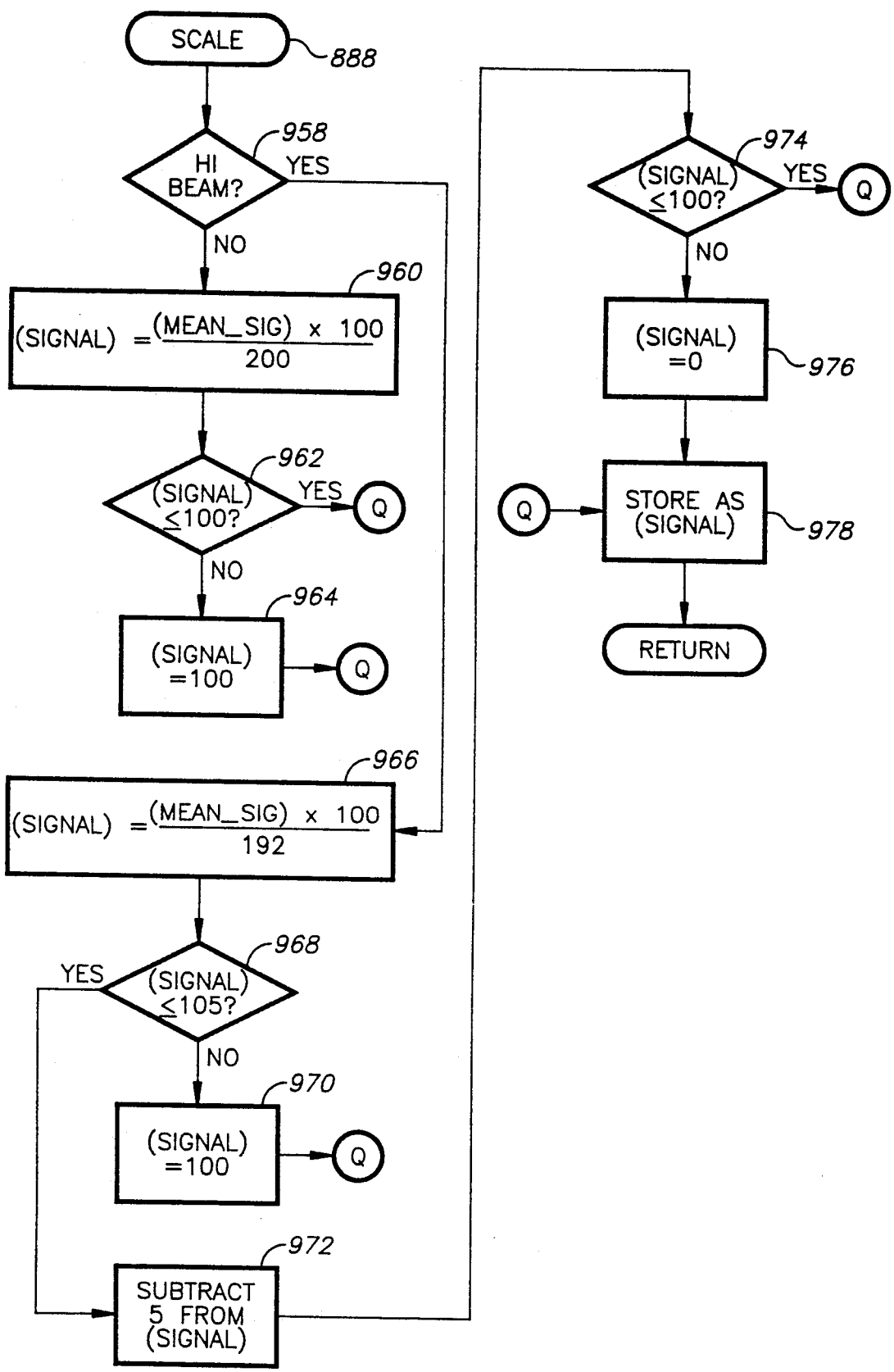
FIG. 29 is a flow diagram of the Interrupt subroutine Scale.

The details of the Scale Signal (SCALE) subroutine 888 are shown in FIG. 29. The Scale Signal (SCALE) subroutine 888 begins by inquiring if the intensity of the light beam being emitted by the light emitting diode 140 is high, decision block 958. If it is, the Scale Signal subroutine jumps to block 966 and generates the signal level (SIGNAL) having a value equal to [(MEAN-SIG)×100] divided by 192. The subroutine then inquires if (SIGNAL) is equal to or less than 105, decision block 968. If (SIGNAL) is greater than 105 the signal level (SIGNAL) is set at 100, block 970, and the signal level=100 is stored as the signal level, (SIGNAL) and the subroutine returns to the Interrupt subroutine 880. If the signal level (SIGNAL) is less than or equal to 105, five (5) is subtracted from the signal level as indicated by block 972.

The Scale Signal subroutine then inquires, decision block 974, if the signal level is equal to or less than 100. If it is, the subroutine jumps to block 978, the signal level is stored, and the subroutine returns to the Interrupt subroutine 880. Otherwise, the signal level is set to zero (0) block 976, the zero signal is stored, block 978, and the subroutine returns to the Interrupt subroutine 880.

Returning to decision block 958, if the intensity of the light beam is not a HI beam, the signal level (SIGNAL) has a value equal to the [(MEAN-SIG)×100] divided by 200, as indicated in block 960. The subroutine then inquires if the signal level is equal to or less than 100, decision block 962. If the answer is yes, the subroutine stores the signal level, block 978 and returns to the Interrupt subroutine 880. If the answer is no, the signal level is set at 100, block 964, and the subroutine jumps to block 978 where the signal level is stored and the subroutine returns to the Interrupt subroutine.

Figure 30:
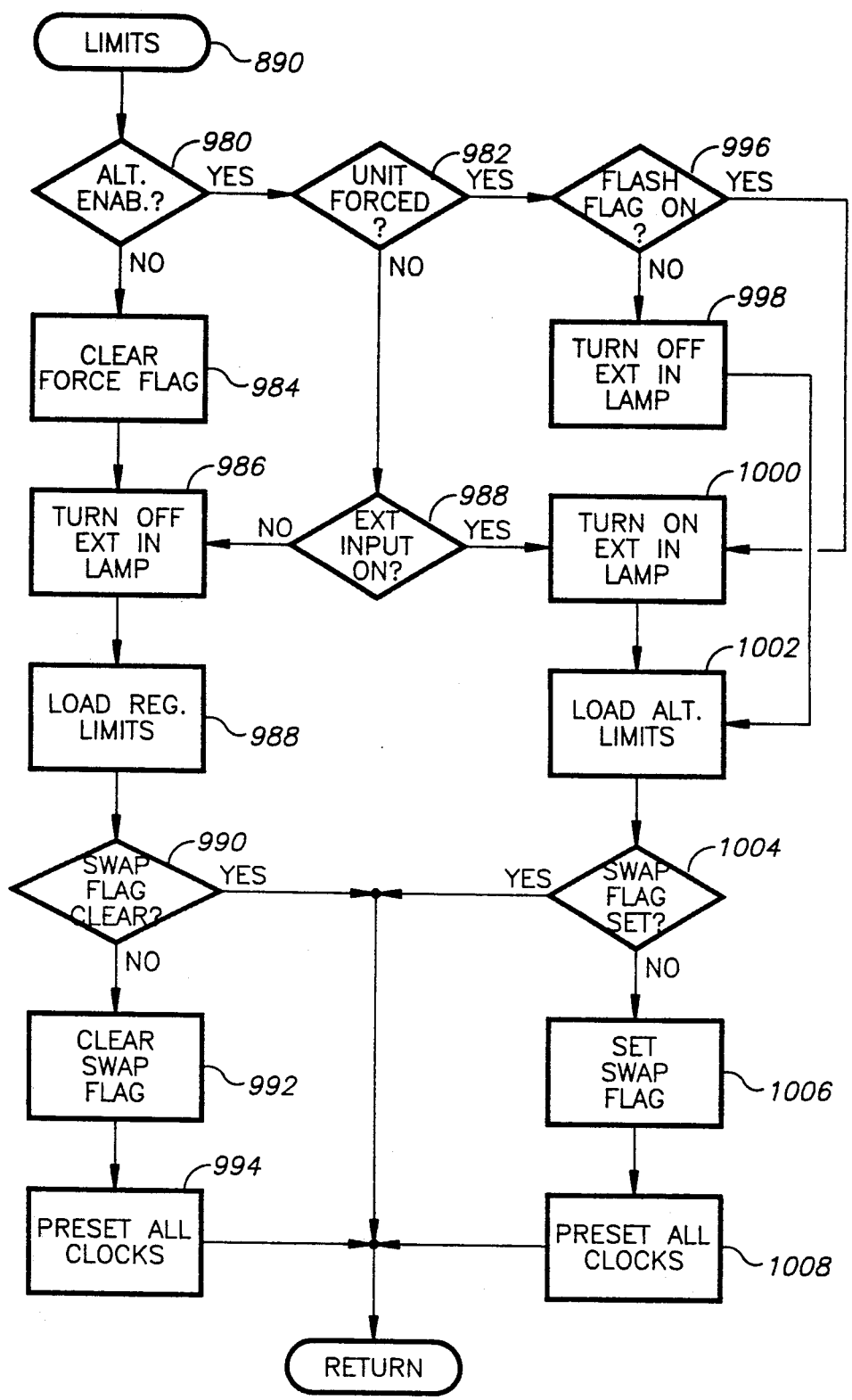
FIG. 30 is a flow diagram of the Interrupt subroutine Limits.

The details of the Update Limits (LIMITS) subroutine 890 are shown on FIG. 30. This subroutine begins by inquiring, decision block 980, if the alternate limits are enabled. If they are not, the Force flag is cleared, block 984, the external input lamp 28 is turned OFF, block 986, and the regular limits are loaded as the updated limits, block 988. After the regular limits are loaded, the subroutine inquires if a Swap flag is clear, decision block 990. The Swap flag allows the clocks to be preset once and only once whenever the limits are exchanged, ie., regular limits to alternate limits and alternate limits to regular limits. If the Swap flag is cleared, the subroutine returns to the Interrupt subroutine, otherwise the Swap flag is cleared, block 992, the clocks are preset, block 994, and the subroutine returns to the Interrupt subroutine.

Returning to decision block 980, if the alternate limits are enabled, the subroutine then inquires, decision block 982, if the Force flag is set, indicating the electro-optical control system 10 is being forced. If it is not being forced, the subroutine will inquire, decision block 988, if the external input is ON. If it is not, the external input lamp is turned OFF, block 986, the regular limits are loaded as the updated limits, block 988, and the subroutine inquires if the Swap flag is cleared. If it is not, the subroutine clears the Swap flag, block 992, presets all of the clocks, block 994, then returns to the Interrupt subroutine 880. If the Swap flag is cleared the subroutine will return to the Interrupt subroutine directly.

Returning to decision block 988, if the external input is ON, the subroutine will turn ON the external input lamp 28, block 1000, load the alternate limits as updated limits, block 1002, and inquire, decision block 1004, if the Swap flag is set. If it is, the subroutine will return to the Interrupt subroutine. If the Swap flag is not set, the subroutine will set the Swap flag, block 1006, preset all clocks, block 1008, then return to the Interrupt subroutine 880.

Returning to decision block 982, if the Force flag is set, the subroutine will inquire, decision block 996, if the external input Flash flag is ON. If it is not ON, the subroutine will turn OFF the external input lamp 28, block 998, then load the alternate limits as the updated limits, block 1002. As previously discussed, the subroutine will then test the Swap flag, decision block 1004, and if clear, set it, block 1006, preset all of the clocks then return to the Interrupt subroutine 880.

Returning to decision block 996, if the external input Flash flag is ON, the subroutine will turn ON the external input lamp 28, load the alternate limits as the updated limits, block 1002, test, and if clear, set the Swap flag blocks 1004 and 1006, preset all of the clocks, block 1008 then return to the Interrupt subroutine 880.

Figure 31:
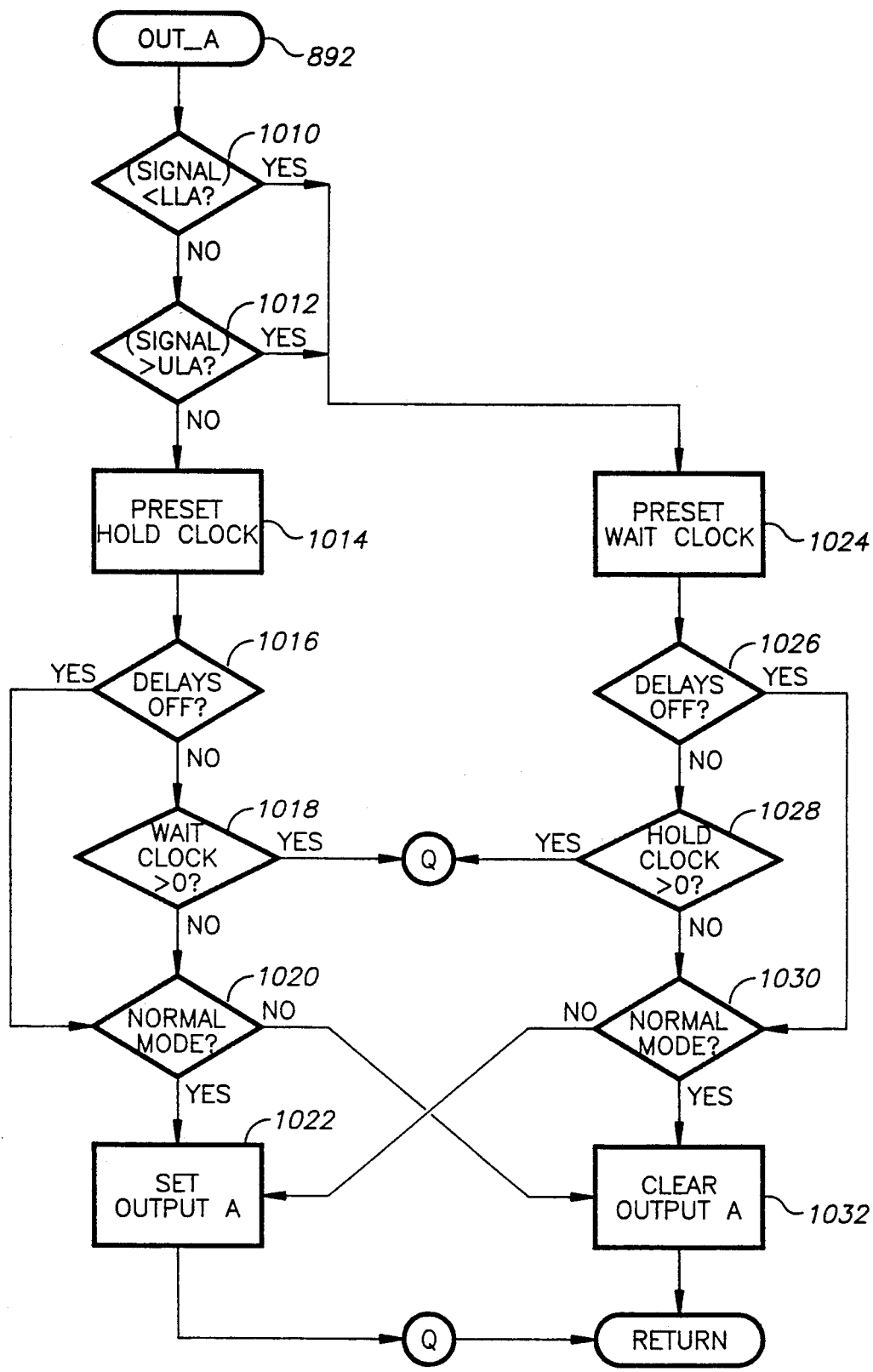
FIG. 31 is a flow diagram of the Interrupt subroutine Update Lamp and Output.

The Update Lamp and Output subroutines 892 and 894 are substantially identical; therefore, only the Update Lamp and Output A (OUT-A) subroutine 892 will be described in detail in FIG. 31. This subroutine begins by inquiring if the signal level (SIGNAL) is less than the preset lower limit, decision block 1010. If it is, then the subroutine will preset the wait clock, block 1024. If the (SIGNAL) is greater than or equal to the lower limit and less than or equal to the upper limit, the subroutine presets the hold clock, block 1014. The subroutine will then inquire, decision block 1016, if the delays are OFF. If the delays are OFF, the subroutine will inquire, decision block 1020, if the electro-optical control system 10 is in the normal mode of operation. If it is, it will set output A, block 1022, and return to the Interrupt subroutine. If the electro-optical control system 10 is in the inverted mode of operation, the subroutine will clear output A, block 1032, and return to the Interrupt subroutine. The hold clock is preset during each iteration of the Interrupt subroutine as long as the (SIGNAL) is greater than or equal to the lower limit and less than or equal to the upper limit. In a like manner, the wait clock is preset during each iteration of the Interrupt subroutine as long as the (SIGNAL) is less than the lower limit or greater than the upper limit.

Returning to decision block 1016, if the wait delay is ON, the subroutine will inquire if the wait clock is greater than zero (0), decision block 1018. If it is, the subroutine will return to the Interrupt subroutine. Alternatively, if the wait clock is not greater than zero (0), the subroutine will either set the output A or clear the output A depending upon whether the electro-optical control system 10 is in the normal or inverted mode of operation.

Returning to block 1024, after the wait clock is preset, the subroutine will inquire, decision block 1026, if all delays are OFF. If all delays are OFF the subroutine will inquire if the electro-optical control system 10 is in the normal mode of operation, decision block 1030. If the electro-optical control system 10 is in the inverted mode of operation, the subroutine will set output A, block 1022, then return to the Interrupt subroutine. If the electro-optical control system 10 is in the normal mode of operation, the subroutine will clear output A, block 1032, and return to the Interrupt subroutine.

Returning to decision block 1026, if all delays are not OFF, the subroutine will inquire, decision block 1028, if the hold clock is greater than zero (0). If it is, the subroutine will return to the Interrupt subroutine. The subroutine continues to inquire if the hold clock is greater than zero (0) upon each iteration of the Interrupt subroutine until the hold clock counts down to zero (0). The subroutine will then inquire, decision block 1030, if the electro-optical control system 10 is in the normal mode of operation, then either set or clear output A depending on whether the electro-optical control system 10 is in the normal or inverted mode of operation and return to the Interrupt subroutine.

Having described a preferred embodiment of an electro-optical control system, it is not intended that the electro-optical control system be limited to the specific structural arrangement shown in the drawings and the functions shown in the flow diagrams. It is recognized that those skilled in the art may make certain changes or improvements without departing from the spirit of the invention as set forth in the claims.

What is claimed is:

1. An electro-optical control system comprising:
   a housing having a plurality of external faces;
   a keypad mounted on one external face of said plurality of external faces for entering instructions, said keypad having a plurality of keys, each key of said plurality of keys generating a unique digital signal when pressed;
   an alpha-numeric display mounted on one external face of said plurality of external faces for displaying preselected characters in response to received data;
   means for periodically generating a light beam having a predeterminable duration;
   means for receiving at least a portion a light beam to generate a digital level having a value corresponding to the intensity of said received portion of said light beam;
   means for activating said alpha-numeric display to display a numerical value corresponding to the value of said digital signal level;
   means for generating and displaying on said alpha-numeric display a lower limit A having a value entered by means of said keypad;
   means for generating and displaying on said alpha-numeric display an upper limit A having a value entered by means of said keypad;
   at least an output A switch having an off state and switchable to an on state in response to being actuated; and
   means for actuating said output A switch to said on state in response to the value of said digital signal level being greater than said value of said lower limit A and less than the value of said upper limit A.

2. The control system of claim 1, wherein said means for periodically generating a light beam comprises:
   a light emitting diode;
   means for periodically energizing said light emitting diode to emit a light beam for a predetermined period of time; and
   an output light guide connected to said housing for guiding said light beam to a location remote from said housing.

3. The control system of claim 2, wherein said light emitting diode is an infrared emitting diode.

4. The control system of claim 2, wherein said means for receiving at least a portion of said light beam comprises:
   an input light guide having a first end remote from said housing for receiving at least a portion of said light beam emitted by said output light guide;
   a photosensitive diode disposed adjacent to the end of said input light guide opposite said first end for generating an analog signal having a value corresponding to the intensity of said portion of said light beam received by said input light guide; and
   analog-to-digital converter means for converting said analog signal to digital data.

5. The control system of claim 1, wherein said means for periodically generating a light beam, and said means for receiving at least a portion of said light beam comprise:
   a light emitting diode;
   means for periodically energizing said light emitting diode for a predetermined period of time to generate said light beam;
   a bifurcated light guide having an output branch portion, an input branch portion and a common portion, said output branch portion of said bifurcated light guide transmitting said light beam generated by said light emitting diode to a location remote from said housing;
   a photosensitive diode disposed to receive the light transmitted by said input branch portion of said bifurcated light guide for generating an analog signal having a value corresponding to the intensity of light received from said input branch portion; and
   analog-to-digital converter means for converting said analog signal to digital data.

6. The control system of claim 2, wherein said means for periodically energizing said light emitting diode comprises:
   first energizing means for periodically energizing said light emitting diode at a first light output intensity;
   second energizing means for periodically energizing said light emitting diode at a second light output intensity that is lower than said first light output intensity; and
   means responsive to instructions entered by means of said keypad for selecting one of said first and second energizing means to energize said light emitting diode.

7. The control system of claim 6, wherein said means for periodically energizing said light emitting diode further comprises a third energizing means for periodically energizing said light emitting diode at a third light output intensity lower than said second light output intensity and wherein said means for selecting, selects one of said first, said second and said third energizing means.

8. The control system of claim 4, wherein said analog-to-digital converter means comprises means for delaying the conversion of said analog signal to said signal data for a predetermined time after energizing said light emitting diode, said predetermined time being selected so as to permit said light beam to stabilize after said light emitting diode is energized.

9. The control system of claim 4, wherein said photo sensitive diode generates an ambient light signal having a value corresponding to the intensity of the ambient light received at said first end of said input light guide in the absence of said light beam, wherein said analog-to-digital converter means, converts said ambient light signal to ambient light level digital data; and wherein said control system further comprises means for subtracting said ambient light level digital data from said digital data to generate difference data.

10. The output system of claim 9, further comprising means for averaging at least two sequentially generated difference data, to generate an average difference signal.

11. The control system of claim 10, wherein said means for averaging averages four sequentially generated difference data to generate said average difference signal.

12. The control system of claim 10, further comprises filter means for generating a mean value of a number of said average difference signals to produce a digital signal level, said number of said average difference signals being selected in response to information entered by means of said keypad and wherein, said means for activating said alpha-numeric display activates said alpha-numeric display to display a number corresponding to said mean value as said digital signal level.

13. The control system of claim 5, further comprises means for delaying of the conversion of said analog signal to said digital data for a predetermined time after energizing said light emitting diode, said predetermined time being selected to permit said light beam to stabilize after said light emitting diode is energized.

14. The control system of claim 5, wherein said photo-sensitive diode generates an ambient light signal having a value corresponding to the intensity of the ambient light received at said first end of said input light guide in the absence of said light beam, wherein said analog-to-digital converter means converts said ambient light signal to digital data; and wherein said control system further comprises means for subtracting said ambient level data from said digital data to generate difference data.

15. The control system of claim 14, further including means for averaging at least two sequentially generated difference signals to generate an average difference signal.

16. The control system of claim 15, wherein said means for averaging averages four sequentially generated difference signals to generate said average difference signal.

17. The control system of claim 15, further comprises filter means for generating a mean value of a number of said average difference signals to produce a digital signal level, said number of said average difference signals being selected in response to information entered by means of said keypad and wherein said means for activating said alpha-numeric display activates said alpha-numeric display to display a number corresponding to said mean value as said digital signal level.

18. The control system of claim 1, further comprising:
wait delay A means for delaying the activation of said output A switch for a first period of time each time the value of said digital level crosses said lower limit A when the value of said digital signal level is increasing and each time the value of said digital signal level crosses said upper limit A when the value of said digital signal level is decreasing; and
means for generating and displaying on said display the length of said first period of time in response to information entered by means of said keypad.

19. The control system of claim 18, further comprising;
hold delay A means for maintaining the activation of said output A switch for a second period of time each time the value of said digital signal level crosses said lower limit A when the value of said digital signal level is decreasing and each time the value of said digital signal level crosses said upper limit A when the value of said digital signal level is increasing; and
means for generating and displaying on said display the length of said second period of time in response to information entered by means of said keypad.

20. The control system of claim 1, further comprising:
hold delay A means for maintaining the activation of said output A switch for a second period of time each time the value of said digital signal level crosses said lower limit A when said value of said digital signal level is decreasing and each time the value of said digital signal level crosses said upper limit A when the value of said digital signal level is increasing in response to information entered by means for said keypad; and means for generating and displaying on said alpha-numeric display the length of said second period of time in response to information entered by means of said keypad.

21. The control system of claim 1, further comprising:
means for generating an alternate lower limit a having a value entered by means of said keypad;
means for displaying on said alpha-numeric display said alternate lower limit a;
means for generating an alternate upper limit a having a value entered by means of said keypad, the value of said alternate upper limit a being greater than the value of said alternate lower limit a;
means for displaying on said alpha-numeric display said alternate upper limit a; and wherein,
said means for actuating said output A switch is further responsive to an external input signal to actuate said output A switch to said on state in response to the value of said digital signal level being greater than said alternate lower limit a and less than said alternate upper limit a.

22. The control system of claim 21, further comprising:
alternate wait delay a means for delaying the activation of said output A switch for a third period of time each time the value of said digital signal level crosses said alternate lower limit a when said value of said digital level is increasing and each time the value of said digital signal level crosses said alternate upper limit a when said value of said digital signal level is decreasing;
alternate hold delay a means for maintaining the activation of said output A switch for a fourth period of time each time the value of said digital signal level crosses said alternate lower limit a when the value of said digital signal level is decreasing and each time the value of said digital signal level crosses said Alternate Upper Limit a when the value of said digital signal is increasing;
means for generating the length of said third and fourth periods of time in response to information entered by means of said keypad; and
means for displaying on said alpha-numeric display said third and fourth periods of time set in response to said information entered by said keypad.

23. The control system of claim 1, further comprising mode A means for inverting the operation of said means for actuating said output A switch from a normal mode to an inverted mode and vice versa in response to instructions entered by means of said keypad, said mode A means causing said means for actuating said output A switch to actuate said output A switch to said ON state in response to the value of said digital signal level being one of less than said lower limit A and greater than said upper limit A, and activating said output A switch to said off state in response to the value of said digital signal level being one of greater than said lower limit A and less than said upper limit A, when said output A switch is in the inverted mode.

24. The control system of claim 21, further comprising alternate mode a means for inverting the operation of said means for actuating said output A switch from a normal mode to an inverted mode and vice versa in response to instructions entered by means for said keypad, said alternate mode a means causing said means for actuating said output A switch to actuate said output A switch to said on state in response to the value of said digital signal level being one of less than said alternate lower limit a and greater than said alternate upper limit a, and actuating said output A switch to said off state when the value of said digital signal level is greater than said alternate lower limit a and less than said alternate upper limit a, when said output A switch is in the inverted mode.

25. The control system of claim 1, further including:
means for generating and displaying on said alpha-numeric display a lower limit B having a value entered by means of said keypad;
means for generating and displaying on said alpha-numeric display an upper limit B having a value entered by means of said keypad;
an output B switch having an OFF state and switchable to an ON state in response to being actuated; and
means for actuating said output B switch to said ON state in response to the value of said digital signal level being greater than the value of said lower limit B and less than the value of said upper limit B.

26. The control system of claim 25, further comprising:
wait delay B means for delaying the activation of said output B switch for a first period of time each time the value of said digital signal level crosses said lower limit B when said digital signal level is increasing and each time the value of said digital signal level crosses said upper limit B when the value of said digital signal level is decreasing;
hold delay B means for maintaining the actuation of said output B switch in said on state for a second period of time each time the value of said digital signal level crosses said lower limit B when the value of said digital signal level is decreasing and each time the value of said digital signal level crosses said upper limit B when the value of said digital signal level is increasing; and
means for generating and displaying on said alpha-numeric display values corresponding to the length of said first and second time periods in response to information entered by means of said keypad.

27. The control system of claim 25, further comprising:
means for generating an alternate lower limit b having a value entered by means for said keypad;
means for displaying on said alpha-numeric display the value of said alternate lower limit b;
means for generating an alternate upper limit b having a value entered by means of said keypad;
means for displaying on said alpha-numeric display the value of said alternate upper limit b; and wherein,
said means for activating said output B switch, is further responsive to an external input signal to actuate said output B switch to said on state in response to the value of said digital signal level being greater than said alternate lower limit b and less than said alternate upper limit b.

28. The control system of claim 27, further comprising:
alternate wait delay b means for delaying the actuation of said output B switch for a third period of time each time the value of said digital signal level crosses said alternate lower limit b when the value of said digital level is increasing and each time the value of said digital level crosses said alternate upper limit b when the value of said digital signal level is decreasing;
alternate hold delay b means for maintaining the actuation of said output B switch for a fourth period of time each time the value of said digital signal level crosses said alternate lower limit b when said value of said digital signal level is decreasing and each time the value of said digital signal level crosses said alternate upper limit b when the value of said digital signal level is increasing;
means for generating the length of said third and fourth periods of time in response to instructions entered by means of said keypad; and
means for displaying on said alpha-numeric display said third and fourth periods of time in response to information entered by means of said keypad.

29. The control system of claim 25, further comprising mode B means for inverting the operation of said means for actuating said output B switch from a normal mode to an inverted mode and vice versa in response to instructions entered by means of said keypad, said mode B means causing said means for actuating to actuate said output B switch to said on state in response to the value of said digital signal level being one of less than said lower limit B and greater than said upper limit B, and actuating said output B switch to said off state in response to the value of said digital signal level being greater than said lower limit B and less than said upper limit B, when said output B is in the inverted mode.

30. The control system of claim 27, further comprising alternate mode b means for inverting the operation of said means for actuating said output B switch from a normal mode to an inverted mode and vice versa in response to instructions entered by means of said keypad, said alternate mode b means causing said means for actuating to actuate said output B switch to said on state in response to the value of said digital signal level being one of less than said alternate lower limit b and greater than said alternate upper limit b, and actuating said output B switch to said off state in response to the value of said digital signal level being greater than said alternate lower limit b and less than said alternate upper limit b, when said output B is in the inverted mode.

31. The control system of claim 1, further comprising at least an output A status lamp and means for energizing the output A status lamp in response to switching said output A switch to said on state.

32. The control system of claim 27, further comprising:
an output A status lamp;
means for energizing said output A statue lamp when said output A switch is in said on state;
an output B status lamp;
means for energizing said output B status lamp when said output B switch is in said on state.
an external input status lamp; and
means for energizing said external input status lamp in response to receiving an external input that selectively activates said output A and said output B switches to switch in response to selective crossing by said digital signal level with respect to said alternate upper and lower limits a and said alternate upper and lower limits b, respectively.

33. The control system of claim 1, further comprising self test means for self testing selected elements of said control system.

34. The control system of claim 1, further comprising means for locking said control system in response to instructions entered by means for said keypad, said locking of said control system inhibiting said lower and upper limits A from being changed, and means for unlocking said control system in response to information entered by means of said keypad.

35. The control system of claim 24, further comprising:
  means for locking said control system in response to instructions entered by means of said keypad, said locking of said control system prohibiting said upper and lower limits A, said alternate upper and lower limits a, said wait delay A, said alternate wait delay a, said hold delay A, said alternate hold delay a, said mode A and said alternate node a; and
  means for unlocking said control system in response to information entered by means of said keypad.

36. The control system of claim 30, further comprising:
  means for locking said control system in response to instructions entered by means of said keypad, said locking of said control system prohibiting the changing of said lower and upper limits A, said alternate lower and upper limits A, said wait delay A, said alternate wait delay a, said hold delay A, said alternate hold delay, said mode A, said alternate mode a, said lower and upper limits B, said alternate lower and upper limits b, said wait delay B, said alternate wait delay b, said hold delay B, said alternate hold delay b, said mode B and said alternate mode b; and
  means for unlocking said control system in response to information entered by means of said keypad.

37. The control system of claim 36, wherein said means for locking includes means for storing an unlock code entered by means of said keypad; and said means for unlocking comprising means for comparing a code entered by means of said keypad with said stored unlock code, and match means for unlocking said control system in response to said entered code matching said stored unlock code.

38. An electro-optical control system comprising:
  a keypad having a plurality of keys for entering instructions and information;
  an alpha-numeric display;
  means for periodically generating a light beam for a predetermined duration of time;
  means for receiving a portion of said light beam to generate a light level signal having a value corresponding to the intensity of said received portion of said light beam;
  means for actuating said alpha-numeric display to display characters representing the numerical value of said light level signal;
  means for generating a lower limit A and an upper limit A having values entered by means of said keypad;
  means for displaying on said alpha-numeric display the values of said lower limit A and said upper limit A as they are being generated;
  means for generating a lower limit B and an upper limit B having values entered by means for said keypad;
  means for displaying on said alpha-numeric display the values of said lower and upper limit B as they are being generated;
  an output A switch having an off state and switchable to an on state in response to being actuated;
  an output B switch having an off state and switchable to an on state in response to being actuated;
  means for actuating said output A switch in response to said light level signal being greater than said lower limit A and lower than said upper limit A; and
  means for actuating said output B switch in response to said light level signal being greater than said lower limit B and less than said upper limit B.

39. The control system of claim 38, further comprising:
  means for generating an alternate lower limit a and an alternate upper limit a having respective values entered by means of said keypad;
  means for displaying on said alpha-numeric display the respective values of said alternate lower and upper limits a as they are being generated;
  means for generating an alternate lower limit b and an alternate upper limit b having respective values entered by means of said keypad;
  means for displaying on said alpha-numeric display the respective values of said alternate lower and upper limits b as they are generated; and wherein,
  said means for actuating said output A switch is further responsive to an external input to actuate said output A switch in response to said light level signal having a value greater than said alternate lower limit a and a value less than said alternate upper limit a; and
  said means for actuating said output B switch is further responsive to said external input to actuate said output B switch in response to said light level signal having a value greater than the value of said alternate lower limit b and less than the value of said alternate upper limit b.

40. The control system of claim 39, further comprising:
  wait delay means for delaying the actuation of said output A switch for a first period of time each time the value of said light level signal increases to a value that is greater than the value of said lower limit A and each time the value of said light level signal decreases to a value that is less than the value of said upper limit A;
  hold delay A means for maintaining the actuation of said output A switch for a second period of time each time the value of said light level signal decreases to a value that is less than the value of said lower limit A and each time the value of said light level signal increases to a value that is greater than the value of said upper limit A;
  wait delay B means for delaying the actuation of said output B switch for a third period of time each time the value of said light level signal increases to a value that is greater than the values of said lower limit B and each time the value of said light level signal decreases to a value that is less than the value of said upper limit B;
  hold delay B means for maintaining the actuation of said output B switch for a fourth period of time each time the value of said light level signal decreases to a value that is less than the value of said lower limit B and each time the value of said light level signal increases to a value that is greater than the value of said upper limit B; and
  means for generating said first and third periods of time and said second and fourth periods of time respectively in response to information entered by means of said keypad.

41. The control system of claim 40, further comprising:
- alternate wait delay a means for delaying the actuation of said output A switch for a fifth period of time each time the value of said light level signal increases to a value that is greater than the value of said alternate lower limit a and each time the value of said light level signal decreases to a value that is less than the value of said alternate upper limit a;
- alternate hold delay a means for maintaining the actuation of said output A switch for a sixth period of time each time the value of said light level signal decreases to a value less than the value of said alternate lower limit a and each time the value of the light level signal increases to have a value greater than the value of said alternate upper limit a;
- alternate wait delay b means for delaying the actuation of said output B switch for a seventh period of time each time the value of said light level signal increases to a value that is greater than the value of said alternate lower limit b and each time the value of said light level signal decreases to a value that is less than the value of said alternate upper limit b; and
- alternate hold delay be means for maintaining the actuation of said output B switch for an eighth period of time each time the value of said light level signal decreases to a value that is less than said alternate lower limit b and each time the value of said light level signal increases to a value that is greater than the value of said alternate upper limit b; and
- means for generating said fifth and seventh periods of time and for generating said sixth and eighth periods of time, respectively, in response to information entered by means of said keypad.

42. The control system of claim 41, further comprising:
- mode A means for inverting the operation of said means for actuating said output A switch from a normal mode to an inverted mode and vice versa in response to instructions entered by means of said keypad, said mode A means causing said means for actuating said output A switch to actuate said output A switch to said on state in response to the value of said light level signal being less than said lower limit A and greater than said upper limit A, and activating said output A switch to said off state in response to the value of said light level signal being one of greater than said lower limit A and less than said upper limit A, when said output A switch is in the inverted mode; and
- mode B means for inverting the operation of said means for actuating said output B switch from a normal mode to an inverted mode and vice versa in response to instructions entered by means of said keypad, said mode B means causing said means for actuating to actuate said output B switch to said on state in response to the value of said light level signal being one of less than said lower limit B and greater than said upper limit B, and actuating said output B switch to said off state in response to the value of said light level signal being greater than said lower limit B and less than said upper limit B, when said output B is in the inverted mode.

43. The control system of claim 42, further comprising: alternate mode a means for inverting the operation of said means for actuating said output A switch from a normal mode to an inverted mode and vice versa in response to instructions entered by means of said keypad, said alternate mode a means causing said means for actuating said output A switch to actuate said output A switch to said on state in response to the value of said light level signal being one of less than said alternate lower limit a and greater than said alternate upper limit a, and actuating said output A switch to said off state when the value of said light level signal is greater than said alternate lower limit a and less than said alternate upper limit a, when said output A switch is in the inverted mode; and
- alternate mode b means for inverting the operation of said means for actuating said output B switch from a normal mode to an inverted mode and vice versa in response to instructions entered by means of said keypad, said alternate mode b means causing said means for actuating to actuate said output B switch to said on state in response to the value of said light level signal being one of less than said alternate lower limit b and greater than said alternate upper limit b, and actuating said output B switch to said off state in response to the value of said light level signal being greater than said alternate lower limit B and less than said alternate upper limit B, when said output B is in the inverted mode.

44. The control system of claim 38, wherein said means for periodically generating a light beam comprises:
- a light emitting diode;
- means for periodically energizing said light emitting diode; and
- an output light guide for guiding said light beam to a predetermined point in space; and wherein,
- said means for receiving at least a portion of said light beam comprises:
- an input light guide having a first end receiving a portion of the light beam emitted by an output light guide;
- a photosensitive diode adjacent a second end of said input light guide for generating an analog signal indicative of the portion of said light beam received by said input light guide; and
- means for converting said analog signal to a digital signal.

45. The control system of claim 44, wherein said output light guide and said input light guide are a bifurcated light guide having an output branch for guiding said light beam to a point in space and an input branch for guiding a received portion of said light beam to said photosensitive diode.

46. The control system of claim 44, wherein said means for periodically energizing said light emitting diode comprises:
- first energizing means for periodically energizing said light emitting diode at a first light output intensity;
- second energizing means for periodically energizing said light emitting diode at a second light output intensity less than said first light output intensity; and
- means for selecting a respective one of said first and second energizing means in response to instructions entered by means of said keypad.

47. The control system of claim 46, further comprising third energizing means for periodically energizing said light emitting diode at a third light output intensity less than said second light output intensity, and wherein said means for selecting permits selection of a respective one of said first, second and third energizing means in response to instructions entered by means of said keypad.

48. The control system of claim 47, wherein said means for converting said analog signal to a digital signal comprises means for delaying the conversion of said analog signal to said digital signal for a predetermined period of time selected so as to permit said light beam to stabilize after said light emitting diode is energized.

49. The control system of claim 48, wherein said photo sensitive diode generates an ambient light signal having a value corresponding to the intensity of the ambient light received by said input light guide in the absence of said light beam, wherein, said means for converting converts said ambient light signal to a digital ambient signal, and wherein said control system further includes means for subtracting said digital ambient signal from said digital signal to generate a difference signal.

50. The control system of claim 49, further comprising means for averaging at least two of said difference signals to generate an average difference signal.

51. The control system of claim 50, further comprising filter means for generating a mean value of a number of said average difference signals, said number of said average difference signals being selected in response to instructions entered by means of said keypad.

52. The control system of claim 39, further comprising:
    means for locking said electro-optical control system in response to instructions entered by means for said keypad, said locking of said electro-optical control system permitting viewing of, but prohibiting changing of, said upper and lower limits A, said upper and lower limits B, said alternate upper and lower limits a and said alternate upper and lower limits b; and
    means for unlocking said electro-optical control system in response to instructions entered by means for said keypad.

53. The control system of claim 52, wherein said means for locking includes means for storing an unlock code entered by means of said keypad, and wherein said means for unlocking includes comparator means for comparing a code entered by means of said keypad with said unlock code, and means for unblocking said electro-optical control system in response to said entered code matching said unlock code.

54. The control system of claim 38, further comprising:
    an output A status lamp;
    means for energizing said output A status lamp in response to actuating said output A switch to its on state;
    an output B status lamp;
    means for energizing said output B status lamp in response to said output B switch to its on state;
    an external input status lamp;
    means for energizing said external input status lamp in response to an external input being received by said electro-optical control system;
    a power status lamp; and
    means for actuating said power status lamp in response to the application of electrical power to said electro-optical control system.

55. The control system of claim 43, further comprising locking means for prohibiting the changing of said upper and lower limits A, said alternate upper and lower limits a, said upper and lower limits B, said alternate upper and lower limits b, said wait delays A and B, said alternate wait delays a and b, said hold delays A and B, said alternate hold delays a and b, said modes A and B, and said alternate modes a and b; and means for unlocking said electro-optical control system in response to instructions entered by means of said keypad.

56. The control system of claim 55, wherein said means for locking includes means for storing an unlock code entered by means of said keypad, and wherein said means for unlocking includes comparator means for comparing a code entered by means of said keypad with said unlock code, and means for unlocking said electro-optical control system in response to said entered code matching said unlock code.

* * * * *